United States Patent
Rudolph

(10) Patent No.: US 12,353,954 B2
(45) Date of Patent: Jul. 8, 2025

(54) METHOD AND SYSTEM FOR MULTIRAIL ENCODING OF QUANTUM BITS

(71) Applicant: Psiquantum, Corp., Palo Alto, CA (US)

(72) Inventor: Terence Rudolph, San Francisco, CA (US)

(73) Assignee: Psiquantum, Corp., Palo Alto, CA (US)

( * ) Notice: Subject to any disclaimer, the term of this patent is extended or adjusted under 35 U.S.C. 154(b) by 957 days.

(21) Appl. No.: 17/276,094

(22) PCT Filed: Sep. 13, 2019

(86) PCT No.: PCT/US2019/051109
§ 371 (c)(1),
(2) Date: Mar. 12, 2021

(87) PCT Pub. No.: WO2020/056324
PCT Pub. Date: Mar. 19, 2020

(65) Prior Publication Data
US 2022/0172096 A1     Jun. 2, 2022

Related U.S. Application Data

(60) Provisional application No. 62/825,206, filed on Mar. 28, 2019, provisional application No. 62/795,995, (Continued)

(51) Int. Cl.
*G06N 10/20*     (2022.01)
*G06N 10/40*     (2022.01)

(52) U.S. Cl.
CPC ............. *G06N 10/20* (2022.01); *G06N 10/40* (2022.01)

(58) Field of Classification Search
CPC ............................. G06N 10/20; G06N 10/40
See application file for complete search history.

(56) References Cited

U.S. PATENT DOCUMENTS 8,270,841 B2    9/2012    Nishioka et al.
2009/0015447 A1    1/2009    Kilbank
(Continued)

FOREIGN PATENT DOCUMENTS

EP          3109803 A1    12/2016
WO    2017089891 A1    6/2017

OTHER PUBLICATIONS

Nikolopoulos, Georgios M., and Igor Jex, eds. Quantum state transfer and network engineering. Springer Berlin Heidelberg, 2014. (Year: 2014).*

(Continued)

*Primary Examiner* — Kevin W Figueroa
(74) *Attorney, Agent, or Firm* — Kilpatrick Townsend & Stockton LLP

(57) ABSTRACT

A multirail-encoded qubit can be implemented using a quantum system having a state space that includes a number M of distinct modes, where M is an integer greater than 2. The M modes are logically partitioned into two disjoint subsets (or "bands"), with each mode assigned to exactly one of the bands. The multirail encoding is defined such that a state in which any one of the modes in the first band is occupied and all modes in the second band are unoccupied maps to a logical 0 state of the qubit, and a state in which any one of the modes in the second band is occupied and all modes of the first band are unoccupied maps to a logical 1 state. Systems and methods for generating, measuring, and operating on multirail-encoded qubits are disclosed.

20 Claims, 36 Drawing Sheets

Related U.S. Application Data filed on Jan. 23, 2019, provisional application No. 62/731,084, filed on Sep. 13, 2018.

(56) References Cited

U.S. PATENT DOCUMENTS

2013/0308956 A1* 11/2013 Meyers .................. H04B 10/70
977/933
2018/0157986 A1 6/2018 Oxford et al.

OTHER PUBLICATIONS

Baltanás, J. P., and D. Frustaglia. "Entanglement discrimination in multi-rail electron-hole currents." Journal of Physics: Condensed Matter 27.48 (2015): 485302. (Year: 2015).*

Langford, Nathan K. Encoding, manipulating and measuring quantum information in optics. Diss. University of Queensland, 2007. (Year: 2007).*

Burgarth, Daniel Klaus, and Vittorio Giovannetti. "Dual-and multi-rail encoding." Quantum State Transfer and Network Engineering. Berlin, Heidelberg: Springer Berlin Heidelberg, 2013. 87-122. (Year: 2013).*

Glick, Jennifer R., and Christoph Adami. "Quantum information theory of the Bell-state quantum eraser." Physical Review A 95.1 (2017): 012105. (Year: 2017).*

Browne, et al., "Resource-Efficient Linear Optics Quantum Computation", QOLS, Blacket Laboratory, Imperial College London; Publication Retrieved from the internet: https://arxiv.org/pdf/quant-ph/0405157.pdf, Feb. 9, 2005, pp. 1-5.

PCT/US2019/051109, "International Search Report and Written Opinion", Dec. 6, 2019, 15 pages.

Rosenblum, et al., "A CNOT Gate Between Multiphoton Qubits Encoded in Two Cavities", Department of Applied Physics, Yale University, Retrieved from Internet: https://arxiv.org/pdf/1709.05425.pdf, Dec. 20, 2017, pp. 1-11.

* cited by examiner

METHOD AND SYSTEM FOR MULTIRAIL ENCODING OF QUANTUM BITS

CROSS-REFERENCES TO RELATED APPLICATIONS

This application claims the benefit of U.S. Provisional Application No. 62/731,084, filed Sep. 13, 2018; U.S. Provisional Application No. 62/795,995, filed Jan. 23, 2019; and U.S. Provisional Application No. 62/825,206, filed Mar. 28, 2019, the disclosures of which are incorporated herein in their entirety.

TECHNICAL FIELD

This disclosure relates generally to quantum bits ("qubits") and in particular to multirail encoding of qubits.

BACKGROUND

Quantum computing is distinguished from "classical" computing by its reliance on structures referred to as "qubits." At the most general level, a qubit is a quantum system that can exist in one of two orthogonal states (denoted as $|0\rangle$ and $|1\rangle$ in the conventional bra/ket notation) or in a superposition of the two states $$\left(\text{e.g., } \frac{1}{\sqrt{2}}(|0\rangle + |1\rangle)\right).$$

By operating on an ensemble of qubits, a quantum computer can quickly perform certain categories of computations that would require impractical amounts of time in a classical computer.

Practical realization of a quantum computer, however, remains a daunting task. One challenge is the reliable creation and entangling of qubits.

SUMMARY

Some embodiments relate to systems for determining a logical state of a qubit. The system can include: a quantum system having a state space that includes a number M of modes, wherein M is an integer greater than or equal to 4, wherein the M modes are logically partitioned into a first band including a first number $M_0$ of the M modes and a second band including a second number $M_1$ of modes, wherein $M_0$ and $M_1$ are integers greater than or equal to 2 and $M_0+M_1=M$, wherein occupancy of any one of the $M_0$ modes in the first band is mapped to a first logical state of the qubit and occupancy of any one of the $M_1$ modes in the second band is mapped to a second logical state of the qubit; a first set of detectors coupled to the $M_0$ modes of the first band and configured to determine a total occupancy for the first band; a second set of detectors coupled to the $M_1$ modes of the second band and configured to determine a total occupancy for the second band; and a measurement logic circuit coupled to the first set of detectors and the second set of detectors and configured to determine, based on the total occupancy of the first band and the total occupancy of the second band, whether to signal a logical zero or logical one.

In some embodiments, M=2m, where m is an integer greater than or equal to 2, and $M_0=M_1=m$.

In some embodiments, the measurement logic circuit can be further configured to determine that the qubit is not in the second logical state in the event that the total occupancy of the first band is equal to 1 and the total occupancy of the second band is equal to 0 and to determine that the qubit is not in the first logical state in the event that the total occupancy of the first band is equal to 0 and the total occupancy of the second band is equal to 1.

In some embodiments, the M modes can include spatial modes of a photon. For instance, each spatial mode can correspond to a different waveguide and occupancy of a mode can be based on presence of a photon in the corresponding waveguide.

Some embodiments relate to systems for determining a logical state of a qubit. The system can include: a quantum system having a state space that includes a number M of modes, wherein M is an integer greater than or equal to 4, wherein the M modes are logically partitioned into a first band including a first number $M_0$ of the M modes and a second band including a second number $M_1$ of the M modes, wherein $M_0$ and $M_1$ are integers greater than or equal to 2 and $M_0+M_1=M$, wherein occupancy of any one of the $M_0$ modes in the first band is mapped to a first logical state of the qubit and occupancy of any one of the $M_1$ modes in the second band is mapped to a second logical state of the qubit; a first mode-information eraser (MIE) circuit coupled to the $M_0$ modes of the first band and configured to perform a unitary transformation operation on the $M_0$ modes of the first band such that information as to occupancy of a specific one of the $M_0$ modes of the first band is destroyed while information as to a total occupancy of the $M_0$ modes of the first band is preserved; a second MIE circuit coupled to the $M_1$ modes of the second band and configured to perform a unitary transformation operation on the $M_1$ modes of the second band such that information as to occupancy of a specific one of the $M_1$ modes of the second band is destroyed while information as to a total occupancy of the $M_1$ modes of the second band is preserved; a first set of detectors coupled to the $M_0$ modes of the first band and configured to determine a total occupancy of the first band after operation of the first MIE circuit; a second set of detectors coupled to the $M_1$ modes of the second band and configured to determine a total occupancy of the second band after operation of the second MIE circuit; and a measurement logic circuit coupled to the first set of detectors and the second set of detectors and configured to determine, based on the total occupancy of the first band and the total occupancy of the second band, whether to signal a logical zero or logical one.

In some embodiments, M=2m, where m is an integer greater than or equal to 2 and $M_0=M_1=m$.

In some embodiments, the measurement logic circuit can be further configured to determine that the qubit is not in the second logical state in the event that the total occupancy of the first band is equal to 1 and the total occupancy of the second band is equal to 0 and to determine that the qubit is not in the first logical state in the event that the total occupancy of the first band is equal to 0 and the total occupancy of the second band is equal to 1.

In some embodiments, the M can modes include spatial modes of a photon. For instance, each spatial mode can correspond to a different waveguide and occupancy of a mode can be based on presence of a photon in the corresponding waveguide.

Some embodiments relate to a system for determining a logical state of a qubit. The system can include: a set of photonic waveguides consisting of a number M of photonic waveguides, where M is an integer greater than or equal to 4, the set of photonic waveguides being logically partitioned into a first band including a first number $M_0$ of the M photonic waveguides and a second band including a second number $M_1$ of the M photonic waveguides, where $M_0$ and $M_1$ are integers greater than or equal to 2 and $M_0+M_1=M$; a set of detectors to determine occupancy of each of the photonic waveguides; and measurement logic coupled to the set of detectors and configured to generate a classical output signal indicating a logical zero or logical one, wherein the measurement logic is configured such that any state in which a single photon is present in any one of the first band of $M_0$ photonic waveguides and no photons are present in any of the second band of $M_1$ photonic waveguides produces the logical zero output and such that any state in which a single photon is present in any one of the second band of $M_1$ photonic waveguides and no photons are present in any of the first band of $M_0$ photonic waveguides produces the logical one output.

In some embodiments, the measurement logic circuit can be further configured to determine that the qubit is not in the second logical state in the event that the total occupancy of the first band is equal to 1 and the total occupancy of the second band is equal to 0 and to determine that the qubit is not in the first logical state in the event that the total occupancy of the first band is equal to 0 and the total occupancy of the second band is equal to 1.

In some embodiments, $M=2m$, where m is an integer greater than or equal to 2, and $M_0=M_1=m$.

In some embodiments, the system can also include a network of beam splitters (e.g., 50/50 beam splitters) coupling each waveguide in the set of photonic waveguides to each other waveguide in the set of photonic waveguides, and the set of detectors can be disposed downstream of the network of beam splitters.

Some embodiments relate to a photon generation circuit. The photon generation circuit can include a number of channels, where each channel includes: a photon generator operable to non-deterministically emit a photon pair having a propagating photon and a heralding photon; a detector coupled to the photon generator to detect the heralding photon; a propagation waveguide coupled to the photon generator to propagate the propagating photon; and a blocking switch (which can be, e.g., a normally closed switch) disposed along the propagation waveguide. The photon generation circuit can also include a selection logic circuit coupled to receive a signal from the detector of each of the channels and configured to select, based on the received signals, a single one of the channels to propagate an output photon and to control the blocking switch of each of the channels such that only the selected one of the channels propagates the output photon through the blocking switch.

In some embodiments, the blocking switch of each channel is disposed at a location on the propagation waveguide of that channel that is far enough downstream that the selection logic has time to receive the signals from the detectors of all of the channels and control the blocking switches before the propagating photon from the photon generator reaches the location of the blocking switch.

Some embodiments relate to a photon generation circuit. The photon generation circuit can include a number of channels, where each channel includes: a photon generator operable to stochastically emit a photon pair having an output photon and a heralding photon; a detector coupled to the photon generator and configured to detect the heralding photon and to generate a detection output signal; a propagation waveguide coupled to the photon generator to propagate the output photon; and a gating logic circuit coupled to receive the detection output signal from the detector of the channel. The gating logic circuit of each channel except a last one of the channels can be connected to the photon generator of a next one of the channels and configured to selectively enable or disable operation of the photon generator of the next one of the channels, thereby forming a daisy chain. The gating logic circuits can operate such that when a photon is detected in a detector of one of the channels in the daisy chain, the photon generators in all subsequent channels in the daisy chain are disabled. The propagation waveguide of each channel can also include a delay element, where the delay elements in different channels differ from each other such that an output photon generated in any one of the channels arrives at a downstream end of the propagation waveguides of the channels at a common time.

Some embodiments relate to a multirail Bell state generator that includes: a set of four quantum systems, each quantum system having a state space that includes a number 2m of modes, wherein m is an integer greater than or equal to 2, wherein the 2m modes are logically partitioned into a first subset and a second subset, each subset including m of the modes, wherein, for each of the four quantum systems, occupancy of any one of the first subset of the 2m modes is mapped to a first logical state of a qubit and occupancy of any one of the second subset of the 2m modes is mapped to a second logical state of the qubit, wherein each quantum system has one of the 2m modes initially occupied; a set of four two-band couplers, each of the two-band couplers corresponding to a different one of the four quantum systems, wherein each two-band coupler includes a number m of first-order mode couplers and wherein, within each two-band coupler, each of the m first-order mode couplers couples a respective one of the first subset of the 2m modes of the corresponding one of the four quantum systems to a respective one of the second subset of the 2m modes of the corresponding one of the four quantum systems; a four-band coupler that operates on the second subset of the 2m modes of the four quantum systems subsequently to coupling by the two-band couplers, wherein the four-band coupler includes a number m of second-order mode couplers, each of the second-order mode couplers coupling a set of modes that consists of one mode from each of the four quantum systems; a set of four mode information eraser (MIE) circuits, each MIE circuit configured to perform a mode-information erasure operation on the second subset of modes of a respective one of the quantum systems subsequently to coupling by the four-band coupler, wherein the mode-information erasure operation erases occupancy information as to a specific one of the second subset of modes while preserving information as to a total occupancy of the second subset of modes; a set of four detectors, each detector coupled to the second subset of modes of a respective one of the quantum systems and configured to determine a total occupancy of the second subset of modes of the respective one of the quantum systems subsequently to operation of the MIE circuits; and decision logic coupled to the set of four detectors and configured to determine, based on the total occupancy of the second subset of modes of each of the four quantum systems, whether a state of the first subset of modes of each of the four quantum systems corresponds to a Bell state.

In some embodiments, each of the quantum systems comprises a photon and wherein the modes include spatial modes. For example, the spatial modes can be defined by waveguides.

Some embodiments relate to a multirail Bell state compositor circuit that includes: an integer number (b) of multirail Bell state generators, wherein each of the multirail Bell state generators is configured to non-deterministically produce a pair of multirail-encoded qubits in a Bell state, wherein each multirail-encoded qubit corresponds to an instance of a quantum system having a state space that includes a number 2m of modes, wherein m is an integer greater than or equal to 2, wherein the 2m modes are logically partitioned into a first subset and a second subset, each subset including m of the modes, wherein, for each of pair of multirail-encoded qubits, occupancy of any one of the first subset of the modes is mapped to a first logical state of the qubit and occupancy of any one of the second subset of the modes is mapped to a second logical state of the qubit, wherein each of the multirail Bell state generators produces a classical output signal indicating success or failure of the non-deterministic production of the pair of multirail-encoded qubits; a number of blocking switches, each blocking switch disposed downstream of a different one of the multirail Bell state generators; and a classical control logic circuit coupled to receive the classical output signal from each of the multirail Bell state generators and to set a state of each of the blocking switches such that not more than one of the multirail Bell state generators propagates a pair of multirail-encoded qubits. An output Bell pair of the multirail Bell state compositor circuit can consist of a pair of output multirail-encoded qubits wherein each output multirail-encoded qubit corresponds to an instance of a quantum system having a state space that includes a number b*m of modes, where b is an integer such that b*m is even, wherein the b*m modes are logically partitioned into a first subset and a second subset, each subset including b*m/2 of the modes, wherein, for each of the quantum systems, occupancy of any one of the first subset of the modes is mapped to a first logical state of an output qubit and occupancy of any one of the second subset of the modes is mapped to a second logical state of the output qubit.

Some embodiments relate to a multirail fusion circuit that can include a first quantum system and a second quantum system, each of the first and second quantum systems having a state space that includes a number 2m of modes, where m is an integer greater than or equal to 2, where the 2m modes are logically partitioned into a first band and a second band, each band including m of the modes. The first quantum system can correspond to a first qubit of a first entangled ensemble of qubits, with occupancy of any mode in the first band of the first quantum system being mapped to a first logical state of the first qubit and occupancy of any mode in the second band of the first quantum system being mapped to a second logical state of the first qubit. Similarly, the second quantum system can correspond to a second qubit of a second entangled ensemble of qubits, with occupancy of any mode in the first band of the second quantum system being mapped to a first logical state of the second qubit and occupancy of any mode in the second band of the second quantum system being mapped to a second logical state of the second qubit. The fusion circuit can include a two-band coupler that includes a number m of first-order mode couplers, wherein each of the m first-order mode couplers couples a respective one of the m modes in the first band of the first quantum system to one of the m modes in the second band of the second quantum system. The fusion circuit can also include a first mode information eraser (MIE) circuit coupled to a first band of m output modes of the two-band coupler and a second MIE circuit coupled to a second band of m output modes of the two-band coupler The fusion circuit can also include: a first set of detectors coupled to the first MIE circuit and configured to determine a total occupancy of the first band of m output modes; a second set of detectors coupled to the second MIE circuit and configured to determine a total occupancy of the second band of m output modes; and a measurement logic circuit coupled to the first set of detectors and the second set of detectors and configured to determine, based on the total occupancy of the first band of m output modes and the total occupancy of the second band of m output modes, whether a fusion operation is successful. When the fusion operation is successful, a multirail-encoded output qubit is produced, where the multirail-encoded output qubit is defined such that occupancy of any mode in the second band of the first quantum system is mapped to a first logical state of the output qubit and occupancy of any mode in the first band of the second quantum system is mapped to a second logical state of the output qubit. The multirail-encoded output qubit is entangled with both the first entangled ensemble and the second entangled ensemble.

In some embodiments, each of the quantum systems comprises a photon and the modes include spatial modes, e.g., spatial modes defined by waveguides. Each of the two-band couplers can include a 50/50 beam splitter, and each of the first and second MIE circuits can include a network of beam splitters.

Some embodiments relate to a multirail fusion circuit that can include a first quantum system and a second quantum system, each of the first and second quantum systems having a state space that includes a number 2m of modes, where m is an integer greater than or equal to 2, where the 2m modes are logically partitioned into a first band and a second band, each band including m of the modes. The first quantum system can correspond to a first qubit of a first entangled ensemble of qubits, with occupancy of any mode in the first band of the first quantum system being mapped to a first logical state of the first qubit and occupancy of any mode in the second band of the first quantum system being mapped to a second logical state of the first qubit. Similarly, the second quantum system can correspond to a second qubit of a second entangled ensemble of qubits, with occupancy of any mode in the first band of the second quantum system being mapped to a first logical state of the second qubit and occupancy of any mode in the second band of the second quantum system being mapped to a second logical state of the second qubit. The fusion circuit can include a first two-band coupler that includes a number m of first-order mode couplers, wherein each of the m first-order mode couplers couples a respective one of the m modes in the first band of the first quantum system to one of the m modes in the second band of the second quantum system, and a second two-band coupler that includes a number m of first-order mode couplers, wherein each of the m first-order mode couplers couples a respective one of the m modes in the second band of the first quantum system to one of the m modes in the first band of the second quantum system. The fusion circuit can also include: a first mode information eraser (MIE) circuit coupled to a first band of m output modes of the first two-band coupler; a second MIE circuit coupled to a second band of m output modes of the first two-band coupler; a third MIE circuit coupled to a first band of m output modes of the second two-band coupler; and a fourth MIE circuit coupled to a second band of m output modes of the second two-band coupler. The fusion circuit can also include: four sets of detectors, each set of detectors coupled to a different one of the MIE circuits and configured to determine a total occupancy of the respective band of m output modes; a measurement logic circuit coupled to the four sets of detectors and configured to determine, based on the total occupancy of each of the bands of m output modes, whether a fusion operation is successful. When the fusion operation is successful, the first entangled ensemble becomes entangled with the second entangled ensemble.

In some embodiments, each of the quantum systems comprises a photon and wherein the modes include spatial modes. For example, the spatial modes can be defined by waveguides. Each of the two-band couplers can include a 50/50 beam splitter. Each of the MIE circuits can include a network of beam splitters.

Some embodiments relate to a circuit for a quantum computer. The circuit can include: multiple instances of a heralding quantum circuit, each instance of the heralding quantum circuit being configured to perform a same operation to produce at least one output qubit, each output qubit represented by a pair of output modes, and a classical heralding output; a set of blocking switches, each blocking switch disposed downstream of a different one of the instances of the heralding quantum circuit; a first mode-information erasure (MIE) circuit disposed downstream of the set of blocking switches and coupled to a first output mode of one of the output qubits of each instance of the heralding quantum circuit; a second MIE circuit disposed downstream of the plurality of blocking switches and coupled to a second output mode of one of the output qubits of each instance of the heralding quantum circuit; and a central controller configured to receive the classical heralding outputs from all of the instances of the heralding quantum circuit and to control a state of the set of blocking switches based on the classical heralding outputs such that each output qubit of exactly one of the heralding quantum circuits is propagated to the MIE circuit.

In some embodiments, the heralding quantum circuit is configured such that the at least one qubit is produced with a probability that is less than 1, and the number of instances of the heralding quantum circuit is selected such the probability that at least one instance produces the at least one qubit is close to 1.

Various heralding quantum circuits can be used. For example, in some embodiments, each instance of the heralding quantum circuit includes an instance of a heralding single photon generator. In other embodiments, each instance of the heralding quantum circuit includes an instance of a Bell state generator. In still other embodiments, each instance of the heralding quantum circuit includes an instance of a fusion gate.

In some embodiments, the output modes correspond to spatiotemporal modes of a photon.

In some embodiments, each MIE circuit includes a network of mode couplers. For instance, the network of mode couplers can implement a Hadamard transfer matrix.

Some embodiments relate to a quantum computer system having multiple nodes and a central controller. Each node can include: multiple instances of a heralding quantum circuit, each instance of the heralding quantum circuit being configured to perform a same operation to produce at least one output qubit, each output qubit represented by a pair of output modes, and a classical heralding output; a set of blocking switches, each blocking switch disposed downstream of a different one of the instances of the heralding quantum circuit; a first mode-information erasure (MIE) circuit disposed downstream of the blocking switches and coupled to a first output mode of one of the output qubits of each instance of the heralding quantum circuit; and a second MIE circuit disposed downstream of the blocking switches and coupled to a second output mode of one of the output qubits of each instance of the heralding quantum circuit. The central controller can be configured to receive the classical heralding outputs from all instances of the heralding quantum circuit in each of the node circuits and to control a state of the blocking switches in each of the node circuits based on the classical heralding outputs such that each output qubit of exactly one of the heralding quantum circuits is propagated to the MIE circuit. The node circuits can be coupled in a staged structure including a parent node and a set of child nodes, where a pair of modes corresponding to each of the output qubits of the parent node is provided to each child node in the set of child nodes.

Some embodiments relate to a quantum computer system comprising: a sequence of stages configured to form an entangled ensemble of qubits through successive operations on an input quantum system, the sequence of stages including a passive multiplexing stage and an active multiplexing stage; and a central controller configured to receive classical heralding outputs from the sequence of stages and to control switching operations of the sequence of stages. The passive multiplexing stage can include: multiple instances of a first heralding quantum circuit, each instance of the first heralding quantum circuit being configured to perform a first operation to produce at least one output qubit, each output qubit represented by a pair of output modes, and a classical heralding output; multiple blocking switches, each blocking switch disposed downstream of a different one of the instances of the first heralding quantum circuit; a first mode-information erasure (MIE) circuit disposed downstream of the plurality of blocking switches and coupled to a first output mode of one of the output qubits of each instance of the heralding quantum circuit; and a second MIE circuit disposed downstream of the plurality of blocking switches and coupled to a second output mode of one of the output qubits of each instance of the heralding quantum circuit. The active multiplexing stage can include: multiple instances of a second heralding quantum circuit, each instance of the second heralding quantum circuit being configured to perform a second operation to produce at least one output qubit, each output qubit represented by a pair of output modes, and a classical heralding output; and multiple active switches, each active switch coupled to receive an output mode of one of the output qubits of each instance of the second heralding quantum circuit and configured to selectably propagate, as a switch output mode, a selected one of the received modes. The central controller can be configured to: receive the classical heralding outputs from the plurality of instances of the first heralding quantum circuit in the passive multiplexing stage and to control a state of the plurality of blocking switches in the passive multiplexing stage based on the classical heralding outputs such that each output qubit of exactly one of the first heralding quantum circuits is propagated to the MIE circuit; and receive the classical heralding outputs from the plurality of instances of the second heralding quantum circuit in the active multiplexing stage and to control a state of the plurality of active switches in the active multiplexing stage based on the classical heralding outputs such that the output qubits of exactly one of the second heralding quantum circuits are propagated as the switch output modes.

In some embodiments, the active multiplexing stage is prior to the passive multiplexing stage in the sequence of stages. In other embodiments, the passive multiplexing stage is prior to the active multiplexing stage in the sequence of stages. Some embodiments may include any number of active multiplexing stages and any number of passive multiplexing stages, arranged in any sequence.

The following detailed description, together with accompanying drawings, will provide a better understanding of the nature and advantages of the claimed invention.

BRIEF DESCRIPTION OF THE DRAWINGS

FIGS. 11B-11E show examples of measurement outcomes using the system of FIG. 11A.

DETAILED DESCRIPTION

Figure 1:
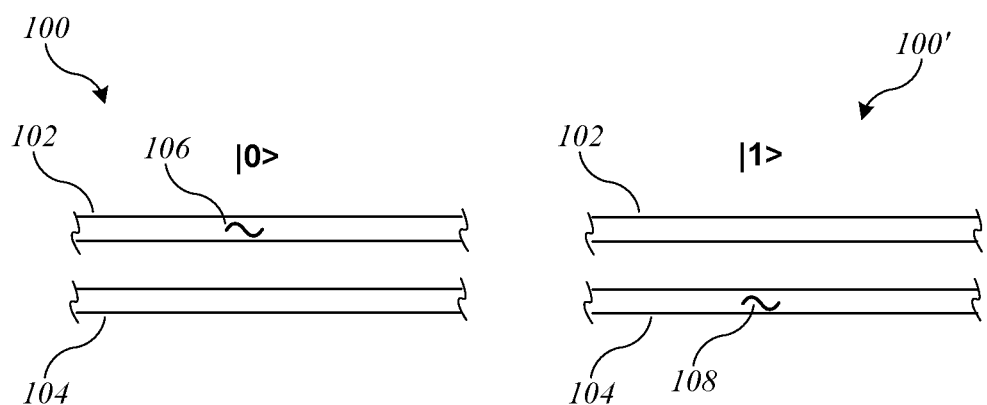
FIG. 1 shows two representations of a portion of a pair of waveguides corresponding to a dual-rail-encoded photonic qubit.

Disclosed herein are examples (also referred to as "embodiments") of systems and methods for creating qubits and superposition states (including entangled states) of qubits based on various physical quantum systems, including photonic systems. Such embodiments can be used, for example, in quantum computing as well as in other contexts (e.g., quantum communication) that exploit quantum entanglement. To facilitate understanding of the disclosure, an overview of relevant concepts and terminology is provided in Section 1. With this context established, multirail encoding of qubits is described, followed by examples of systems and methods for preparing and operating on multirail-encoded qubits, including examples implemented in a photonic quantum computing system. Although embodiments are described with specific detail to facilitate understanding, those skilled in the art with access to this disclosure will appreciate that the claimed invention can be practiced without these details.

Further, embodiments are described herein as creating and operating on systems of qubits, where the quantum state space of a qubit can be modeled as a 2-dimensional vector space. Those skilled in the art with access to this disclosure will understand that techniques described herein can be applied to systems of "qudits," where a qudit can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit.

1. OVERVIEW OF QUANTUM COMPUTING

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, orbital angular momentum, and the like.

For the case of photons propagating in a waveguide, it is convenient to express the state of the photon as one of a set of discrete spatio-temporal modes. For example, the spatial mode k of the photon is determined according to which one of a finite set of discrete waveguides the photon is propagating in, and the temporal mode $t_j$ is determined by which one of a set of discrete time periods (referred to herein as "bins") the photon is present in. The degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multi-mode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples include other engineered quantum systems such as flux qubits, phase qubits, or charge qubits (e.g., formed from a superconducting Josephson junction); topological qubits (e.g., *Majorana* fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \qquad (1)$$

$$|1\rangle_L = |01\rangle_{1,2} \qquad (2)$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state) of n quantum objects is a separable state if $|\psi\rangle = |\psi_1\rangle \otimes \ldots \otimes |\psi n\rangle$ and an entangled state is a state that is not separable. One example is a Bell state, which loosely speaking is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \quad (6)$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \quad (7)$$

where the kets above refer to the logical basis. For example, for qubits encoded by single photons in pairs of modes (a dual-rail encoding), a 3-GHZ state can be written:

$$|GHZ\rangle = \frac{|0\rangle_L|0\rangle_L|0\rangle_L - |1\rangle_L|1\rangle_L|1\rangle_L}{\sqrt{2}} \quad (8)$$

$$= \frac{|10\rangle|10\rangle|10\rangle + |01\rangle|01\rangle|01\rangle}{\sqrt{2}}$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multicrystal single photon sources, or any other type of active multiplexing architecture can be used. In some embodiments, the photon source can employ an active multiplexing scheme with quantum feedback control and the like. In some embodiments described below, use of multirail encoding allows the probability of a band having one mode become occupied during a given pulse cycle to approach 1 without active multiplexing.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $\alpha_1|10\rangle + \alpha_2|01\rangle$, where $|\alpha_1|^2 + |\alpha_2|^2 = 1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
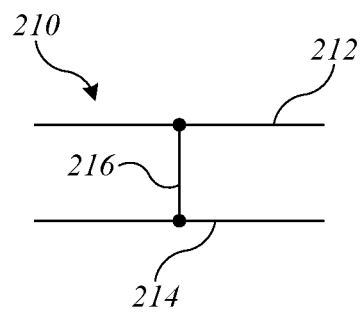
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \quad (9)$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}}\begin{pmatrix} 1 & -i \\ -i & 1 \end{pmatrix}\begin{pmatrix} a_1^\dagger \\ a_2^\dagger \end{pmatrix}_{output}, \quad (10)$$

where subscripts on the creation operators indicate the mode that is operated on, the subscripts input and output identify the form of the creation operators before and after the beam splitter, respectively and where:

$$a_i|n_i,n_j\rangle = \sqrt{n_i}|n_i-1,n_j\rangle$$
$$a_j|n_i,n_j\rangle = \sqrt{n_j}|n_i,n_j-1\rangle$$
$$a_j^\dagger|n_i,n_j\rangle = \sqrt{n_j+1}|n_i,n_j+1\rangle \quad (11)$$

For example, the application of the mode coupler shown in FIG. 2A leads to the following mappings:

$$a_{1_{input}}^\dagger \mapsto \frac{1}{\sqrt{2}}(a_{1_{output}}^\dagger - ia_{2_{output}}^\dagger) \quad (12)$$

$$a_{2_{input}}^\dagger \mapsto \frac{1}{\sqrt{2}}(-ia_{1_{output}}^\dagger + a_{2_{output}}^\dagger)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \quad (13)$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 2B:
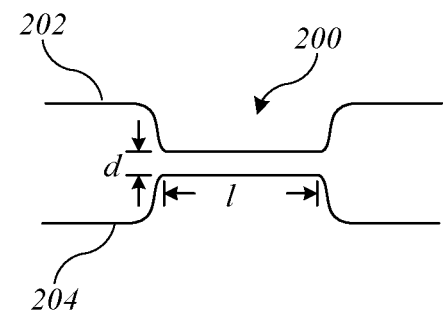
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (14)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
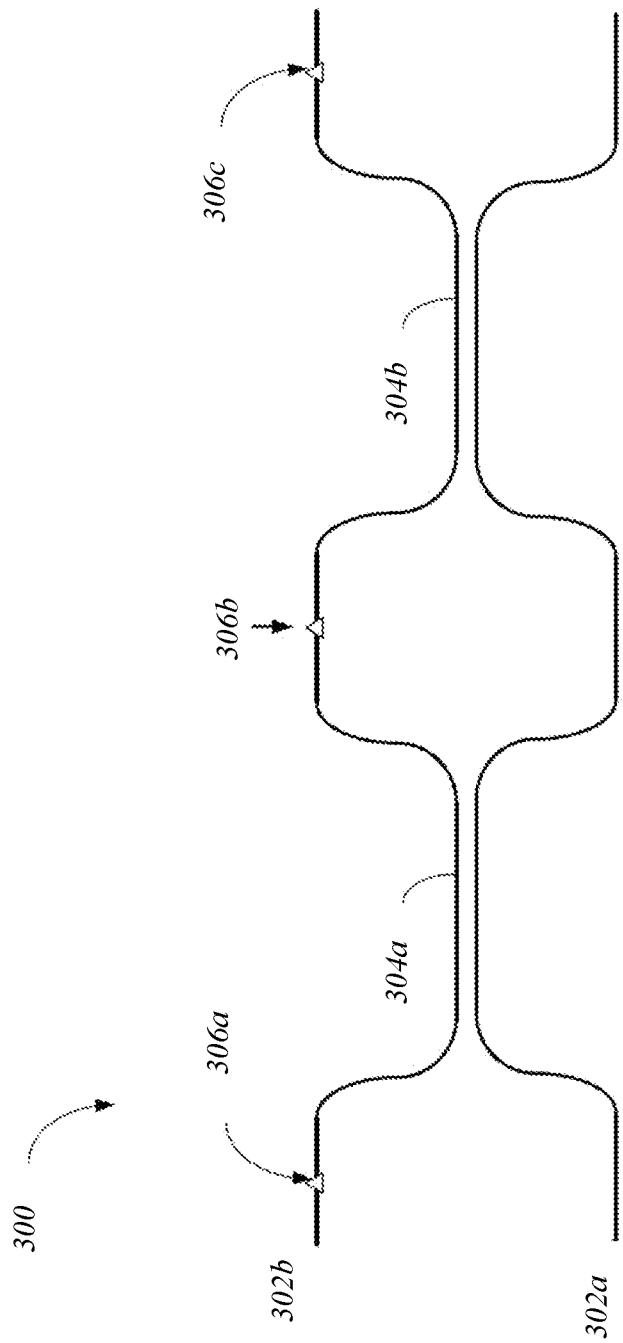
FIGS. 3A and 3B show, in schematic form, examples of physical implementations of a Mach-Zehnder Interferometer (MZI) configuration that can be used in some embodiments.
Figure 3B:
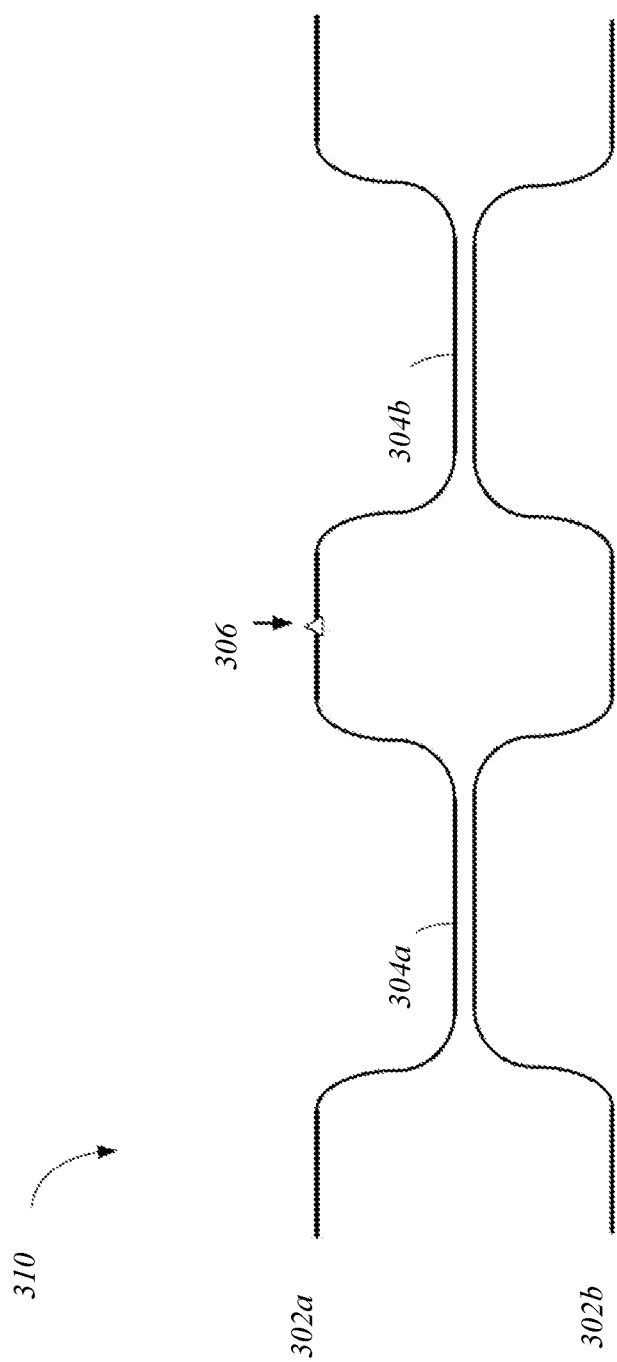

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
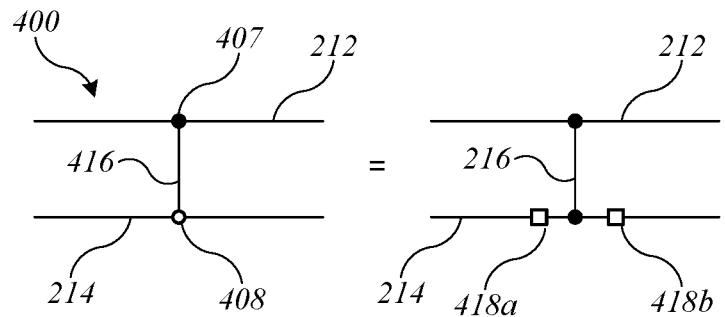
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}} \begin{pmatrix} 1 & 1 \\ 1 & -1 \end{pmatrix}. \quad (15)$$

Thus, mode coupler 400 applies the following mappings:

$$|10\rangle \mapsto \frac{|10\rangle - |01\rangle}{\sqrt{2}} \quad (16)$$

$$|01\rangle \mapsto \frac{|10\rangle + |01\rangle}{\sqrt{2}}$$

$$|11\rangle \mapsto \frac{1}{2}(|20\rangle + |02\rangle).$$

Figure 4B:
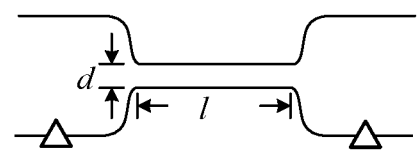
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r=sTs$, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
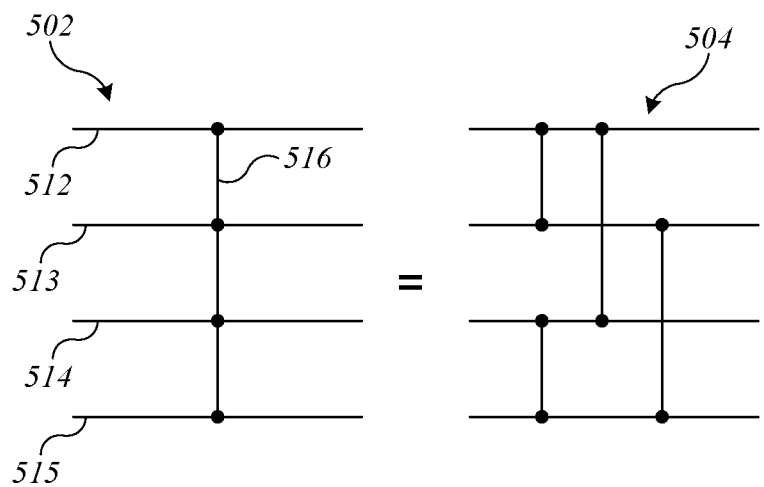
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
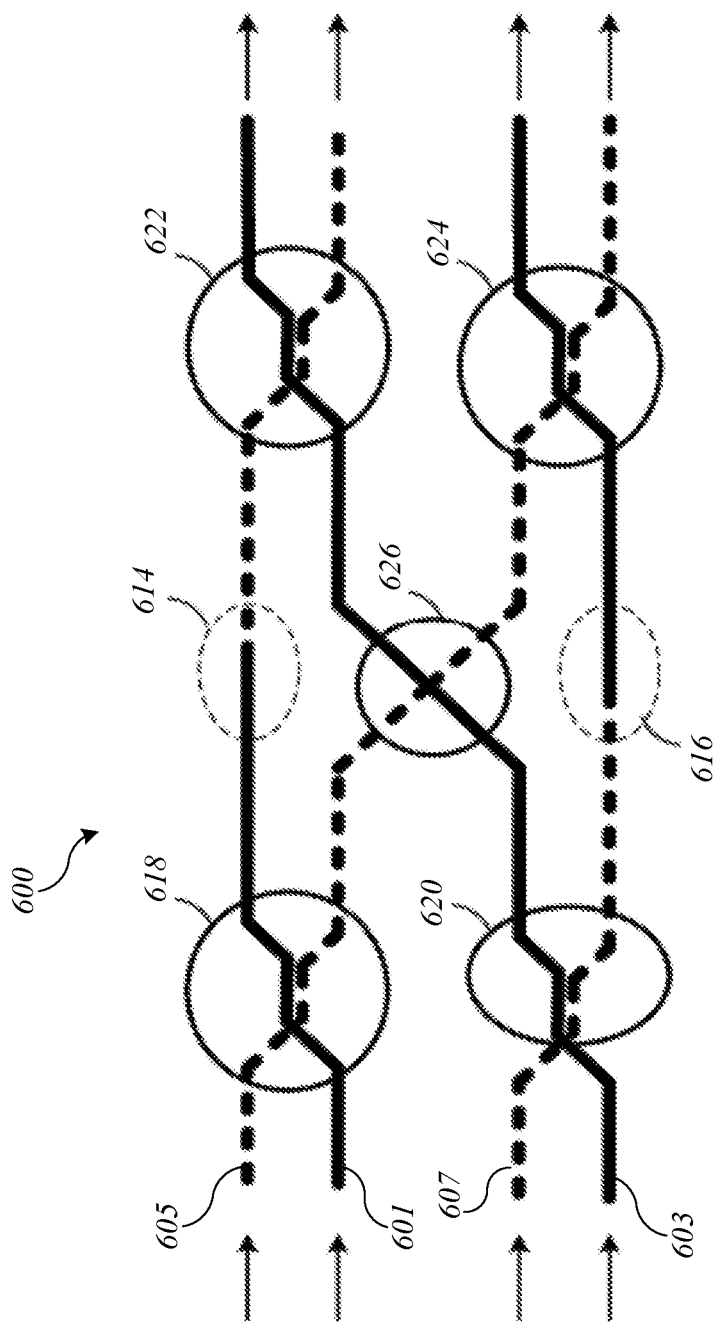
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
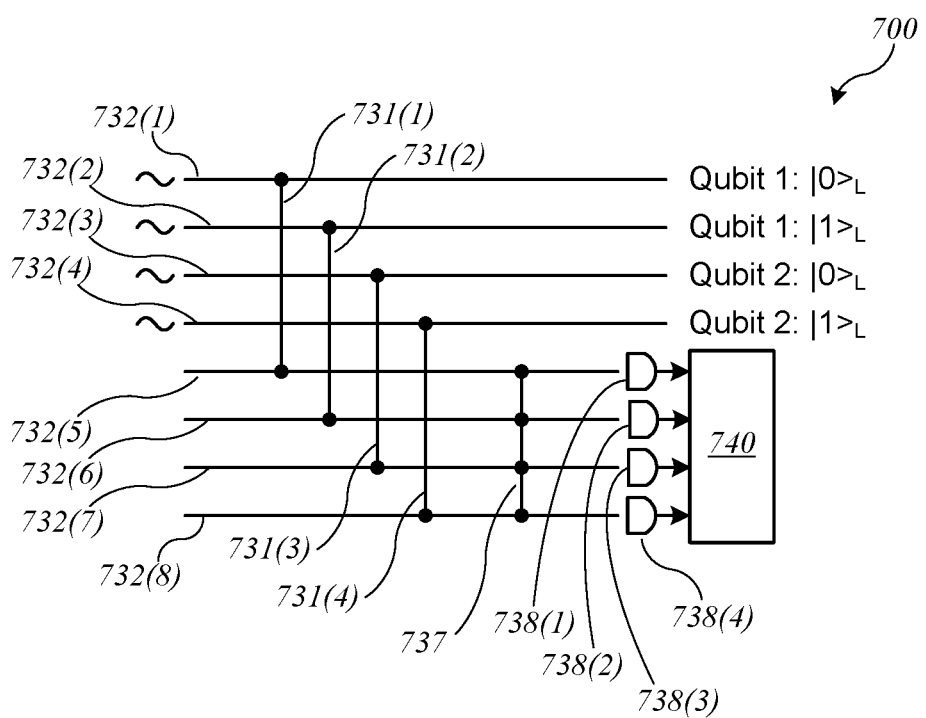
FIG. 7 shows a circuit diagram for a dual-rail-encoded Bell state generator that can be used in some embodiments.

In some embodiments, entangled states of multiple photonic qubits can be created by coupling modes of two (or more) qubits and performing measurements on other modes. By way of example, FIG. 7 shows a circuit diagram for a Bell state generator 700 that can be used in some dual-rail-encoded photonic embodiments. In this example, modes 732(1)-732(4) are initially each occupied by a photon (indicated by a wavy line); modes 732(5)-732(8) are initially vacuum modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731(1)-731(4). Thereafter, a mode-information erasure coupling (e.g., implementing a four-mode mode spreading transform as shown in FIG. 5) is performed on four of the modes (modes 732(5)-732(8)), as shown by mode coupler 737. Modes 732(5)-732(8) act as "heralding" modes that are measured and used to determine whether a Bell state was successfully generated on the other four modes 732(1)-732(4). For instance, detectors 738(1)-738(4) can be coupled to the modes 732(5)-732(8) after second-order mode coupler 737. Each detector 738(1)-738(4) can output a classical data signal (e.g., a voltage level on a conductor) indicating whether it detected a photon (or the number of photons detected). These outputs can be coupled to classical decision logic circuit 740, which determines whether a Bell state is present on the other four modes 732(1)-732(4). For example, decision logic circuit 740 can be configured such that a Bell state is confirmed (also referred to as "success" of the Bell state generator) if and only if a single photon was detected by each of exactly two of detectors 738(1)-738(4). Modes 732(1)-732(4) can be mapped to the logical states of two qubits (Qubit 1 and Qubit 2), as indicated in FIG. 7. Specifically, in this example, the logical state of Qubit 1 is based on occupancy of modes 732(1) and 732(2), and the logical state of Qubit 2 is based on occupancy of modes 732(3) and 732(4). It should be noted that the operation of Bell state generator 700 can be non-deterministic; that is, inputting four photons as shown does not guarantee that a Bell state will be created on modes 732(1)-732(4). In one implementation, the probability of success is 4/32.

In some embodiments, it is desirable to form cluster states of multiple entangled qubits (typically 3 or more qubits, although the Bell state can be understood as a cluster state of two qubits). One technique for forming larger entangled systems is through the use of a "fusion" gate. A fusion gate receives two input qubits, each of which is typically part of an entangled system. The fusion gate performs a "fusion" operation on the input qubits that produces either one ("type I fusion") or zero ("type II fusion") output qubits in a manner such that the initial two entangled systems are fused into a single entangled system. Fusion gates are specific examples of a general class of two-qubit projective measurements that can be employed to create entanglement between qubits and are particularly suited for photonic architectures. Examples of type I and type II fusion gates will now be described.

Figure 8A:
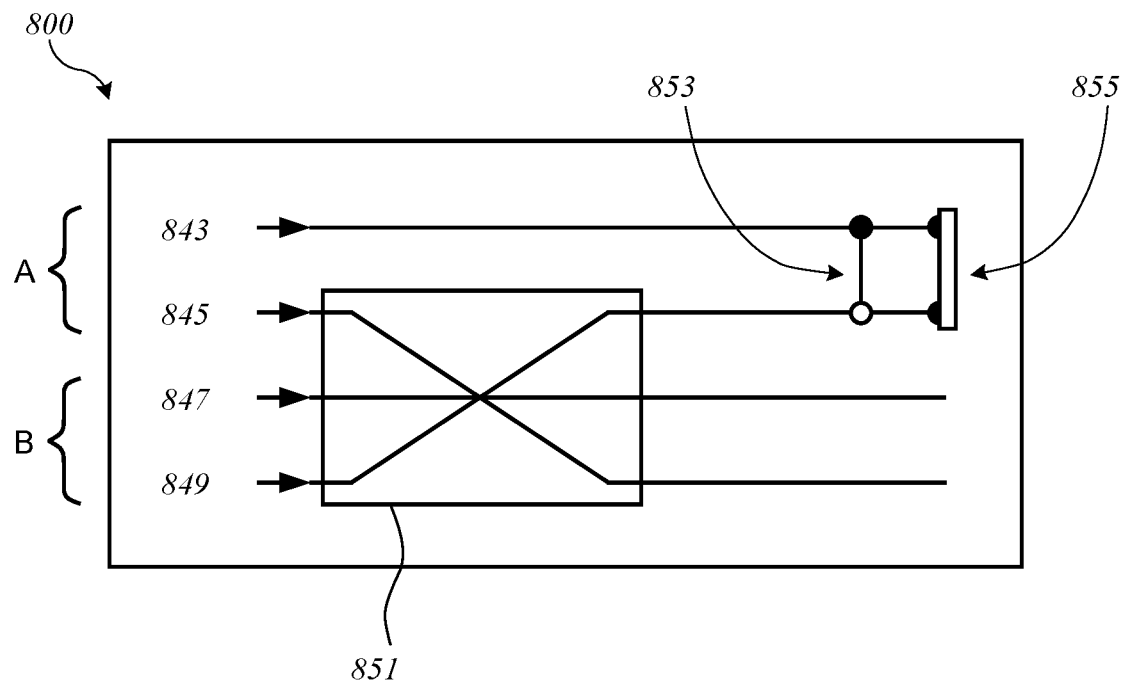
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
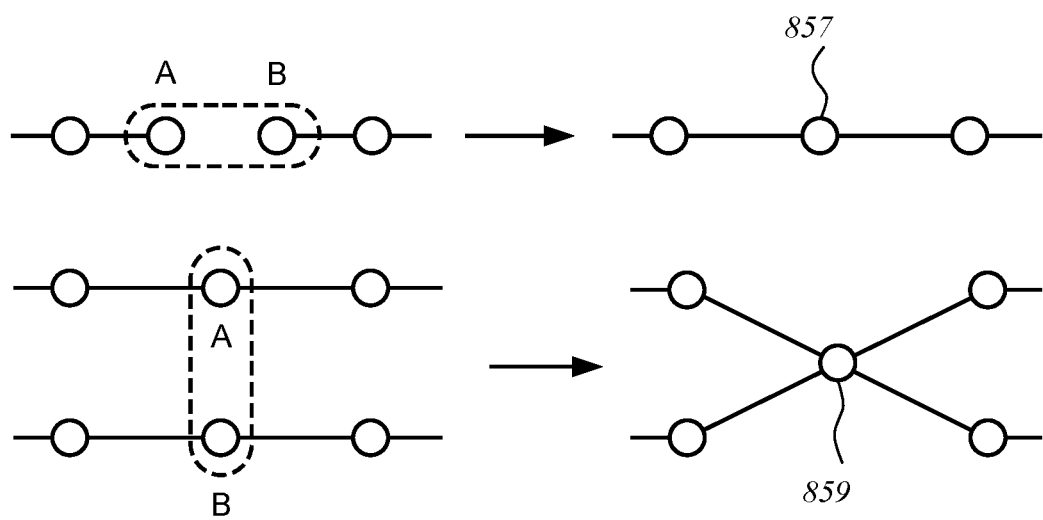
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger cluster state that comprises the original cluster states fused together to a larger cluster state. More specifically, gate 800 "succeeds," with probability 50%, when only one photon is detected by detectors 855, and "fails" if zero or two photons are detected by detectors 855. When the gate succeeds, the two cluster states that qubits A and B were a part of become fused into a single larger cluster state with a fused qubit remaining as the qubit that links the two previously unlinked cluster states (see, e.g., FIG. 8B). However, when the fusion gate fails, it has the effect of removing both qubits from the original cluster resource states without generating a larger fused state.

Figure 9A:
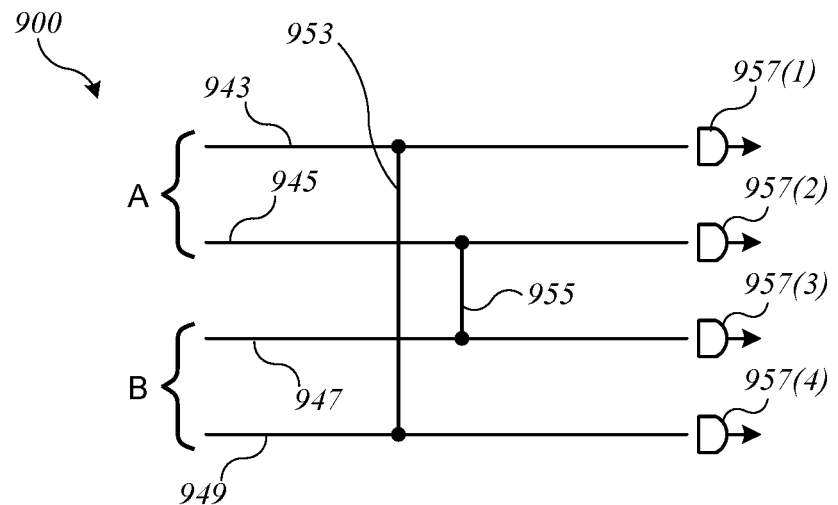
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum state had N qubits, the output quantum state has N−2 qubits. This is different from type I fusion where an input quantum state of N qubits leads to an output quantum state having N−1 qubits.)

Figure 9B:
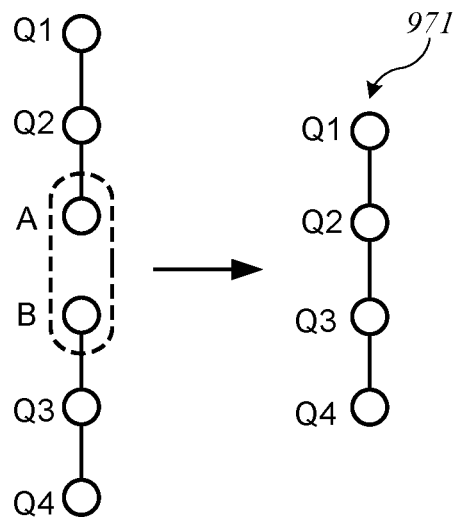
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting qubit ensemble 971 inherits the entangling bonds from qubits A and B thereby creating a larger linear cluster state.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger cluster state that comprises the original cluster states fused together to a larger cluster state. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two cluster states that qubits A and B were a part of become fused into a single larger cluster state; unlike type-I fusion, no fused qubit remains (compare FIG. 8B and FIG. 9B). When the fusion gate fails, it has the effect of removing both qubits from the original cluster resource states without generating a larger fused state.

The foregoing description provides an example of how photonic circuits can be used to implement qubits and operations on qubits using mode coupling between waveguides. In these examples, a pair of modes can be used to represent each qubit. Examples described below can be implemented using similar photonic circuit elements, with a different mapping of modes to qubit logical states.

2. MULTIRAIL-ENCODED QUBITS

As noted above, a qubit can have a dual-rail encoding, in which the state space (i.e., the set of possible states) of the quantum system includes two modes, with occupancy of one mode being mapped to a first logical state and occupancy of the other mode being mapped to a second logical state. In embodiments described herein, a qubit can have a "multirail" encoding in which occupancy of any one of a set of modes maps to each logical state. This section describes examples of multirail encoding and measurement of a multirail-encoded qubit.

2.1. Multirail Encoding

A multirail-encoded qubit can be implemented using a quantum system having a state space that includes a number M of modes, where M is an integer greater than 2. In other words, the state space of the quantum system includes at least three distinct modes but may have any number of modes. For instance, in one photonic implementation, a spatial mode of a photon can be determined according to which one of a finite set of discrete waveguides the photon is propagating in, and a set of M waveguides can provide a state space for a photon that includes M spatial modes. In other implementations, other modes may be used, such as photon frequencies (with different frequencies or frequency bands corresponding to different modes), a combination of photon polarization and spatial mode, temporal modes of a photon; energy states of an atom or ion; modes of phonon excitations (e.g., frequency, direction, etc.); collective modes of multiparticle systems that behave as a single particle (e.g., Cooper pairs); or any other excitation of a quantum field.

To define a "multirail" encoding, the M modes are partitioned (in a logical sense, which need not involve physical partitioning) into two disjoint subsets, also referred to as "bands," where one subset includes $M_0$ of the modes and the other subset includes $M_1$ of the modes, where $M_0+M_1=M$ (in other words, each mode is assigned to exactly one of the two bands). The multirail encoding is defined such that a state of the quantum system in which any one of the modes in the first band is occupied and all modes in the second band are unoccupied maps to the $|0\rangle_L$ (logic 0) state of the qubit, and a state of the quantum system in which any one of the modes in the second band is occupied and all modes of the first band are unoccupied maps to the $|1\rangle_L$ (logic 1) state. (In a shorthand locution, this may be described as mapping modes to a band and mapping a band to a logical state of the qubit.) For example, in a quantum system whose state space includes eight modes, a multirail encoding can map four modes to each band. In a quantum system whose state space includes seven modes, a multirail encoding can map four modes to one band and three modes to the other band, or five modes to one band and two modes to the other band.

In some instances, a multirail encoding can be a "balanced" encoding, in which the multiplicity M of the multirail encoding is an even number ($M=2m$ for integer $m \geq 2$), and the multirail encoding is defined by partitioning the 2m modes into two bands that each include m of the modes (i.e., $M_0=M_1=m$). For example, in a quantum system whose state space includes eight modes, a balanced multirail encoding can map four modes to each band.

The following description focuses on balanced multirail encodings. However, those skilled in the art with access to the present disclosure will appreciate that it is also possible to define an "unbalanced" multirail encoding (i.e., where $M_0 \neq M_1$). It is noted that in some instances (examples of which are described below), it is useful to identify "pairs" of modes, where each mode from one band is paired with a different one of the modes from the other band. In the case of an unbalanced multirail encoding, the band that includes a larger number of modes will have "unpaired" modes, and occupancy of an unpaired mode may be detected during a measurement operation. In some instances, detecting occupancy of an unpaired mode may be treated as a heralded error, which may result in invoking error correction operations specific to the situation.

Figure 10:
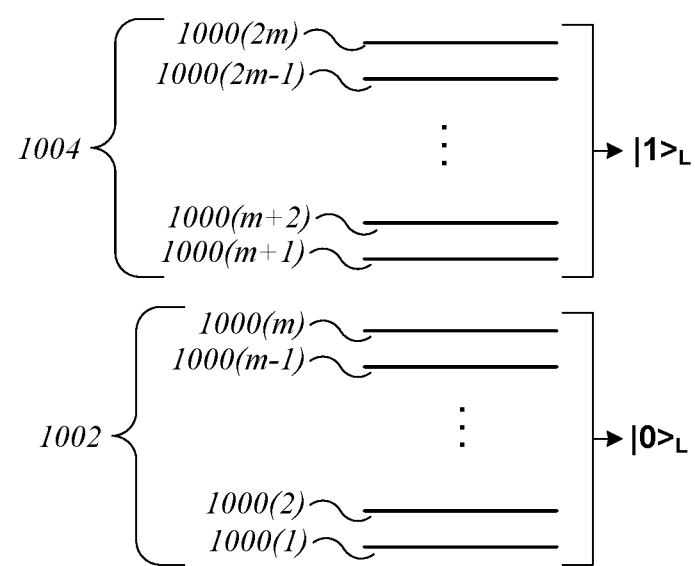
FIG. 10 shows an example of qubit with a multirail encoding that can be used in some embodiments.

FIG. 10 shows a representation of defining a (balanced) multirail encoding for a qubit according to some embodiments. The state space of a quantum system is represented using horizontal lines 1000(1) to 1000(2m), each of which represents a mode that might or might not be occupied in any given instance. For instance, depending on implementation, modes 1000(1) to 1000(2m) may correspond to spatiotemporal modes (e.g., photons in different waveguides), different frequencies or frequency bands of a photon, different energy states of an ion in an ion trap, or states of any type of quantum system. As shown, the set of modes 1000 is partitioned (logically) into two disjoint subsets (or bands) 1002, 1004, with each subset including m of the 2m modes. Each of bands 1002, 1004 is mapped to a different logical state of the qubit. In this example, band 1002 is mapped to the logical 0 state while band 1004 is mapped to the logical 1 state. For convenience of description, the modes 1000 can be indexed ($1 \leq i \leq 2m$) such the first subset (or band) 1002 includes modes 1000(i) for $1 \leq i \leq m$ and the second subset (or band) 1004 includes modes 1000(i) for $m+1 \leq i \leq 2m$. It is to be understood that no particular correspondence of index i to physical modes is required, and the mapping of modes to bands may be defined as desired for a particular implementation. For instance, band 1002 (or the band associated with the logical 0 state of the qubit) can include the modes having odd values of index i while band 1004 (or the band associated with the logical 1 state of the qubit) can include the modes having even values of index i.

It is assumed that the state of the quantum system can be represented as occupancy of any one of the 2m modes or (depending on operations performed on the system) a superposition state having non-deterministic occupancy of two or more of the 2m modes. Occupancy of any one mode 1000(1)-1000(m) within band 1002 while all modes 1000(m+1)-1000(2m) within band 1004 are unoccupied is treated as equivalently corresponding to the logical-0 state of the qubit (denoted as $|0\rangle_L$ in the notation defined above), while occupancy of any one mode 1000(m+1)-1000(2m) within band 1004 while all modes 1000(1)-1000(m) within band 1002 are unoccupied is treated as equivalently corresponding to the logical-1 state of the qubit (denoted as $|1\rangle_L$). That is, the $|0\rangle_L$ state is mapped to occupancy of any one of the modes in the first subset 1002, and the $|1\rangle_L$ state of the qubit mapped to occupancy of any one of the modes in the second subset 1004. Using a Fock state description, for a case where m=4, mappings such as the following can be defined:

$$|0\rangle \Leftrightarrow |0010\ 0000\rangle_{1,2,3,4,5,6,7,8} \quad (19)$$

$$|1\rangle_L \Leftrightarrow |0000\ 0100\rangle_{1,2,3,4,5,6,7,8} \quad (20)$$

In some embodiments, a quantum system implementing a multirail-encoded qubit can exist in a state in which more than one mode within a band is occupied, such as the Fock state $|1001\ 0000\rangle$ for an m=4 multirail encoding. For instance, in a photonic implementation where spatiotemporal modes are determined based on which one of a finite set of discrete waveguides a photon is propagating in, photons may in some instances be propagating in two (or more) waveguides that are mapped to the same band. States of this kind are said to be not in the logical basis, while states where not more than one mode within a band is occupied are said to be in the logical basis. The terms "proper" and "improper" are used herein to distinguish states that are in the logical basis from states that are not; however, it is to be understood that an improper state may be of interest in some embodiments.

2.2. Measurement of a Multirail-Encoded Qubit

In some embodiments, measurement on a multirail-encoded qubit can be made in a manner that determines which of the two bands has an occupied mode, which in some cases can be used to infer information about the logical state of the qubit. By way of illustration, FIG. 11A shows an example of a system for performing a measurement on a multirail-encoded qubit according to some embodiments, and FIGS. 11B-11E show examples of measurement outcomes using the system of FIG. 11A.

Figure 11A:
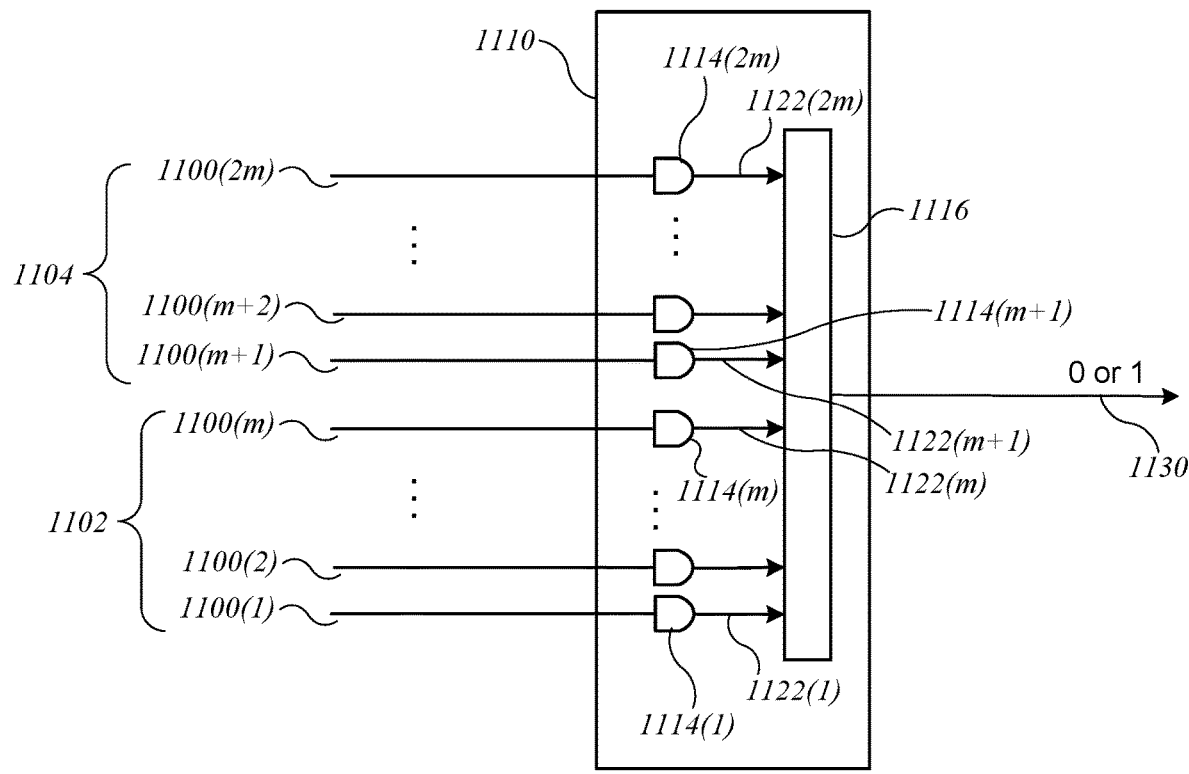
FIG. 11A shows an example of a system for performing a measurement on a multirail-encoded qubit according to some embodiments.

Shown in FIG. 11A are modes 1100 of an example multirail-encoded qubit, similar to modes 1000 of FIG. 10. Occupancy of any one of modes 1100(1)-1100(m) (referred to collectively as band 1102) is mapped to qubit state $|0\rangle_L$, and occupancy of any one of modes 1100(m+1)-1100(2m) (referred to collectively as band 1104) is mapped to qubit state $|1\rangle_L$. A measurement circuit 1110 includes detectors 1114(1)-1114(2m) and measurement logic 1116.

Each of detectors 1114(1)-1114(m) is coupled to one of the modes 1100(1)-1100(m) of band 1102, and each of detectors 1114(m+1)-1114(2m) is coupled to one of the modes 1100(m+1)-1100(2m) of band 1104. Each detector 1114 is configured to determine whether the particular mode 1100 to which it is coupled is or is not occupied. The particular implementation depends on the nature of the modes. For instance, for some photonic implementations, detectors 1114 can be single-photon detectors. The particular type of detector employed in all systems disclosed herein is not critical and can be chosen to be any type of single photon or number resolving photon detector, e.g., superconducting nanowire photon detectors (SNSPD), transition edge sensors (TES), a charge integration photon detector (CIPD), single photon avalanche diodes (SPAD), avalanche photodiode (APD), and the like.

Depending on implementation, each detector 1114 can make a binary determination (mode is occupied or not) or generate an occupancy count (e.g., a number of photons detected). All of detectors 1114 can have the same implementation and configuration, and each detector 1114 can make its determination independently of the others. Detectors 1114(1)-1114(2m) report their respective determination results (e.g., as classical digital logic signals on paths 1122(1)-1122(m)) to measurement logic 1116.

Measurement logic 1116, which can be, e.g., a classical digital logic circuit, receives the 2m determination results as inputs and generates a logical output (classical 1 or 0) based on the results. For example, measurement logic 1116 may receive a "1" or "0" signal from each detector indicating that occupancy was or was not detected by that detector. Measurement logic 1116 can decode the set of detector signals (using classical digital logic, e.g., via one or more OR gates, XOR gates, AND gates, NAND gates, etc.) to determine the corresponding logical output. The particular classical digital logic operations implemented in measurement logic 1116 can depend on the modes and on the configuration of detectors 1114. For instance, in some embodiments, measurement logic 1116 can output a logical 0 if any of detectors 1114(1)-1114(m) signal (or report) an occupied mode or a logical 1 if any of detectors 1114(m+1)-1114(2m) signal (or report) an occupied mode. By way of specific illustration, in some embodiments where m=4, Table 1 can be used to decode the detector signal set. Table 1 can be implemented, e.g., as a lookup table keyed to the input signal set from detectors 1114(1)-1114(2m). Similar logic tables can be defined for other encoding schemes.

TABLE 1

| Signal Set | Logical Output |
| --- | --- |
| 1000 0000 | 0 |
| 0100 0000 | |
| 0010 0000 | |
| 0001 0000 | |
| 0000 1000 | 1 |
| 0000 0100 | |
| 0000 0010 | |
| 0000 0001 | |
| (any other) | Improper state |

Measurement logic 1116 can output a signal indicating the logical output on output signal line 1130, which can be a classical digital signal path (e.g., voltage at a low level indicates logical 0, a high level indicates logical 1; other signaling conventions can be used). In some situations, the logical output can be interpreted as providing information about the quantum state of the qubit (immediately prior to measurement). For instance, the quantum state of a qubit in the logical basis can be represented as $|\Psi\rangle = a_0|0\rangle_L + a_1|1\rangle_L$, where $|a_0|^2 + |a_1|^2 = 1$. In the decoding scheme of Table 1, a logical output of 0 can be understood as indicating that a mode in the band that maps to the $|0\rangle_L$ state of the qubit was occupied. This implies that the quantum state of the qubit had $a_0 \neq 0$. Similarly, a logical output of 1 can be understood as indicating that a mode in the band that maps to the $|1\rangle_L$ state of the qubit was occupied. This implies that the quantum state of the qubit had $a_1 \neq 0$. However, such interpretation is not necessary or applicable in all situations.

In some embodiments, measurement logic 1116 can generate an "improper state" signal if the detector signal set does not match any of the entries in the lookup table. For instance, a detector signal set such as 1001 0000 or 1000 0100 may result in an improper state signal from measurement logic 1116. Improper states can be treated as error. If desired, different categories of improper states can be distinguished (e.g., improper states in which all occupied modes that were detected were in the same band can be distinguished from improper states in which occupied modes were detected in both bands). Depending on implementation, an improper state signal from measurement logic 1116 may be used in further processing, e.g., for error correction.

To further illustrate operation of measurement circuit 1110, reference is made to FIGS. 11B-11E, each of which represents a physical state of a quantum system implementing a multirail-encoded qubit and also shows the corresponding Fock state description and the corresponding measurement output by measurement circuit 1110. For purposes of illustration, FIGS. 11B-11E assume m=4; other values can be substituted. FIGS. 11B-11E further assume that a first band including modes 1100(1)-1100(4) is mapped to the logical 0 output and a second band including modes 1100(5)-1100(8) is mapped to the logical 1 output, but no particular mapping is required. As a visualization aid, a rectangle is used to indicate the mode(s) that is (are) occupied in each example. In instances where the physical state of the quantum system corresponds to a superposition state, an amplitude label (a) is added inside the rectangle for each mode that contributes to the superposition.

In FIG. 11B, mode 1100(7) is shown as occupied (rectangle 1152) and all other modes are shown as unoccupied, signifying that the physical state of the quantum system implementing the qubit corresponds to occupancy of mode 1100(7). If measurement circuit 1110 is applied, detector 1114(7) detects an occupied mode and no other detectors 1114 detect an occupied mode. Measurement logic 1116 receives the outputs from detectors 1114(1)-1114(8), which can be a set of classical binary-logic signals as described above, and outputs (e.g., according to Table 1) a logical 1.

In FIG. 11C, mode 1100(8) is shown as occupied (rectangle 1154) and all other modes are shown as unoccupied, signifying that the physical state of the quantum system implementing the qubit corresponds to occupancy of mode 1100(8). If measurement circuit 1110 is applied, detector 1114(8) detects an occupied mode and no other detectors 1114 detect an occupied mode. Measurement logic 1116 receives the outputs from detectors 1114(1)-1114(8) and outputs (e.g., according to Table 1) a logical 1. Thus, the output of measurement circuit 1110 can be the same regardless of which one of modes 1100(5)-1100(8) is occupied.

In FIG. 11D, mode 1100(3) is shown as occupied (rectangle 1156) and all other modes are shown as unoccupied, signifying that the physical state of the quantum system implementing the qubit corresponds to occupancy of mode 1100(3). If measurement circuit 1110 is applied, detector 1114(3) detects an occupied mode and no other detectors 1114 detect an occupied mode. Measurement logic 1116 receives the outputs from detectors 1114(1)-1114(8) and outputs (e.g., according to Table 1) a logical 0. Although not specifically shown, it should be understood that the output of measurement circuit 1110 can be the same regardless of which one of modes 1100(1)-1100(4) is occupied.

Figure 11E:
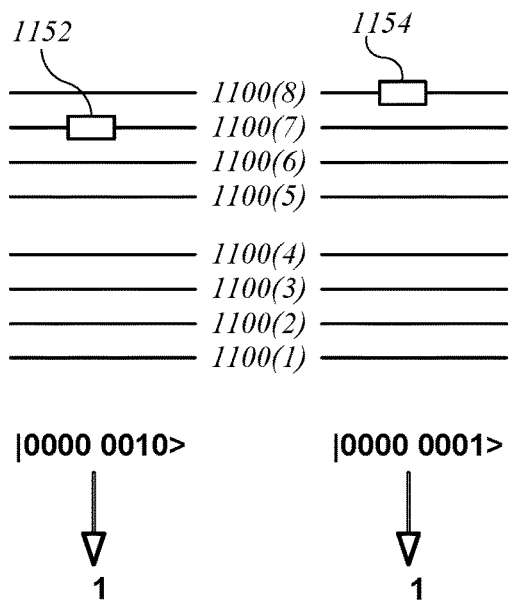

FIG. 11E represents a quantum system whose physical state is a superposition of occupancy of mode 1100(2) with amplitude $a_0$ (rectangle 1160) and occupancy of mode 1100(6) with amplitude $a_1$ (rectangle 1162). Such a state can be represented mathematically by $$|\Psi\rangle = a_0|0100\ 0000\rangle + a_1|0000\ 0100\rangle = a_0|0\rangle_L + a_1|1\rangle_L, \quad (21)$$

where $|a_0|^2 |a_1|^2 = 1$. When a quantum system exists in a superposition state such as Eq. (21), a measurement operation in the logical basis produces a non-deterministic outcome, with the probability of a particular outcome being equal to the square of the absolute value of the amplitude of the corresponding component of the superposition. In FIG. 11E, if measurement circuit 1110 is applied, there is a probability $P=|a_0|^2$ of detector 1114(2) detecting occupancy of mode 1100(2) and a probability $P=|a_1|^2$ of detector 1114(6) detecting occupancy of mode 1100(6). In either case, measurement logic 1116 applies the same logic (e.g., Table 1) to the (classical) detector signal set to generate its logical output. The probability that measurement logic outputs a logical 0 is $|a_0|^2$, and the probability that measurement logic 1116 outputs a logical 1 is $|a_1|^2$.

Figure 12A:
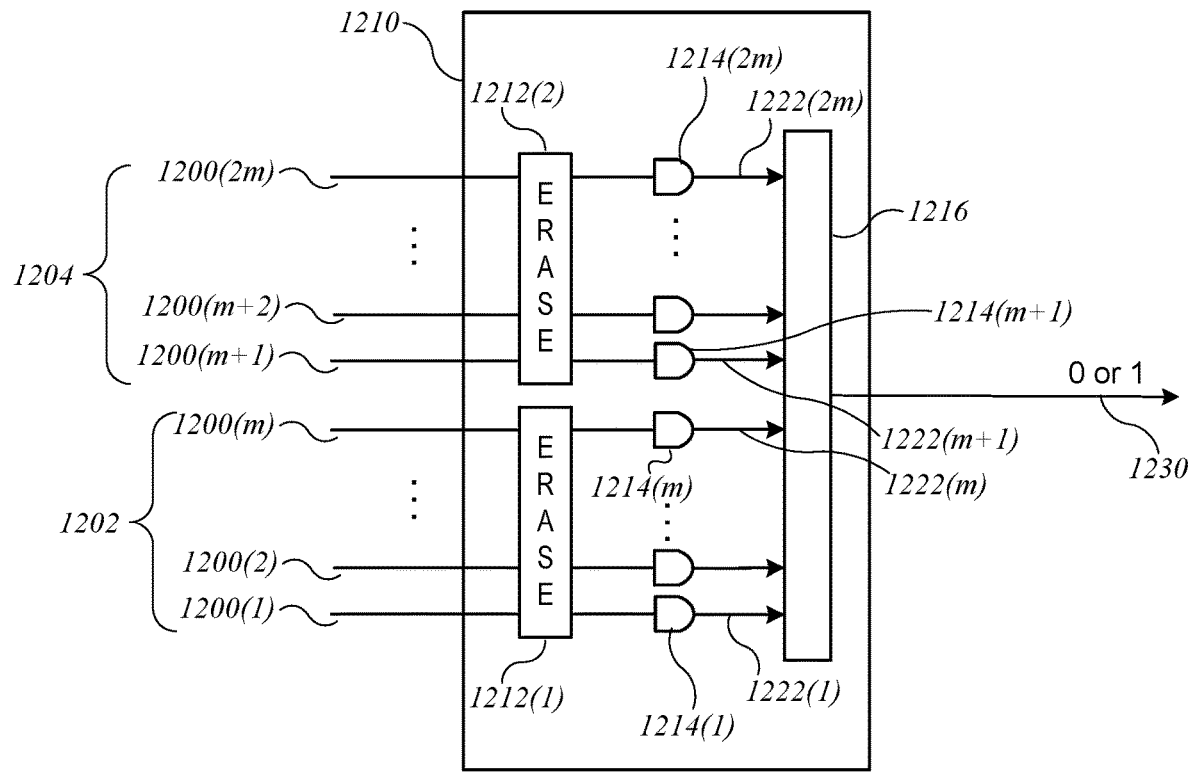
FIG. 12A shows another example of a system for performing a measurement on a multirail-encoded qubit according to some embodiments.
Figure 12B:
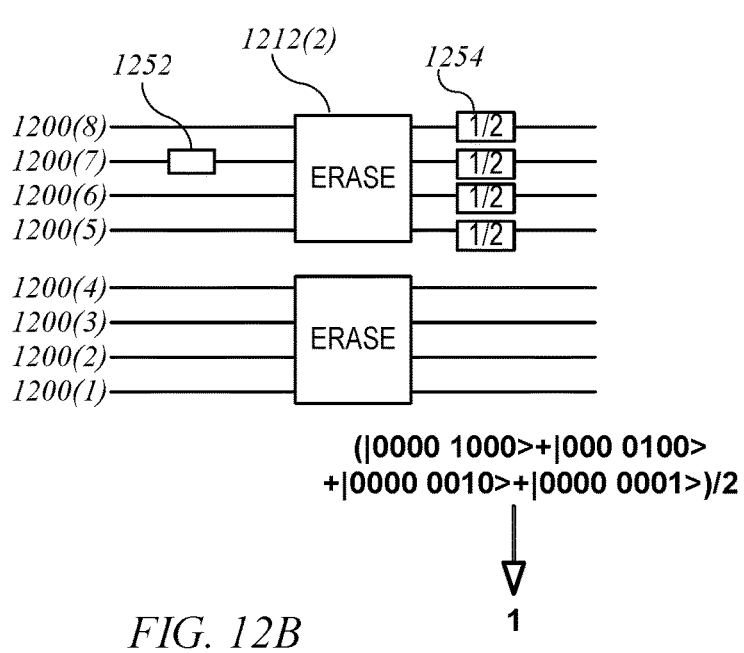
FIG. 12B shows an example of a measurement outcome using the system of FIG. 12A.

In the measurement circuit of FIG. 11A, it is possible to determine not only which band has an occupied mode but also which mode was occupied. In some instances, such as at the end of a quantum computation, the possibility of determining the specific occupied mode is inconsequential. In other instances, determining the specific occupied mode may affect the state of a larger system of which the qubit being measured is part (e.g., an ensemble of entangled qubits). Where this is the case, it may be desirable to measure in a manner that determines whether a band has an occupied mode while destroying (or erasing) information as to which mode(s) within the band are occupied. This can be done by performing a "mode-information erasure," or "MIE," operation defined such that, for any input quantum state where one mode within a band is occupied with 100% probability, the output quantum state is a state having equal probability of occupancy for any mode within the band. FIG. 12A shows an example of a system for performing a measurement with mode-information erasure on a multirail-encoded qubit according to some embodiments, and FIG. 12B shows an example of a measurement outcome using the system of FIG. 12A.

Figure 11E:
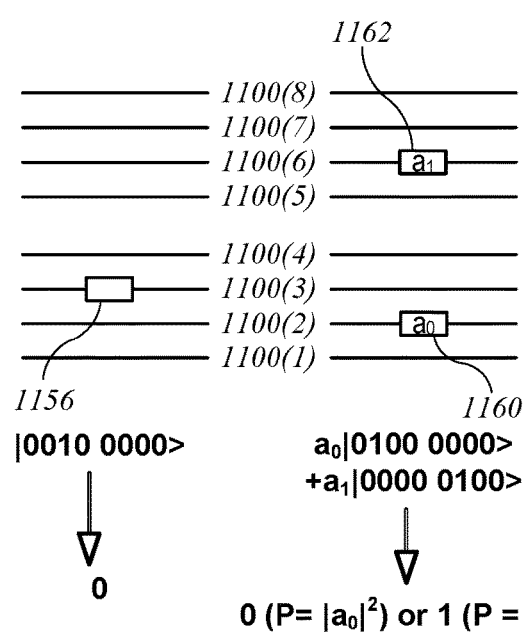

Shown in FIG. 12A are modes 1200 of an example multirail-encoded qubit, similar to modes 1000 of FIG. 10 or modes 1100 of FIG. 11. Occupancy of any one of modes 1200(1)-1200(m) (referred to collectively as band 1202) is mapped to qubit state $|0\rangle_L$, and occupancy of any one of modes 1200(m+1)-1200(2m) (referred to collectively as band 1204) is mapped to qubit state $|1\rangle_L$. A measurement circuit 1210 includes mode-information erasure (MIE) circuits 1212(1) and 1212(2), detectors 1214(1)-1214(2m), and measurement logic 1216.

MIE circuit 1212(1) is coupled to the m modes 1200(1)-1200(m) of band 1202. MIE circuit 1212(1) performs a unitary transformation on band 1202 (modes 1200(1)-1200(m)) that destroys information as to which (if any) of the modes of band 1202 is occupied while preserving information as to the number of occupied modes of band 1202. More specifically, after operation of MIE circuit 1212(1), the number of modes 1200(1)-1200(m) that are occupied is the same as the number of modes 1200(1)-1200(m) that were occupied prior to operation of MIE circuit 1212(1), but no information about which one(s) of modes 1200(1)-1200(m) was (were) initially occupied can be derived from knowledge of which one(s) of modes 1200(1)-1200(m) is (are) occupied in the final state. Similarly, MIE circuit 1212(2) is coupled to the m modes 1200(m+1)-1200(2m) of band 1204. MIE circuit 1212(2) performs a unitary transformation on band 1204 (modes 1200(m+1)-1200(2m)) that destroys information as to which (if any) of the modes of band 1204 is occupied while preserving information as to the number of occupied modes of band 1204. More specifically, after operation of MIE circuit 1212(2), the number of modes 1200(m+1)-1200(2m) that are occupied is the same as the number of modes 1200(m+1)-1200(2m) that were occupied prior to operation of MIE circuit 1212(2), but no information about which one(s) of modes 1200(m+1)-1200(m) was (were) initially occupied can be derived from knowledge of which one(s) of modes 1200(m+1)-1200(m) is (are) occupied in the final state. Each MIE circuit 1212 can implement various types of mode-information erasure operations, depending on the particular implementation of the qubit. For example, in some embodiments the mode-information erasure operation can be implemented using kth-order Hadamard transform (for m=$2^k$) or any other transfer matrix that destroys information as to which (if any) of the modes of band 1204 is occupied while preserving information as to the number of occupied modes of band 1204.

Each of detectors 1214(1)-1214(m) is coupled to one of the modes 1200(1)-1200(m) output from MIE circuit 1212(1), and each of detectors 1214(m+1)-1214(2m) is coupled to one of the modes 1200(m+1)-1200(2m) output from MIE circuit 1212(2). Similarly to detectors 1114 of FIG. 11A, each detector 1214 can be configured to determine whether the mode 1200 to which it is coupled is or is not occupied. The particular implementation depends on the nature of the modes. For instance, for some photonic implementations, detectors 1214 can be single-photon detectors. Depending on implementation, each detector 1214 can make a binary determination (mode is occupied or not) or generate an occupancy count (e.g., a number of photons detected). All of detectors 1214 can have the same implementation and configuration, and each detector 1214 can make its determination independently of the others. Detectors 1214(1)-1214(2m) report their respective determination results (e.g., as classical digital logic signals on paths 1222(1)-1222(m)) to measurement logic 1216.

Measurement logic 1216, which can be, e.g., a classical digital logic circuit, receives the 2m determination results as inputs and generates a logical output (classical 1 or 0) based on the results. Operation of measurement logic 1216 can be similar or identical to operation of measurement logic 1116 of FIG. 11A (described above). For example, measurement logic 1216 may receive a "1" or "0" signal from each detector indicating that occupancy was or was not detected by that detector. Measurement logic 1216 can decode the set of detector signals (using classical digital logic) to determine the corresponding logical output and can output a signal indicating the logical output signal line 1230, which can be a classical digital signal path (e.g., voltage at a low level indicates logical 0, a high level indicates logical 1; other signaling conventions can be used).

In some embodiments, the difference between measurement circuit 1110 of FIG. 11A and measurement circuit 1210 of FIG. 12A is that detectors 1114(1)-1114(2m) of measurement circuit 1110 can provide information about which of input modes 1100(1)-1100(2m) was initially occupied, while (due to operation of MIE circuits 1212(1) and 1212(2)), detectors 1214(1)-1214(2m) cannot provide information about which of input modes 1200(1)-1200(2m) was initially occupied.

To further illustrate operation of measurement circuit 1210, reference is made to FIG. 12B. Similarly to FIGS. 11B-11E, FIG. 12B represents a physical state of a quantum system implementing a qubit and also shows the corresponding Fock state description and the corresponding measurement output by measurement circuit 1210. For purposes of illustration, FIG. 12B assumes m=4; other values can be substituted. FIG. 12B further assumes that a first band including modes 1200(1)-1200(4) is mapped to the logical 0 output and a second band including modes 1200(5)-1200(8) is mapped to the logical 1 output, but no particular mapping is required. As a visualization aid, a rectangle is used to indicate the mode(s) that is (are) occupied. In instances where the physical state of the quantum system corresponds to a superposition state, an amplitude label (a) is added inside the rectangle for each mode that contributes to the superposition.

In FIG. 12B, mode 1200(7) is shown as occupied (rectangle 1252) and all other modes are shown as unoccupied, signifying that the physical state of the quantum system implementing the qubit corresponds to occupancy of mode 1200(7). If measurement circuit 1210 is applied, MIE circuit 1212(2) erases the information that mode 1200(7) is occupied; accordingly, after operation of MIE circuit 1212(2), each of modes 1200(5)-1200(8) is occupied with an amplitude having equal magnitude (normalized to 1). In this example (rectangles 1254), all amplitudes happen to be equal to ½ (or $1/\sqrt{4}$). In other instances, the amplitudes associated with occupancy of mode 1200(j) can be $e^{i\alpha_j}/2$, where $\alpha_j$ is a mode-dependent phase angle.) MIE circuit 1212(1) erases occupancy information among modes 1200(1)-1200(4) in a similar manner to MIE circuit 1212(2). In this instance none of modes 1200(1)-1200(4) is occupied, so output modes 1220(1)-1220(4) are also vacuum modes. The quantum state after MIE circuits 1212(1), 1212(2) can be represented by $$|\Psi\rangle = \tfrac{1}{2}(|0000\ 1000\rangle + |0000\ 0100\rangle + |0000\ 0010\rangle + |0000\ 0001\rangle). \quad (22)$$

This quantum state results in one of detectors 1214(5)-1214(8) detecting an occupied mode; it is equally probable (P=¼) that any one of detectors 1214(5)-1214(8) will be the detector that detects the occupied mode. Measurement logic 1216 receives the outputs from detectors 1214(1)-1214(8), which can be a set of classical binary-logic signals as described above. The particular set of classical binary-logic signals received will indicate which of detectors 1214(5)-1214(8) detected an occupied mode, but the fact of which one of detectors 1214(5)-1214(8) detected an occupied mode provides no information as to which one of modes 1200(5)-1200(8) was initially occupied. In response to the outputs from detectors 1214(1)-1214(8), measurement logic 1216 outputs (e.g., according to Table 1) a logical 1.

As these examples show, a multirail-encoded qubit can be measured in a similar manner as a dual-rail-encoded qubit, and the result of measurement on a quantum system having multirail-encoded qubits can provide the same information as a measurement on a quantum system having dual-rail-encoded qubits. While the examples shown assume a balanced multirail encoding, those skilled in the art with access to the present disclosure will appreciate that similar measurement systems can be implemented for unbalanced multirail encodings.

3. A PHOTONIC IMPLEMENTATION OF MULTIRAIL-ENCODED QUBITS

As noted above, multirail-encoded qubits can be implemented in a variety of physical systems. This section focuses on implementation of multirail-encoded qubits in a photonic quantum computing device in which spatiotemporal modes of a photon are determined according to which one of a finite set of discrete waveguides the photon is propagating in (within a particular time interval). Those skilled in the art with access to the present disclosure will appreciate that modes defined by any appropriate set of degrees of freedom, e.g., frequency modes, temporal modes, and the like, can be used without departing from the scope of the present disclosure. Further, multirail-encoded qubits can be implemented in other systems, such as ion trap systems or neutral atom systems, using appropriate mode-coupling techniques.

3.1. Photonic Qubits with Multirail Encoding

Figure 13:
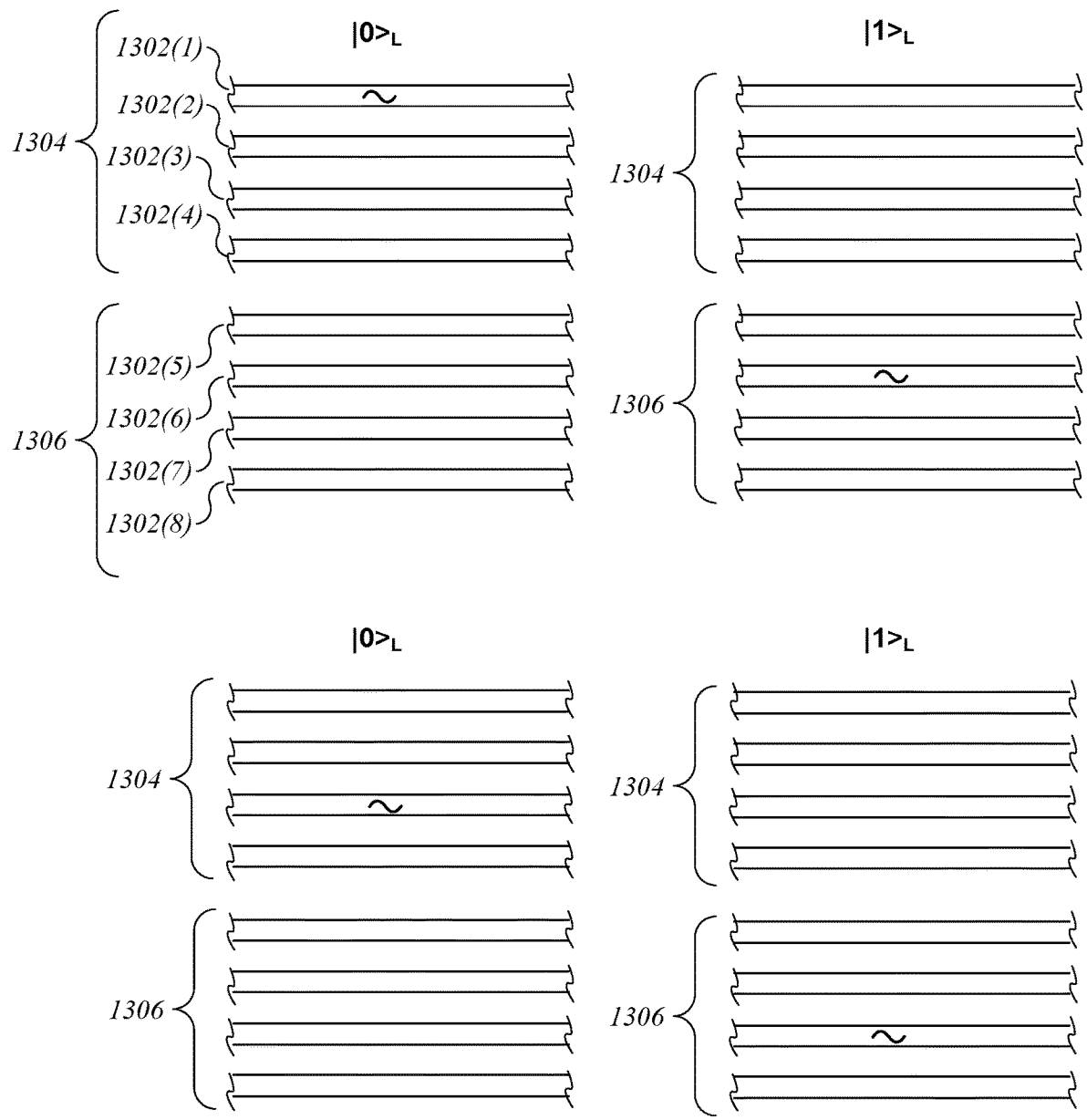
FIG. 13 shows examples of qubits according to an implementation of multirail encoding for a photonic qubit that can be used in some embodiments.

As described above, in a dual-rail encoding using spatial or spatiotemporal modes for a photon, a qubit can be encoded using a pair of waveguides, where each waveguide defines a spatial or spatiotemporal mode for a photon. In some embodiments of multirail encoding, a set of four or more waveguides (each of which defines a mode) can be used to implement a multirail encoding for a qubit. FIG. 13 shows examples of system states according to an implementation of multirail encoding for a photonic qubit that can be used in some embodiments. In this example, the multirail encoding has m=4, i.e., each band includes four modes (where each mode is defined by a different waveguide 1302); it should be understood that other values of m can be used. In some embodiments, m is a power of 2, which can simplify certain elements of the system, e.g., the implementation of mode-information erasure using a network of beam splitters. However, m can have any value (m≥2) as desired. In this example the quantum system has eight modes (more generally 2m modes) implemented as waveguides 1302(1)-1302(8). As in FIG. 1, portions of the waveguides are shown. Waveguides 1302(1)-1302(4) define modes in a first band 1304, which in this example is mapped to the $|0\rangle_L$ state of the qubit, and waveguides 1302(5)-1302(8) define modes in a second band 1306, which in this example is mapped to the $|1\rangle_L$ state of the qubit. FIG. 13 shows examples of the qubit with a photon (wavy line) occupying different waveguides; in each case the corresponding logical state of the qubit is indicated.

It should be understood that the particular physical arrangement of waveguides can be varied. For instance, FIG. 13 shows the waveguides as parallel straight segments, with the waveguides 1302(1)-1302(4) defining the modes of band 1304 occupying adjacent positions and the waveguides 1302(5)-1302(8) defining the modes of band 1306 occupying adjacent positions. This arrangement is not required. The waveguides need not be parallel, and waveguides defining different modes of the same band need not be neighbors. In some embodiments the arrangement of waveguides can be selected based on the desired set of quantum operations to be implemented: waveguides corresponding to modes that couple with each other can be arranged so that they are near each other, regardless of the particular encoding. As with other examples herein, a balanced multirail encoding is shown, but unbalanced multirail encodings can also be implemented in a similar manner.

3.2. Photon Source for Multirail-Encoded Qubits

Multirail-encoded photonic qubits as shown in FIG. 13 can be prepared in a known logical state by using a photon source to emit a single photon into any one of the waveguides that define modes that are mapped to the band that corresponds to the desired logical state. For instance, referring to FIG. 13, a qubit in the $|0\rangle_L$ state can be prepared by emitting a single photon into any one of waveguides 1302(1)-1302(4), or a qubit in the $|1\rangle_L$ state can be prepared by emitting a single photon into any one of waveguides 1302(1)-1302(4). In some embodiments, single-photon sources can be used. For instance, the photon source can be a heralded single photon source as described above.

As noted above, the behavior of single-photon sources may be non-deterministic, with a single photon being generated with probability p, where p<1. For photon sources of this type, multirail encoding provides the ability to increase the probability of successfully preparing a qubit in a desired state. For instance, referring to FIG. 13, suppose it is desired to prepare a qubit in the $|0\rangle_L$ state. This can be done by introducing a photon into any one of waveguides 1302(1)-1302(4). If four non-deterministic single-photon sources are used, with one photon source coupled to each of waveguides 1302(1)-1302(4), and if each photon source has probability p of generating a photon (for a given pulse or clock cycle), then the probability of obtaining at least one photon in at least one of waveguides 1302(1)-1302(4) is $1-(1-p)^4$.

For a variety of reasons, it may be desirable to avoid preparing qubits with photons propagating in more than one waveguide of a band. Accordingly, in some embodiments, blocking logic may be used to ensure that only one waveguide within a band propagates a photon. To facilitate the blocking logic, the photon sources may be implemented using "heralding" single-photon generators. These can be photon sources that generate photons in pairs, with the two photons propagating into two different waveguides. One photon (referred to herein as the "heralding" photon) can be detected, and detection of the heralding photon indicates that the other photon (referred to herein as the "propagating" photon) is propagating in another waveguide. Absence of a heralding photon similarly indicates absence of a propagating photon. In some embodiments, blocking switches, examples of which are described below, can be placed on the propagating waveguide, and based on the presence or absence of heralding photons, the states of the blocking switches can be set to allow a propagating photon to pass through exactly one of the waveguides.

Figure 14:
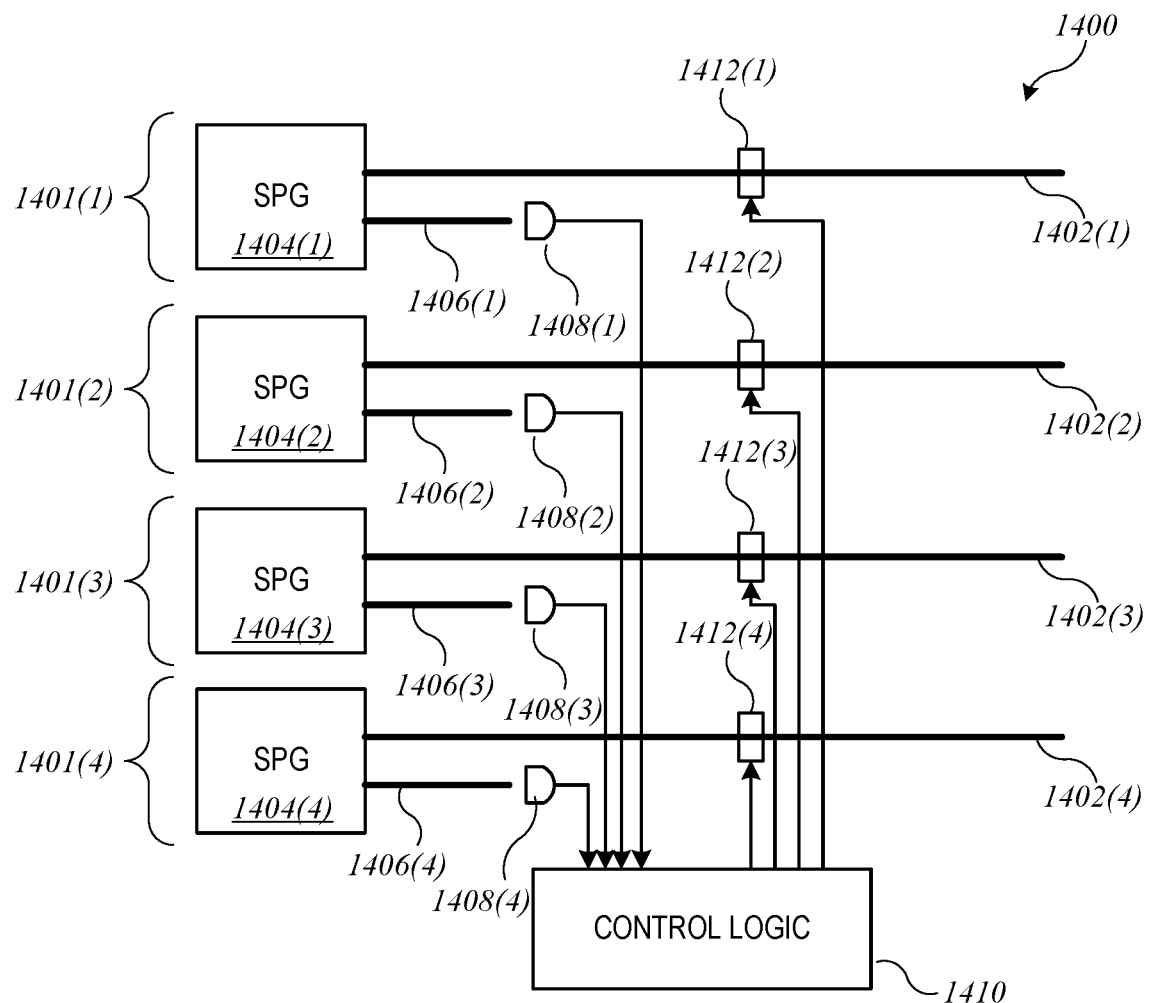
FIG. 14 shows an example of a photon generation circuit that can be used in some embodiments.

FIG. 14 shows an example of a photon generation circuit 1400 that can be used in some embodiments to introduce a photon into exactly one of a group of waveguides 1402(1)-1402(4). In this example, four waveguides are shown; the number can be varied as desired. Photon generation circuit 1400 can be used in a number of use-cases. As one example of a use-case, it may be desirable to prepare a qubit in a known logic state (e.g., the $|0\rangle_L$ state). In this use-case, for a multirail encoding having m=4, waveguides 1402(1)-1402(4) can correspond to one band of the multirail-encoded qubit (e.g., the band that maps to the $|0\rangle_L$ state) while four other waveguides (which are not shown in FIG. 14) are coupled to a vacuum (zero-photons) state. As another example of a use-case, it may be desirable to prepare a qubit in an unknown logic state. In this use-case, for a multirail encoding having m=2, two of waveguides 1402(1)-1402(4) can correspond to one band of a multirail-encoded qubit while the other two correspond to the other band. It is to be understood that in any use-case, m can be varied as desired, and photon generation circuit 1400 can be implemented with any numbers of waveguides.

For convenience of description, a photon is considered to enter a waveguide at an "upstream" (or input) end and propagate in a "downstream" direction toward the other (output) end of the waveguide. (As drawn in FIG. 14, the input (output) ends of waveguides 1402(1)-1402(4) happen to correspond to the left (right) ends in the drawing; however, no particular physical arrangement of waveguides is required, and the downstream or upstream direction of any given waveguide may correspond to any direction in physical space.) Photon generation circuit 1400 can produce a single photon at the downstream end of exactly one of waveguides 1402(1)-1402(4).

Photon generation circuit 1400 includes four "channels" 1401(1)-1401(4) (one channel for each of waveguides 1402(1)-1402(4)). Each channel 1401(i) includes, in addition to waveguide 1402(i), a heralding single photon generator (SPG) 1404(i), a heralding waveguide 1406(i), a single-photon detector 1408(i), and a blocking switch 1412(i).

Each heralding SPG 1404(i) can be a non-deterministic photon source that generates either a pair of photons (with probability p) or no photons (with probability 1−p). For example a heralded single photon source as described above can be used. Additional examples can be found in U.S. Pat. No. 10,372,014, issued Aug. 6, 2019, which is incorporated by reference herein.

Each blocking switch 1412($i$) can be operative in response to a control signal to either permit or block propagation of a photon through the corresponding waveguide 1402(1). Blocking switches 1412 can each be implemented using any technique that results in a photon being selectably blocked or allowed to propagate through a waveguide. For example, a blocking switch can be implemented using a Mach Zehnder interferometer and "dumping" one mode (e.g., by making one waveguide a dead end). As another example, a blocking switch can be implemented by providing dopants in a region of the waveguide that cause the photon to be absorbed or not as a function of an applied voltage. Other implementations may also be used. In some embodiments, blocking switches 1412 can be "normally blocking" such that photons are blocked unless a signal (e.g., a voltage) to permit photon propagation is actively applied. In other embodiments, blocking switches 1412 can be "normally open" such that photons propagate unless a signal to block photon propagation is actively applied.

Other components of each channel, including waveguides and detectors, can be similar to components described above.

In each of channels 1401($i$), the heralding SPG 1404($i$) can be coupled to the propagation waveguide 1402($i$) and to the heralding waveguide 1406($i$). The heralding waveguide 1406($i$) can be coupled to the single-photon detector 1408($i$) which provides an input signal to a (classical) control logic circuit 1410 that is shared across all of the channels 1401 (1)-1401(4). Classical control logic circuit 1410 can provide a control signal to control the blocking switches 1412(1)-1412(4) based on the input signals received from the single photon detectors 1408(1)-1408(4). For instance, blocking switches 1412(1)-1412(4) can be controlled by control logic circuit 1410 to provide that only one of waveguides 1402 (1)-1402(4) propagates a photon at any given time. Examples of suitable control logic operations are described below.

In some embodiments, classical control logic 1410 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, the detectors 1408($i$) are coupled to an off-chip classical computer having a processor and a memory, and the off-chip classical computer is programmed to perform some or all of the operations of classical control logic 1410. In some embodiments, classical control logic 1410 and/or the classical computer receives information from each detector 1408($i$) indicating whether the detector 1408($i$) detected a photon (and optionally how many). Stated another way, control logic 1410 and/or the classical computer receives the detection pattern for a detection operation from detectors 1408($i$) (e.g., in the form of analog detection signals or digital detection signals depending on the implementation of detectors 1408(1)). Control logic 1410 and/or the classical computer executes logic that configures switches 1412($i$) to either block the photons or pass the photons to a downstream photonic device. In some embodiments, control logic 1410 and/or the classical computer does so by using hardwired digital logic and/or by referencing a look-up table (e.g., stored in the memory) to determine which one or more of switches 1412(1) to activate.

In operation, at a given time, all of heralding SPGs 1404(1)-1404(4) can be pulsed with a "triggering" pulse, which can be, e.g., a classical electronic signal or pump laser signal. In response to the triggering pulse, each heralding SPG 1404 operates to generate a photon pair, an operation that succeeds with probability p. Assuming the heralding SPGs 1404(1)-1404(4) operate independently of each other, the probability that at least one of heralding SPGs 1404(1)-1404(4) generates a photon pair is $1-(1-p)^4$. In some instances, two or more of heralding SPGs 1404(1)-1404(4) may each generate a photon pair.

In each instance where a particular heralding SPG 1404($i$) generates a photon pair, one photon (designated as the propagating photon) can enter the corresponding waveguide 1402($i$); the other photon (designated as the heralding photon) can enter the corresponding heralding waveguide 1406 ($i$). Single-photon detector 1408($i$) can detect the heralding photon from its heralding waveguide 1406(1). In some embodiments, for each triggering pulse, each of single-photon detectors 1408(1)-1408(4) can output a classical logic signal indicating whether a heralding photon was detected.

Classical control logic circuit 1410 receives the logic signals from single-photon detectors 1408(1)-1408(4) and determines which (if any) of single-photon detectors 1408 (1)-1408(4) detected a heralding photon. Based on this determination, classical control logic circuit 1410 can generate a control signal to each of blocking switches 1412(1)-1412(4). The control signals can set the state of each blocking switch 1412(1)-1412(4) to either permit or block any photon that may be propagating in the corresponding one of waveguides 1402(1)-1402(4). Control logic circuit 1410 can implement decision logic such that not more than one of blocking switches 1412(1)-1412(4) is set to permit photon propagation at any given time. In some embodiments, control logic circuit 1410 can also output a (classical) success/failure signal indicating whether a propagating photon has been generated. This signal can be used, e.g., in implementing error correction within the larger quantum computing system.

In some embodiments, control logic circuit 1410 can implement the following logic, depending on how many of single-photon detectors 1408(1)-1408(4) signal a heralding photon. If none of single-photon detectors 1408(1)-1408(4) detects a heralding photon, it is assumed that no photons are propagating on any of waveguides 1402(1)-1402(4), and generation of a photon can be considered to have failed. In some embodiments, this condition can result in classical control logic circuit 1410 setting all of blocking switches 1412(1)-1412(4) to the blocking state so that no photons are propagated.

If exactly one of single-photon detectors 1408(1)-1408(4) detects a heralding photon, it is assumed that exactly one photon is propagating in exactly one of waveguides 1402 (1)-1402(4). In some embodiments, this condition can result in classical control logic circuit 1410 setting the state of blocking switches 1412(1)-1412(4) such that photon propagation is permitted only on the one of waveguides 1402(1)-1402(4) that corresponds to the one of single-photon detectors 1408(1)-1408(4) that detected a heralding photon. For instance, if only single-photon detector 1408(1) detects a heralding photon, control logic 1410 can set blocking switch 1412(1) to permit photon propagation and set blocking switches 1412(2)-1412(4) to block photon propagation.

If two or more of single-photon detectors 1408(1)-1408 (4) detect a heralding photon, it is assumed that photons are propagating in two or more of waveguides 1402(1)-1402(4).

In some embodiments, this condition can result in classical control logic circuit 1410 selecting exactly one of the waveguides 1402(1)-1402(4) for which a corresponding heralding photon was detected and setting the state of blocking switches 1412(1)-1412(4) such that photon propagation is permitted only on the selected one of waveguides 1402(1)-1402(4). The particular selection logic can be varied as desired. For instance, the signals from single-photon detectors 1408(1)-1408(4) can be represented as an ordered string of (classical) bits with the bit value set to one if a photon was detected and to zero otherwise, and classical control logic circuit 1410 can use the first nonzero bit in the ordered string to select the corresponding blocking switch 1412 as the blocking switch that permits photon propagation. Other decision rules can be substituted.

It should be appreciated that FIG. 14 represents a schematic illustration of a photon generation circuit. The physical layout can be varied as desired. Any number of channels can be provided. As noted above, photon generation circuit 1400 can be used in some embodiments to prepare a multirail-encoded qubit in a known logic state (e.g., by providing photon generation circuit 1400 with a respective channel 1401 coupled to each waveguide of one band and coupling the waveguides of the other band to a vacuum state) and in some embodiments to prepare a multirail-encoded qubit in an unknown logic state (e.g., by providing photon generation circuit 1400 with a respective channel 1401 coupled to each waveguide of both bands). The length of waveguides 1402 between heralding SPGs 1404 and blocking switches 1412 should be sufficiently long that control logic 1410 can receive its input signals and set the state of blocking switches 1412 based on the detected heralding photon(s) before the propagating photon(s) reach the location of the blocking switch; however, the particular layout and location of the waveguides can be varied.

Figure 15:
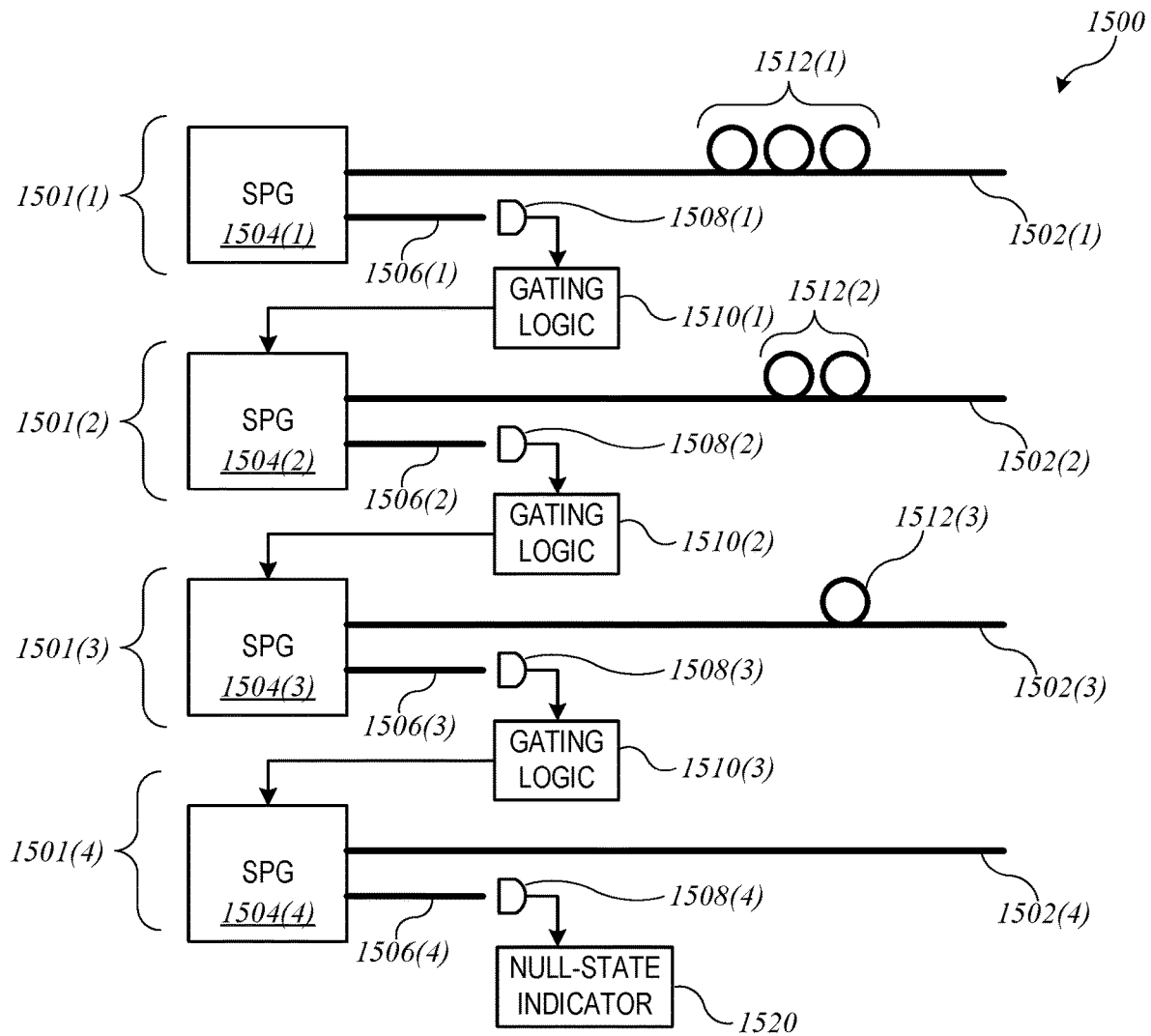
FIG. 15 shows another example of a photon generation circuit that can be used in some embodiments.

Other configurations can also be used. For instance, FIG. 15 shows another example of a photon generation circuit 1500 that can be used in some embodiments to introduce a photon into exactly one of the waveguides of a band. In this example, the multirail encoding has m=4, and waveguides 1502(1)-1502(4) are the waveguides of a band. (Again, m can be varied as desired.) Similarly to photon generation circuit 1400, photon generation circuit 1500 can produce a single photon in exactly one of waveguides 1502(1)-1502 (4). In some embodiments, photon generation circuit 1500 can be used in any of the use-cases described above with reference to FIG. 14.

Photon generation circuit 1500 includes four "channels" 1501(1)-1501(4) (one channel for each of waveguides 1502 (1)-1502(4)). Each channel 1501(i) includes, in addition to waveguide 1502(i), a heralding single photon generator (SPG) 1504(i), a heralding waveguide 1506(i), and a single-photon detector 1508(i). In addition, some or all of channels 1501(1)-1501(4) may include a gating logic circuit 1510(i); in this example, gating logic circuits 1510(1)-1510(3) are shown. In addition, some or all of channels 1501(1)-1501(4) may include delay elements 1512(i); in this example, delay elements 1512(1)-1512(3) are shown for channels 1501(1)-1501(3). Each heralding SPG 1504(i) can be a non-deterministic photon source that generates either a pair of photons (with probability p) or no photons (with probability 1–p); the implementation can be similar to that described above with reference to FIG. 14. Delay elements 1512(i) can be implemented, e.g., as additional lengths of waveguide. Since photons propagate at a constant speed, the length of waveguide required to introduce a specific amount of delay can be determined.

Operation of channels 1501(1)-1501(4) can be coordinated using a daisy-chain model, in which operation of each channel is triggered or not based on the outcome of a previous channel. Specifically, at a given time $t_1$, a first heralding SPG 1504(1) can be pulsed with a triggering pulse. In response, heralding SPG 1504(1) operates to generate a photon pair, an operation that succeeds with probability p. Similarly to heralding SPGs 1404 described above, if heralding SPG 1504(1) generates a photon pair, the propagating photon can enter waveguide 1502(1) and the heralding photon can enter heralding waveguide 1506(1). Single-photon detector 1508(1) is operated to detect the heralding photon at an appropriate time after $t_1$. Single-photon detector 1508(1) can output a classical logic signal indicating whether a heralding photon was detected or not detected. Gating logic 1510(1) can receive the signal from single-photon detector 1508(1) and determine whether to generate a triggering pulse for channel 1501(2). In some embodiments, gating logic 1510(1) can implement logic such that the triggering pulse for channel 1501(2) is generated if and only if single-photon detector 1508(1) does not report detection of a heralding photon responsive to the triggering pulse at heralding SPG 1504(1). For instance, in some embodiments, gating logic 1510(1) can be triggered at time $t_1$ to listen for a signal from single-photon detector 1508(1) during a "listening" time interval after $t_1$. The listening interval can be defined to account for the time required for a photon to travel the length of heralding waveguide 1506(1) and for any latency associated with operation of single-photon detector 1508(1) or other components, as well as for time jitter that may be present in the system. If single-photon detector 1508(1) does not report a detected photon during the listening interval, then gating logic 1510(1) can generate a triggering pulse for channel 1501(2). If single-photon detector 1508(1) reports a detected photon during the listening interval, then gating logic 1510 (1) can suppress the triggering pulse for channel 1501(2).

Upon receipt of the triggering pulse from gating logic 1510(1) (e.g., at a time $t_2$), channel 1501(2) can operate in the same manner as channel 1501(1), such that gating logic 1510(2) generates a triggering pulse for channel 1501(3) if and only if no heralding photon is reported by single-photon detector 1508(2). Channel 1501(3) in its turn operates in the same manner, and so on to the end of the daisy chain. Channel 1501(4), or the last channel in the daisy chain, can include a null-state indicator circuit 1520 instead of a gating logic circuit. In some embodiments, null-state indicator circuit 1520 can generate a "null" signal indicating that no photon was generated in the event that heralding SPG 1504(4) (or the last heralding SPG in the daisy chain) received a triggering pulse but single-photon detector 1508 (4) did not report a detected heralding photon. The logic can be similar or identical to gating logic circuits 1510, except that in this case the output pulse would be a null signal. The null signal (or its absence, indicating success) can be used, e.g., in implementing error correction within a quantum computing system.

As a result of the daisy-chain configuration, photons generated by different ones of heralding SPGs 1504(1)-1504 (4) are generated at different times relative to the initial triggering pulse to heralding SPG 1504(1) (time $t_1$). In some embodiments, e.g., where the modes have a temporal component, such time differences may be undesirable. Accordingly, as shown in FIG. 15, delay elements 1512 can be introduced into different channels 1501 to compensate for the time differences. The delay added by each delay element can be selected such that a propagating photon produced by any one of channels 1501 can be expected to reach a downstream end of its waveguide 1502 at the same time (relative to $t_1$) regardless of which channel 1501 produced the photon. In the example shown, channel 1501(1) operates first, so delay element 1512(1) is the longest; delay element 1512(2) is one "unit" shorter (where the unit can correspond to the difference between times $t_1$ and $t_2$), and delay element 1512(3) is one unit shorter than delay element 1512(2). In this example, a delay element is not added to the last channel 1501(4).

It should be appreciated that FIG. 15 represents a schematic illustration of the circuit, and the physical layout can be varied as desired. Any number of channels can be operated in a daisy-chain fashion as described, and temporal information indicative of which heralding SPG generated a photon can be obscured, e.g., by introducing delays in the manner shown. In this example, a larger number of channels may correlate with a longer time interval between preparing successive qubits as compared to the example of FIG. 14.

In some embodiments using non-deterministic single photon generators arranged in channels (such as circuits 1400 and 1500), the theoretical probability of successfully producing a single photon in one of the output waveguides is $1-(1-p)^c$, where p is the probability of one channel producing a photon and c is the number of channels. In practice, the actual probability may be different, e.g., due to various inefficiencies in components of the circuit. Regardless of the specific probability, those of ordinary skill in the art with access to this disclosure will appreciate that increasing the number of channels can increase the probability of successfully producing a photon in one of the waveguides within a band for a multirail-encoded qubit. Thus, a multirail encoding may support more efficient generation of initial qubit states as compared to a dual-rail encoding.

3.3. Measurement of Photonic Multirail Qubits

In some embodiments, the state of a multirail-encoded qubit implemented using photons in waveguides can be measured in the computational basis (also referred to as a "Z measurement") or in a rotated basis (also referred to as an "X measurement").

Figure 16:
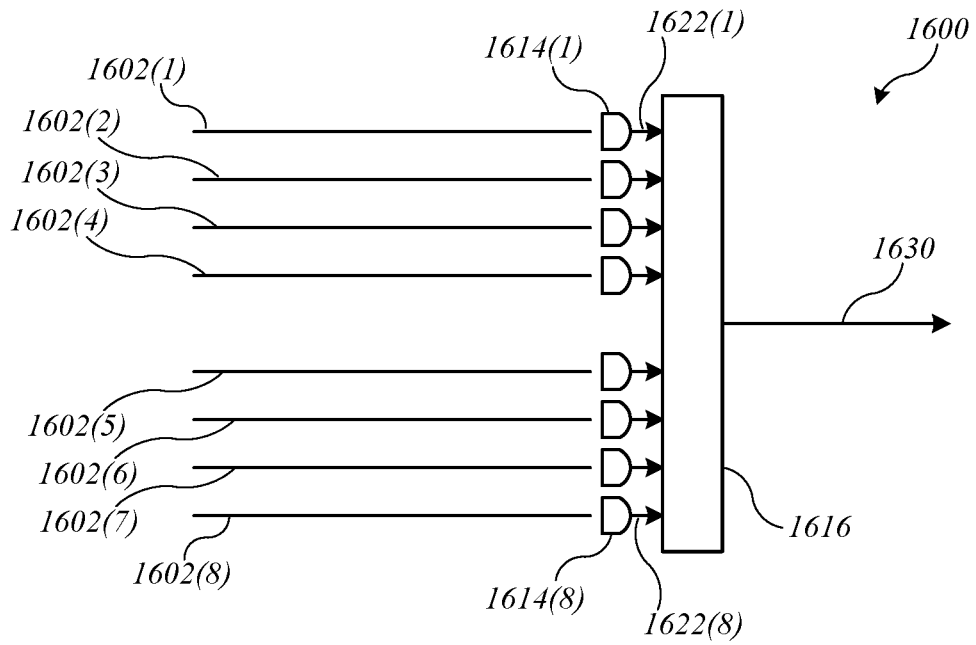
FIG. 16 shows an example of a Z measurement circuit for a photonic multirail-encoded qubit according to some embodiments.

A Z measurement can be implemented similarly to the general example of FIG. 11A above. FIG. 16 shows an example of a Z measurement circuit 1600 for a photonic multirail-encoded qubit according to an embodiment. In this example, m=4; however, the number of modes per band can be any integer m≥2. Waveguides 1602(1)-802(4) define modes in a first band 1604, and waveguides 1602(5)-802(8) define modes in a second band 1606. A multirail encoding is defined such that occupancy of any one of waveguides 1602(1)-802(4) in band 1604 is mapped to the $|0\rangle_L$ state of a qubit, and occupancy of any one of waveguides 1602(5)-802(8) in band 1606 is mapped to the $|1\rangle_L$ state of the qubit. Single-photon detectors 1614(1)-814(8) are coupled to waveguides 1602(1)-802(8), respectively. As noted above, the particular type of detector can be chosen to be any type of single photon or number resolving photon detector, e.g., superconducting nanowire photon detectors (SNSPD), transition edge sensors (TES), a charge integration photon detector (CIPD), single photon avalanche diodes (SPAD), avalanche photodiode (APD), and the like. Each single-photon detector 1614 can make a binary determination (photon is detected in the waveguide or not) or generate an occupancy count (e.g., number of photons detected). All of detectors 1614 can have the same implementation and configuration, and each detector 1614 can make its determination independently of the others. Detectors 1614(1)-814(8) report their respective determination results (e.g., as classical digital logic signals on paths 1622(1)-822(8)) to measurement logic 1616. Measurement logic 1616, which can be, e.g., a classical digital logic circuit similar to measurement logic 1116 described above, receives the 8 determination results as inputs and determines, based on the results, whether to output a logical 0 or logical 1 signal. For example, measurement logic 1616 may receive a "1" or "0" signal from each detector indicating that occupancy was or was not detected by that detector. Measurement logic 1616 can decode the set of detector signals (using classical digital logic, e.g., via one or more OR gates, XOR gates, AND gates, NAND gates, etc.) in the manner described above with reference to measurement logic 1116 of FIG. 11A to generate a classical logical output on output signal line 1630, which can be a classical digital signal path.

Figure 17:
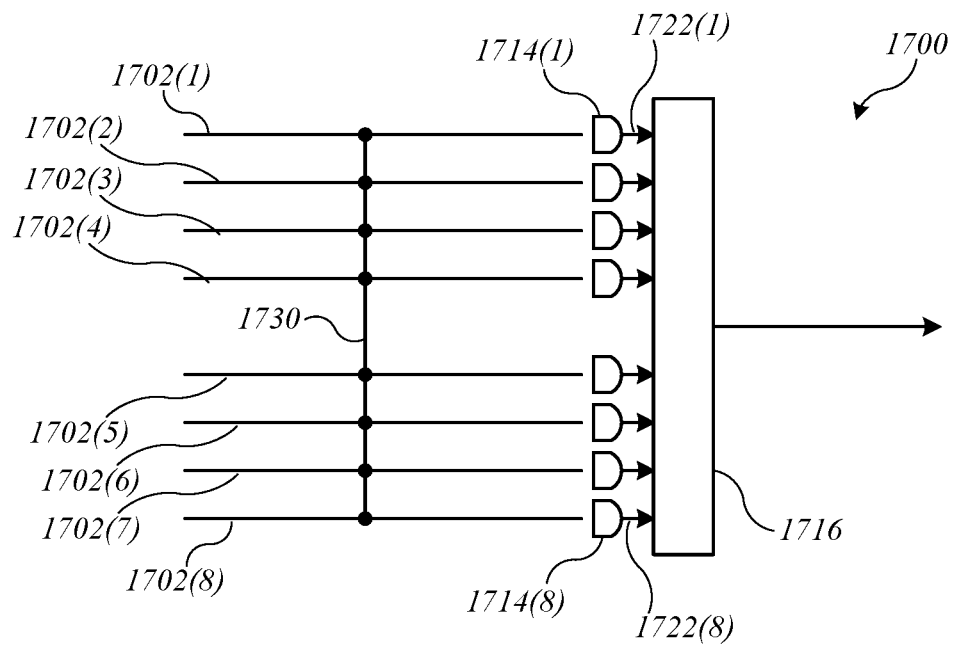
FIG. 17 shows an example of an X measurement circuit for a photonic multirail-encoded qubit according to some embodiments.

FIG. 17 shows an example of an X measurement circuit 1700 for a photonic multirail-encoded qubit according to an embodiment. In this example, m=4; however, the number of modes per band can be any integer m≥2. Waveguides 1702(1)-1702(4) define modes in a first band 1704, and waveguides 1702(5)-1702(8) define modes in a second band 1706. A multirail encoding is defined such that occupancy of any one of waveguides 1702(1)-1702(4) in band 1704 is mapped to the $|0\rangle_L$ state of a qubit, and occupancy of any one of waveguides 1702(5)-1702(8) in band 1706 is mapped to the $|1\rangle_L$ state of the qubit. Single-photon detectors 1714(1)-1714(8) are coupled to waveguides 1702(1)-1702(8), respectively, similarly to single-photon detectors 1614(1)-814(8) of FIG. 16. Each single-photon detector 1714 can make a binary determination (photon is detected in the waveguide or not) or generate an occupancy count (e.g., number of photons detected). All of detectors 1714 can have the same implementation and configuration, and each detector 1714 can make its determination independently of the others. Detectors 1714(1)-1714(8) report their respective determination results (e.g., as classical digital logic signals on paths 1722(1)-1722(8)) to measurement logic circuit 1716. Implementation and operation of detectors 1714 and measurement logic circuit 1716 can be the same as that of detectors 1614 and measurement logic 1616 of FIG. 16.

The X measurement on a qubit is made in a "rotated" basis relative to the computational basis, in a manner that preserves the quantum state of any other systems that may be entangled with the qubit. In this example, the rotation is achieved by applying a mode-information erasure circuit 1730 across all of the modes prior to detectors 1714. As described above, a mode-information erasure circuit for a photonic quantum system can be implemented using a network of beam splitters.

It should be understood that measurement circuits 1600 and 1700 and their operation are illustrative, and variations and modifications are possible. For instance, while FIGS. 16 and 17 show examples where each band has four modes, the number of modes per band can be modified as desired, provided that all bands have the same number of modes. Further, while photonic systems are described in detail herein, those skilled in the art with access to this disclosure will appreciate that photonic systems are merely as an example, and measurement circuits 1600 or 1700 or similar circuits can be implemented in a variety of different types of quantum systems, not limited to photonic quantum systems.

4. MULTIRAIL BELL STATE GENERATOR

Figure 18:
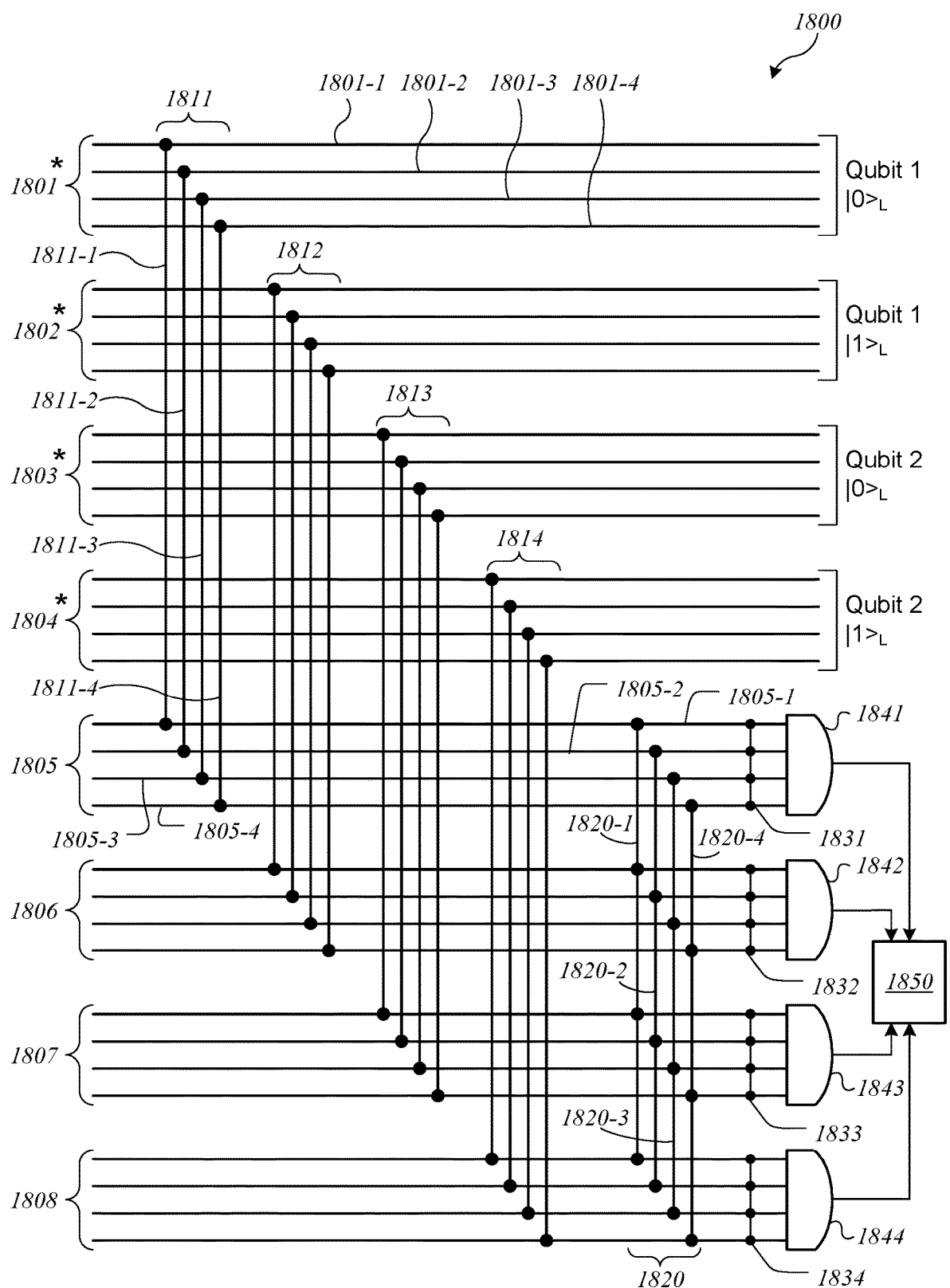
FIG. 18 shows a schematic circuit diagram of a multirail Bell state generator according to some embodiments.

In some embodiments, it is desirable to create entangled states of multirail qubits, such as a Bell state. In some embodiments, an entangled state of two multirail-encoded qubits can be created using a Bell sate generator. FIG. 18 shows a schematic circuit diagram of a multirail Bell state generator 1800 according to an embodiment. Multirail Bell state generator 1800 implements the same quantum logic circuit as shown in FIG. 7, except that the qubits are multirail-encoded. In this example, the number of modes per band (m) is 4; other values of m can be used if desired.

In some embodiments, to generate a Bell state a single occupied mode can be generated in each of bands 1801-1804, while no occupied modes are present in bands 1805-1808. (To aid visualization, an asterisk is placed next to each band that has an occupied mode.) The occupied mode for each band 1801-1804 can be any one of the four modes in that band, independently of which mode of any other band is occupied. For instance, in some embodiments of a photonic implementation, each mode can be a waveguide, and a first instance of a photon generation circuit (e.g., photon generation circuit 1400 of FIG. 14 or photon generation circuit 1500 of FIG. 15) can be used to propagate a photon into one of the waveguides of band 1801, a second instance of a photon generation circuit can be used to propagate a photon into one of the waveguides of band 1802, a third instance of a photon generation circuit can be used to propagate a photon into one of the waveguides of band 1803, and a fourth instance of a photon generation circuit can be used to propagate a photon into one of the waveguides of band 1804. In other embodiments, other circuits or techniques may be used to generate one occupied mode somewhere among the four modes of each band.

For each mode in each occupied band (where "occupied band" is used as a convenient shorthand for "band having one occupied mode"), a coupling is performed with a different mode of one of the unoccupied bands (where "unoccupied band" is used as a convenient shorthand for "band having zero occupied modes"). In this example, a first "two-band coupler" 1811 couples modes of bands 1801 and 1805. Specifically, two-band coupler 1811 couples pairs of modes across two bands. More specifically, in the example shown, two-band coupler 1811 includes a first first-order mode coupler 1811-1 that couples mode 1801-1 of band 1801 and mode 1805-1 of band 1805, a second first-order mode coupler 1811-2 that couples mode 1801-2 of band 1801 and mode 1805-2 of band 1805, a third first-order mode coupler 1811-3 that couples mode 1801-3 of band 1801 and mode 1805-3 of band 1805, and a fourth first-order mode coupler 1811-4 that couples mode 1801-4 of band 1801 and mode 1805-4 of band 1805. Two-band couplers 1812, 1813, 1814 are similarly structured, with two-band coupler 1812 coupling each mode of band 1802 with a different mode of band 1806, multirail coupler 1813 coupling each mode of band 1803 with a different mode of band 1807, and multirail coupler 1814 coupling each mode of band 1804 with a different mode of band 1808. Each first-order mode coupler (e.g., mode couplers 1811-1 to 1811-4) has the property that if the input state is one occupied mode and one vacuum mode, the output is a state in which there is equal probability of either mode being occupied. The particular implementation of multirail couplers 1811-1814 can be varied. For example, each first-order mode coupler (e.g., mode couplers 1811-1 to 1811-4) can implement a first-order Hadamard transform. In some embodiments using a photonic implementation, each first-order mode coupler (e.g., mode couplers 1811-1 to 1811-4) can include a 50/50 beam splitter as described above. For other types of quantum systems, techniques appropriate to the quantum system may be used to couple each pair of modes of the two bands such that, after the coupling, the quantum system has equal probability of either mode in the pair being occupied.

It should be understood that two-band couplers 1811-1814 and the individual first-order mode couplers within two-band couplers 1811-1814 operate independently of each other and there is no constraint as to the order in which the first-order mode couplers are applied.

After operation of all two-band couplers 1811-1814, four of the bands are coupled using a four-band coupler 1820. The four bands so coupled can be selected to be one of the output bands from each of multirail couplers 1811-1814. In the example in FIG. 18, bands 1805-1808 are selected. Four-band coupler 1820 performs couplings on sets of four modes, with each set of four modes including one mode from each of its four input bands. In this example, four-band coupler 1820 includes a first second-order mode coupler 1820-1 that couples mode 1805-1 of band 1805, mode 1806-1 of band 1806, mode 1807-1 of band 1807, and mode 1808-1 of band 1808, a second second-order mode coupler 1820-2 that couples a second mode from each of bands 1805-1808, a third second-order mode coupler 1820-3 that couples a third mode from each of bands 1805-1808, and a fourth second-order mode coupler 1820-4 that couples a fourth mode from each of bands 1805-1808. Each second-order mode coupler 1820-1 to 1820-4 has the property that if the input state is one occupied mode and three vacuum modes, the output is a state in which there is equal probability of any one mode being occupied. The particular implementation of four-band multirail coupler 1820 can be varied. For example, in a photonic implementation, each second-order mode coupler 1820-1 to 1820-4 can be an instance of a spreader or mode-information erasure (MIE) circuit as described above. For other types of quantum systems, techniques appropriate to the quantum system may be used to implement a mode-information erasure operation (e.g., a Hadamard transform) on each grouping of modes of the four bands. It should be understood that second-order mode couplers 1820-1 to 1820-4 operate independently of each other and there is no constraint as to the order in which the mode couplers are applied.

Analogously to the dual-rail Bell state generator of FIG. 7 described above, bands 1805-1808 of multirail Bell state generator 1800 can be used as heralding bands, on which measurements are performed to determine whether a Bell state was successfully generated for the other four bands 1801-1804. As described above with reference to FIG. 12A, prior to performing a measurement on a band of a multirail-encoded qubit, information indicating which mode of a band is occupied (assuming there is an occupied band) may be erased while preserving information as to the number of occupied modes in the band. Accordingly, prior to the measurement in Bell state generator 1800, a mode-information erasure operation is performed within each of bands 1805-1808. For example, MIE circuit 1831 can implement a Hadamard transform across the modes of band 1805, and so on. Other operations that destroy information about mode occupancy within a band (while preserving information about the total number of occupied modes within the band) can be substituted, including any examples of MIE or spreader circuits described herein. After MIE circuits 1831-1834, detectors 1841-1844 can be used to detect occupancy status of bands 1805-1808. For instance, in some embodiments of a photonic implementation, the modes can be waveguides, and a single-photon detector can be coupled to each waveguide. The (classical) output signals of the single-photon detectors on each mode within a band can be used to determine whether a photon was detected in the band, and that information can be reported (via a classical communication channel) to classical decision logic circuit 1850, which determines whether a Bell state is present on bands 1801-1804 and outputs a classical logic signal indicating the status (e.g., a binary indication of success or failure). In some embodiments, bands 1801-1804 can map to the logical states of two qubits, as indicated in FIG. 18. In some embodiments, decision logic circuit 1850 can operate similarly or identically to decision logic circuit 740 of FIG. 7, e.g., indicating success (a Bell pair on bands 1801-1804) if two of detectors 1841-1844 each detect a single occupied mode (which would indicate that two of bands 1805-1808 each include one occupied mode).

Bell state generator 1800 is non-deterministic, meaning that inputting four occupied bands and four unoccupied bands as described above results in a probability of generating a Bell state that is less than 1. The exact probability of success depends on the combination of occupied modes and can be at least 2/32, regardless of the number of modes per band. (That is, increasing the number of modes per band does not decrease the probability of generating a Bell state.)

It should be understood that Bell state generator 1800 and its operation are illustrative, and variations and modifications are possible. For instance, while FIG. 18 shows an example where each band has four modes, the number of modes per band can be modified as desired, provided that all bands have the same number of modes. Further, in the example shown in FIG. 18, the initial occupied bands are bands 1801-1804; however, other initial states can be used. Bell state generator 1800 operates on pairs of bands (bands 1801 and 1805, bands 1802 and 1806, bands 1803 and 1807, bands 1804 and 1808), and as long as one band of each coupled pair (but not both) is initially occupied, which bands are occupied makes no difference to the operation. Similarly, as long as one band of each pair (but not both) is measured in the manner described, which four bands are initially occupied makes no difference to the operation. Further, while photonic systems are described in detail herein, those skilled in the art with access to this disclosure will appreciate that photonic systems are merely as an example, and Bell state generator 1800 or similar circuits can be implemented in a variety of different types of quantum systems, not limited to photonic quantum systems.

Figure 19:
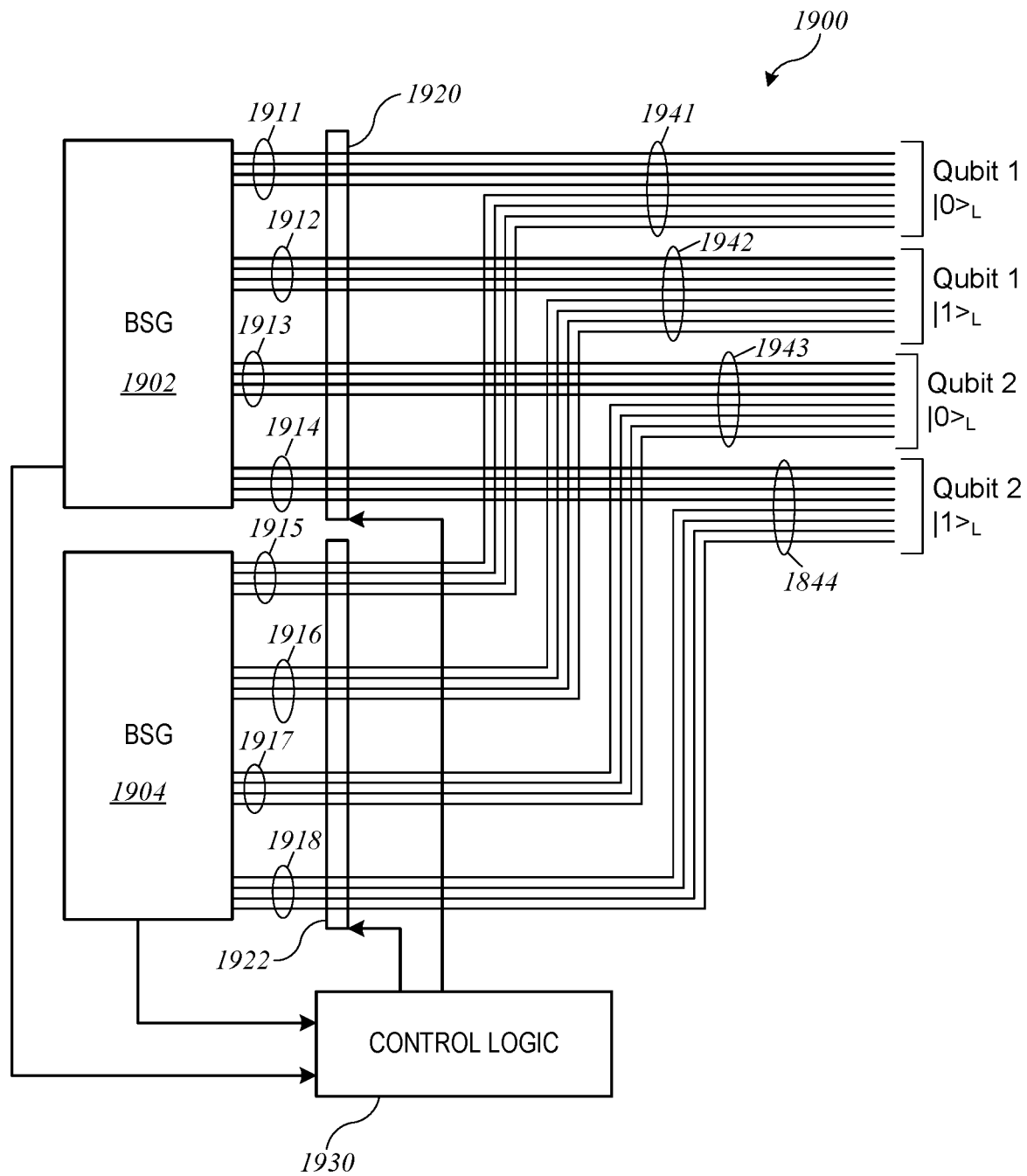
FIG. 19 shows an example of a multirail Bell state compositor circuit according some embodiments.

As noted above, Bell state generator 1800 is non-deterministic, and not every instance of operation is expected to produce a Bell state. To improve the probability of obtaining a Bell state, outputs of multiple Bell state generators can be combined. FIG. 19 shows an example of a multirail Bell state "compositor" circuit 1900 according to an embodiment. Multirail Bell state compositor circuit 1900 can combine outputs of two (or more) instances of Bell state generator 1800 to provide a pair of multirail-encoded qubits in a Bell state with higher probability than a single instance of Bell state generator 1800.

In this example, each of Bell state generators (BSG) 1902 and 1904 is an instance of multirail Bell state generator 1800, each operating on m=4 multirail-encoded qubits. In any given operation, either or both (or neither) of Bell state generators 1902 and 1904 may produce a Bell state. For Bell state generator 1902, a first m=4 multirail-encoded output qubit is defined on bands 1911 and 1912, and a second m=4 multirail-encoded output qubit is defined on bands 1913 and 1914. For Bell state generator 1904, a first m=4 multirail-encoded output qubit is defined on bands 1915 and 1916, and a second m=4 multirail-encoded output qubit is defined on bands 1917 and 1918. Each of Bell state generators 1902 and 1904 also produces a classical output signal indicating success or failure, e.g., using an instance of decision logic circuit 1850 of FIG. 18. A first blocking switch 1920 is placed downstream of Bell state generator 1902, and a second blocking switch 1922 is placed downstream of Bell state generator 1904. Blocking switches 1920 and 1922 can be implemented similarly to blocking switches described above with reference to FIG. 14 and can selectively allow or block passage of photons.

In some embodiments, classical control logic 1930 can be implemented as a digital logic circuit similar to other digital logic circuits described herein. In some embodiments, the decision logic circuits (or the detectors) of Bell state generators 1902 and 1904 are coupled to an off-chip classical computer having a processor and a memory, and the off-chip classical computer is programmed to perform some or all of the operations of classical control logic 1930. In some embodiments, classical control logic 1930 (and/or the classical computer) can receive the classical output signals indicating success or failure from Bell state generators 1902, 1904. Based on the received signals, control logic 1930 can determine whether at least one of Bell state generators 1902, 1904 succeeded or failed in generating a Bell state. If Bell state generator 1902 succeeded and Bell state generator 1904 failed, control logic 1930 can set the state of blocking switches 1920 and 1922 such that blocking switch 1920 allows photons to propagate in any of the modes in bands 1911-1914 while blocking switch 1920 blocks any photons that may be propagating in any of the modes in bands 1915-1918. Conversely, if Bell state generator 1904 succeeded and Bell state generator 1902 failed, control logic circuit 1920 can set the state of blocking switches 1920 and 1922 such that blocking switch 1922 allows photons to propagate in any of the modes in bands 1915-1918 while blocking switch 1920 blocks any photons that may be propagating in any of the modes in bands 1911-1914. In the case where both Bell state generator 1902 and Bell state generator 1904 succeeded, control logic circuit 1930 can implement decision logic to select one of blocking switches 1920 and 1922 to allow propagation while the other of blocking switches 1920 and 1922 blocks propagation. The particular selection logic can be varied as desired. For instance, the signals from Bell state generators 1902, 1904 can be represented as an ordered string of (classical) bits with the bit value set to one if a Bell state was detected and to zero otherwise, and classical control logic 1930 can use the first nonzero bit in the ordered string to select the corresponding blocking switch (either 1920 or 1922) as the blocking switch that permits photon propagation. Other decision rules can be substituted. In the case where neither Bell state generator 1902 nor Bell state generator 1904 succeeded, control logic circuit 1930 can set both blocking switches 1920 and 1922 to the blocking state so that no photons are propagated in any of the bands. In some embodiments, control logic circuit 1930 can also output a (classical) success/failure signal indicating whether a Bell state is being propagated. This signal can be used, e.g., in implementing error correction within a larger quantum computing system.

In this example, to combine the outputs of the two Bell state generators 1902, 1904 a "recoding" of the multirail encoding occurs, from an m=4 multirail encoding to an m=8 encoding. As shown, the recoding is such that two output qubits are defined. For the first qubit, occupancy of any mode in either of bands 1911 or 1915 is mapped to the $|0\rangle_L$ state, thus defining an m=8 band 1941, and occupancy of any mode in either of bands 1912 or 1916 is mapped to the $|1\rangle_L$ state, thus defining an m=8 band 1942. For the second qubit, occupancy of any mode in either of bands 1913 or 1917 is mapped to the $|0\rangle_L$ state, thus defining an m=8 band 1943, and occupancy of any mode in either of bands 1914 or 1918 is mapped to the $|1\rangle_L$ state, thus defining an m=8 band 1944. It is noted that, in order to clearly show the grouping of modes in the m=8 bands, FIG. 19 depicts the lines representing certain modes as crossing; however, it should be understood that the crossing of lines does not imply a coupling between modes. In a physical implementation, structures implementing the modes (e.g., waveguides) can be arranged in any convenient manner, and structures implementing modes of the same band can be but need not be physically adjacent.

It should be understood that Bell state compositor circuit 1900 and its operation are illustrative and that variations and modifications are possible. For instance, while Bell state compositor circuit 1900 is shown as combining outputs from two m=4 multirail-encoded Bell state generators to produce two m=8 multirail-encoded qubits in a Bell state, the same principle can be extended to combining results from any number of multirail-encoded Bell state generators for any value of m. Accordingly, by increasing the number of Bell state generators, the probability of Bell state compositor circuit 1900 (or similar circuit) producing a Bell state can be increased to near unity, even if the probability of any one Bell state generator succeeding in producing a Bell state is low.

5. MULTIRAIL FUSION GATES

As described above, formation of a multi-qubit cluster state can be achieved using a fusion gate (e.g., as shown in FIGS. 8A and 9A for a dual-rail encoding using photonic qubits). Examples of fusion gates for multirail-encoded photonic qubits will now be described.

Figure 20A:
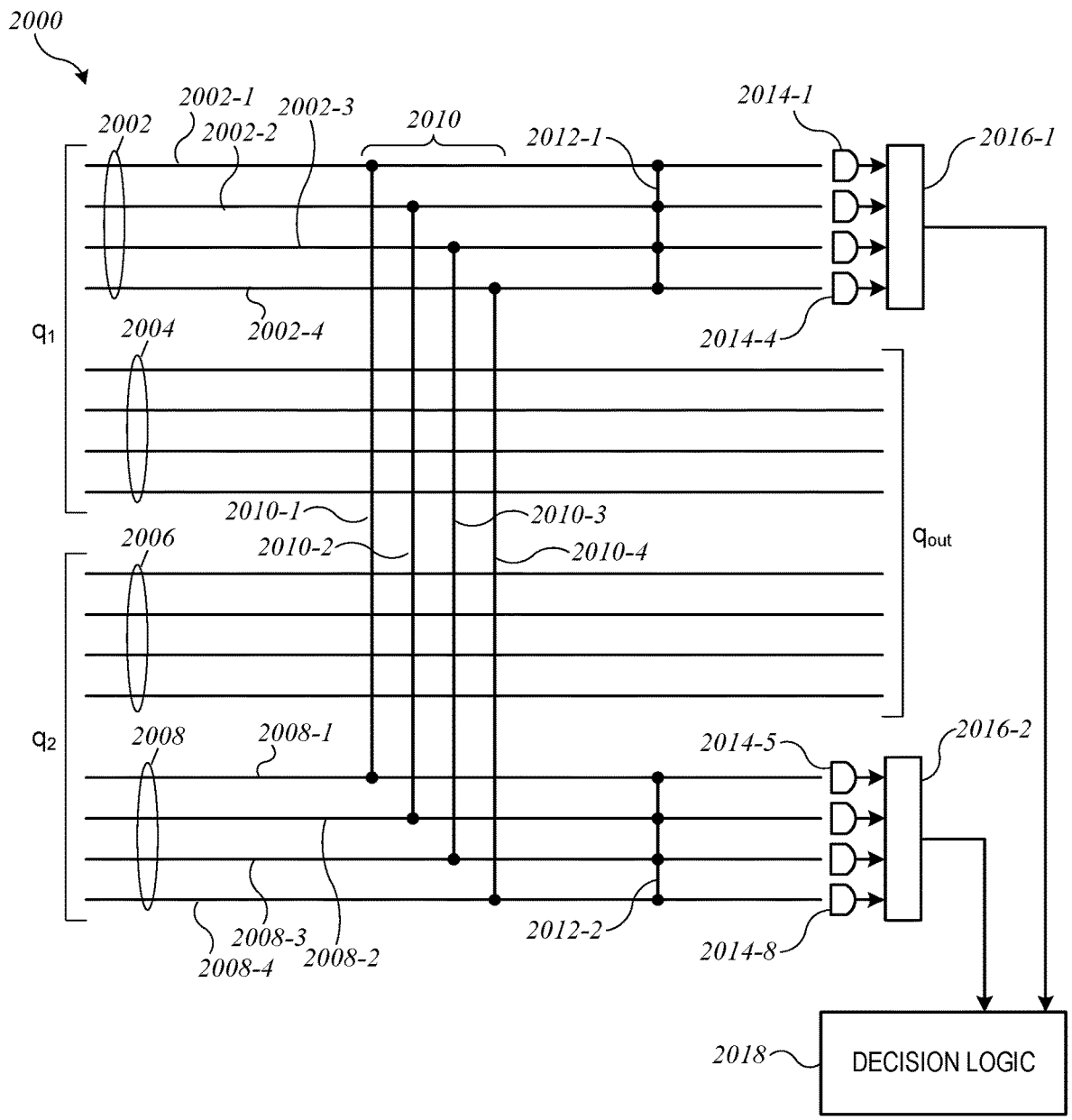
FIG. 20A shows a type I fusion gate for multirail-encoded qubits according to an embodiment.

FIG. 20A shows a type I fusion gate 2000 for multirail-encoded qubits according to an embodiment. Type I fusion gate 2000 is similar in concept to type I fusion gate 800 of FIG. 8A described above, except that the qubits have a multirail encoding with m=4. (As in other examples, any value m≥2 may be used.) In this example, bands 2002 and 2004 (each of which can be implemented as a set of m waveguides) correspond to a first input qubit ($q_1$), and bands 2006 and 2008 correspond to a second input qubit ($q_2$).

Pairs of modes in bands 2002 and 2008 (one band of each input qubit) are coupled using a two-band coupler 2010, similarly to FIG. 8A. Specifically, two-band coupler 2010 includes a first mode coupler 2010-1 that couples mode 2002-1 and mode 2008-1, a second mode coupler 2010-2 that couples mode 2002-2 and mode 2008-2, a third mode coupler 2010-3 that couples mode 2002-3 and mode 2008-3, and a fourth mode coupler 2010-4 that couples mode 2002-4 and mode 2008-4. In some embodiments using photonic qubits, the mode couplers of two-band coupler 2010 can be implemented using 50/50 beam splitters as described above. Bands 2004 and 2006 provide an m=4 multirail-encoded output qubit gout, which can be a fused qubit as described above with reference to FIG. 8B.

The modes in bands 2002 and 2008 are subjected to measurement with mode-information erasure, similarly to FIG. 12A described above. MIE circuits 2012-1 and 2012-2 can be implemented using an appropriate network of mode couplers (e.g., mode couplers implementing a Hadamard transform of appropriate order), similarly to other MIE circuits described above. If a photon is present on any one input mode of MIE circuit 2012-1 (or 2012-2), the result is a quantum state in which the photon is uniformly superposed across all output modes of MIE circuit 2012-1 (or 2012-2). Detectors 2014-1 through 2014-4 are coupled to the output modes of MIE circuit 2012-1, and detectors 2014-5 through 2014-8 are coupled to the output modes of MIE circuit 2012-2. In some embodiments using photonic qubits, MIE circuits 2012-1 and 2012-2 can be implemented using networks of 50/50 beam splitters as described above, and detectors 2014 can be implemented using single-photon detectors as described above. Similarly to detectors described above, detectors 2014-1 through 2014-4 can provide classical signals indicating whether a photon was detected (or how many photons were detected) to measurement logic circuit 2016-1, and detectors 2014-5 through 2014-8 can provide classical signals indicating whether a photon was detected (or how many photons were detected) to measurement logic circuit 2016-2. Each of measurement logic circuits 2016-1 and 2016-2 can generate classical logic signals indicating how many photons were detected by the detectors 2014 coupled thereto.

Decision logic circuit 2018 can receive the classical logic signals (e.g., photon counts) from measurement logic circuits 2016-1 and 2016-2 and can determine whether fusion was successful. In some embodiments, the decision logic implemented in decision logic circuit 2018 can be similar to the decision logic described above with reference to FIG. 8A: fusion succeeds if exactly one of measurement logic circuits 2016-1 or 2016-2 reports one photon and fails otherwise. Decision logic circuit 2018 can generate an output signal indicating success or failure. (As in examples described above, detection of a failure may result in generating a classical "improper state" signal that may be used in further processing.) Operation of multirail fusion gate 2000 results in no information as to which of bands 2004 and 2006 is occupied and no information as to which mode(s) within bands 2004 or 2006 is occupied.

Figure 20B:
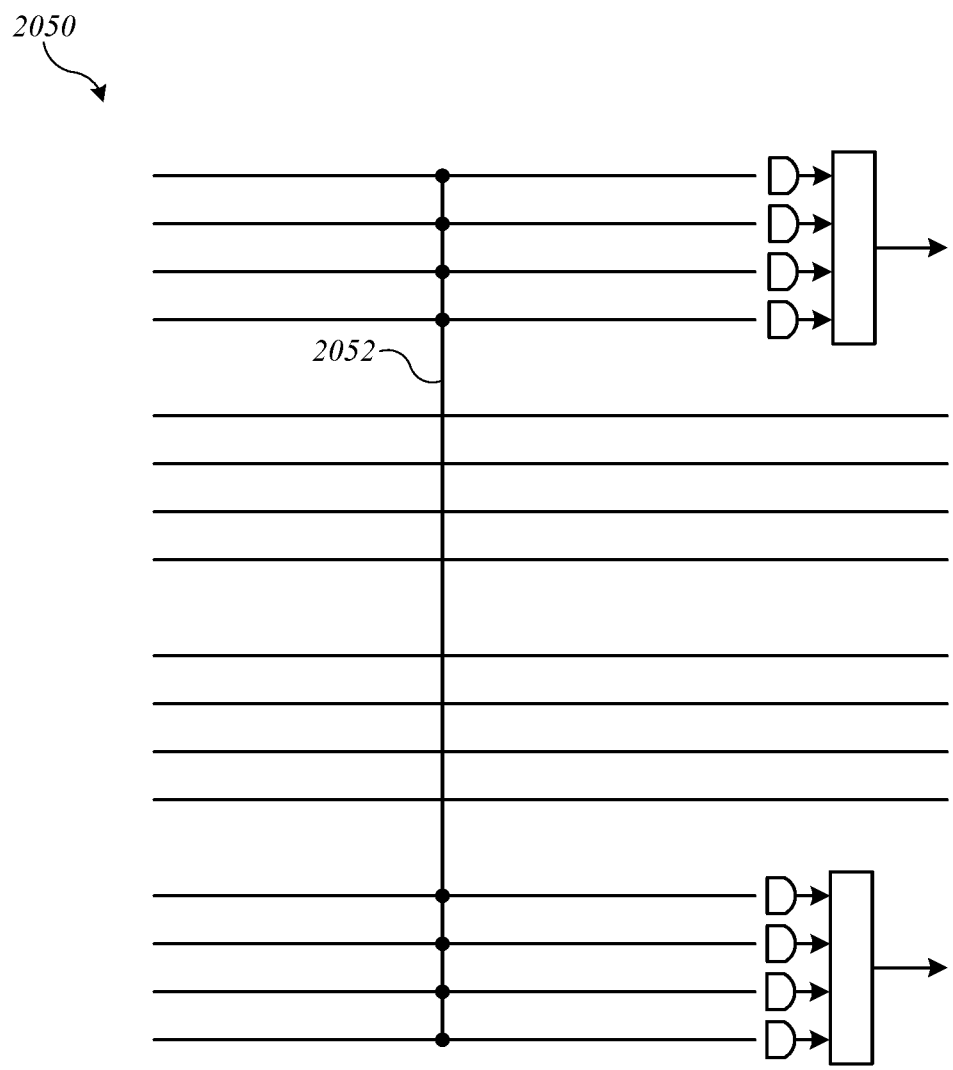
FIG. 20B shows an equivalent circuit for the type I fusion gate of FIG. 20A according to some embodiments.

FIG. 20B shows an equivalent circuit 2050 for multirail fusion gate 2000 according to an embodiment. In equivalent circuit 2050, the first-order and second-order mode couplers of FIG. 20A are replaced by a third-order mode coupler 2052. The mode couplers can be understood as implementing spreader circuits as described above.

Figure 21:
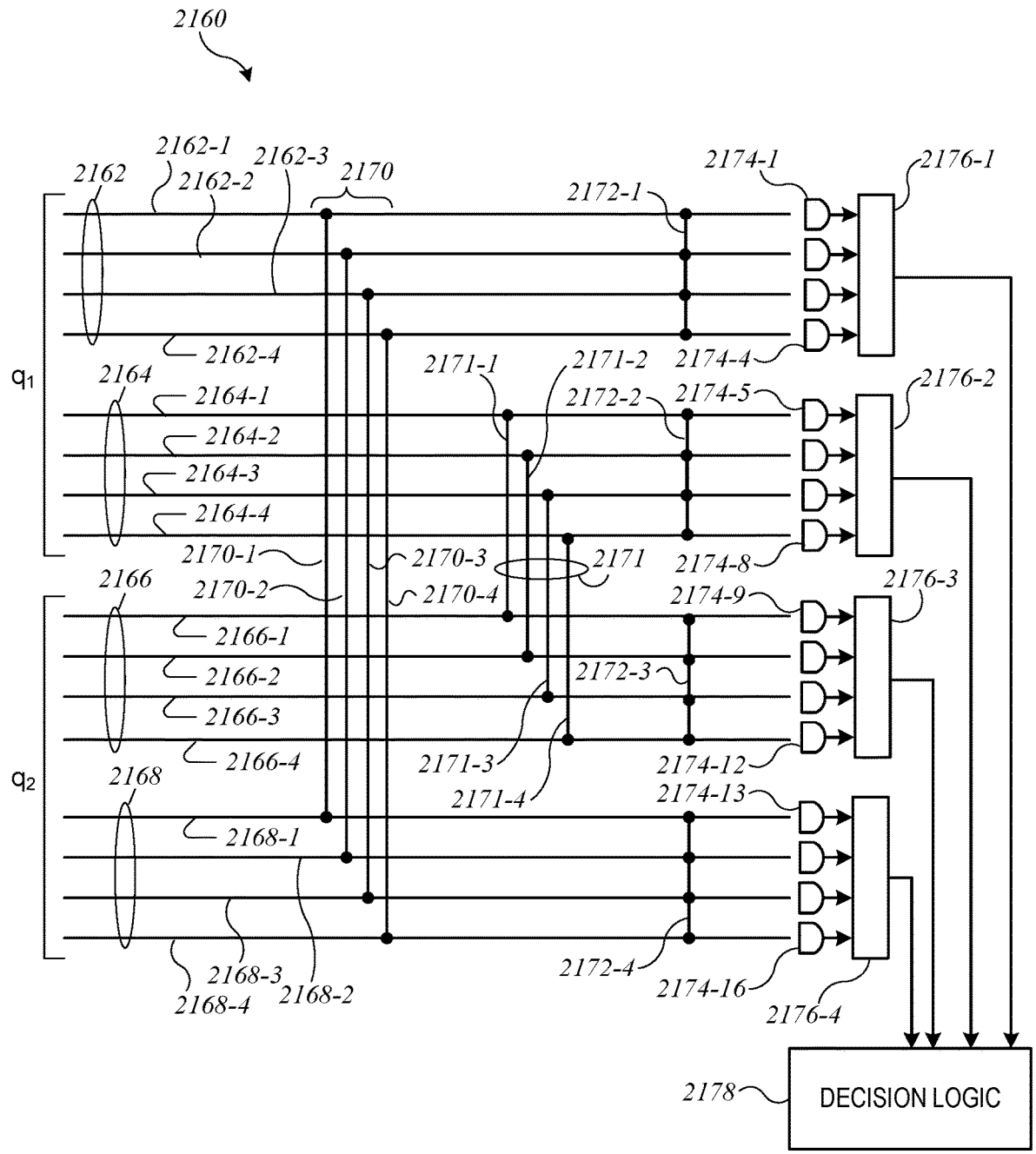
FIG. 21 shows a type II fusion gate for multirail-encoded qubits according to some embodiments.

FIG. 21 shows a type II fusion gate 2160 for multirail-encoded qubits according to an embodiment. Type II fusion gate 2160 is similar in concept to fusion gate 900 of FIG. 9A described above, except that the qubits have a multirail encoding with m=4. (As in other examples, any value m≥2 may be used.) In this example, bands 2162 and 2164 (each of which can be implemented as a set of m waveguides) correspond to a first input qubit ($q_1$), and bands 2166 and 2168 correspond to a second input qubit ($q_2$).

Pairs of modes in bands 2162 and 2168 are coupled using a first two-band coupler 2170, similarly to FIG. 9A. Specifically, first two-band coupler 2170 includes a first mode coupler 2170-1 that couples mode 2162-1 and mode 2168-1, a second mode coupler 2170-2 that couples mode 2162-2 and mode 2168-2, a third mode coupler 2170-3 that couples mode 2162-3 and mode 2168-3, and a fourth mode coupler 2170-4 that couples mode 2162-4 and mode 2168-4. Likewise, pairs of modes in bands 2164 and 2166 are coupled using a second two-band coupler 2171, similarly to FIG. 9A. Specifically, second two-band coupler 2171 includes a first mode coupler 2171-1 that couples modes 2164-1 and 2166-1, a second mode coupler 2171-2 that couples modes 2164-2 and 2166-2, a third mode coupler 2171-3 that couples modes 2164-3 and 2166-3, and a fourth mode coupler 2171-4 that couples modes 2164-4 and 2166-4. In some embodiments using photonic qubits, the mode couplers of two-band couplers 2170 and 2171 can be implemented using 50/50 beam splitters as described above.

The modes in each band are separately subjected to measurement with mode-information erasure, similarly to FIG. 12A described above. MIE circuits 2172 can be implemented using an appropriate network of mode couplers, similar to other MIE circuits described above. If a photon is present on any one input mode of MIE circuit 2172-1 (or 2172-2, 2172-3, or 2172-4), the result is a quantum state in which the photon is uniformly superposed across all output modes of MIE circuit 2172-1 (or 2172-2, 2172-3, 2172-4). Detectors 2174-1 through 2174-16 are coupled to the output modes as shown, with one detector 2174 for each output mode. In some embodiments using photonic qubits, each MIE circuit 2172 can be implemented using a network of 50/50 beam splitters as described above, and detectors 2174 can be implemented using single-photon detectors as described above. Similarly to detectors described above, detectors 2174-1 through 2174-4 can provide classical output signals indicating whether a photon was detected (or how many photons were detected) to measurement logic circuit 2176-1; detectors 2174-5 through 2174-8 can provide classical signals indicating whether a photon was detected (or how many photons were detected) to measurement logic circuit 2176-2; detectors 2174-9 through 2174-12 can provide classical signals indicating whether a photon was detected (or how many photons were detected) to measurement logic circuit 2176-3; and detectors 2174-13 through 2174-16 can provide classical signals indicating whether a photon was detected (or how many photons were detected) to measurement logic circuit 2176-4. Each of measurement logic circuits 2176-1 through 2176-4 can generate classical logic signals indicating how many photons were detected by the detectors 2174 coupled thereto.

Decision logic circuit 2178 can receive the classical logic signals (e.g., photon counts) from measurement logic circuits 2176-1 through 2176-4 and can determine whether fusion was successful. In some embodiments, the decision logic implemented in decision logic circuit 2178 can be similar to the decision logic described above with reference to FIG. 9A: fusion "succeeds" in the case where one photon is reported by one of measurement logic circuits 2176-1 and 2176-4 and one photon is reported by one of measurement logic circuits 2176-2 and 2176-3 and fails in all other cases. Decision logic circuit 2178 can generate an output signal indicating success or failure. (As in examples described above, detection of a failure may result in generating a classical "improper state" signal that may be used in further processing.)

It should be understood that fusion gates 2000 (or 2050) and 2160 and their operation are illustrative, and variations and modifications are possible. For instance, while FIGS. 20A, 20B, and 21 show examples where each band has four modes, the number of modes per band can be modified as desired. Further, while photonic systems are described in detail herein, those skilled in the art with access to this disclosure will appreciate that photonic systems are merely as an example, and fusion gate 2000, fusion gate 2160, or similar circuits can be implemented in a variety of different types of quantum systems, not limited to photonic quantum systems.

6. TEMPORAL ERASURE OPERATION

As the examples above show, some operations on multirail-encoded qubits can include erasure of information as to which mode within a band is occupied. For spatial modes of a photon, such erasure can be accomplished using networks of 50/50 beam splitters as described above. Examples of erasure of temporal mode-occupancy information will now be described.

In some embodiments, a multirail encoding can be based (entirely or in part) on temporal modes of a photon. For a temporal multirail encoding, the state of a photon can be defined (entirely or in part) based on when it arrives at a particular location. It is generally convenient to consider temporal modes defined by discrete time bins, with a photon being either present or not present in a given time bin. In a temporal multirail encoding, a number of time bins can be mapped to a "band," similarly to mapping different spatial states (e.g., presence of a photon in different waveguides) to a band.

For multirail encodings based on temporal modes of a photon, mode-information erasure involves destroying (or erasing) information as to when a photon arrived at a particular location. In some embodiments, such temporal mode-information erasure can be accomplished by superposing the photon across a number of time bins. That is, if the initial state of a photon is represented by a ket $|1_{\vec{k}_1,t_i}\rangle$, where $\vec{k}_1$ represents a single spatial mode and $t_i$ is one of a set of m time bins, the goal is to transform the state according to $$\left|1_{\vec{k}_1,t_i}\right\rangle \rightarrow \sum_{a,b} C_{a,b}(i)\left|1_{\vec{k}_a,t_b}\right\rangle, \quad (23)$$

where the indices a, b have a combined range much greater than m. As long as coefficients $C_{a,b}(i)$ have uniform magnitude and as long as $C_{a,b}(i) \neq 0$ for all initial time bins $t_i$ over a large range of a, b, then the time bin in which a photon is detected does not provide any information as to the initial time bin $t_i$ occupied by the photon.

Figure 22:
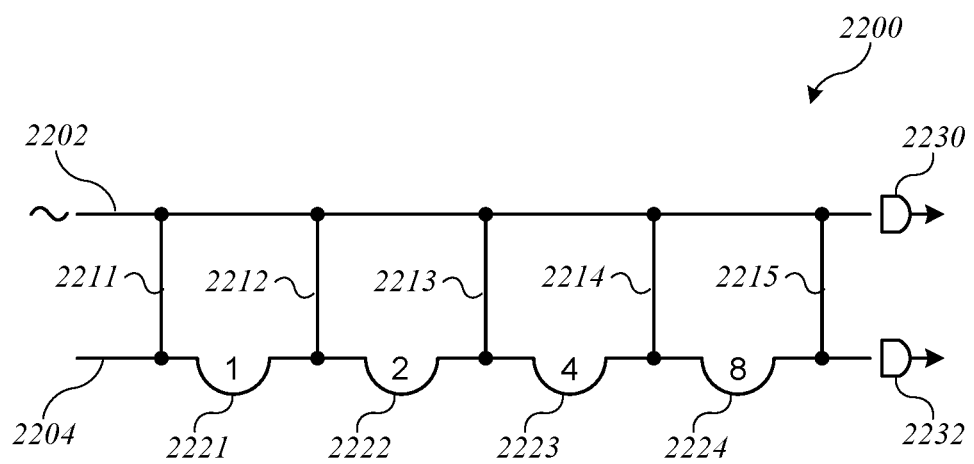
FIG. 22 shows a schematic circuit diagram of a temporal eraser circuit for temporal multirail-encoded photonic qubits according to some embodiments.

FIG. 22 shows a schematic circuit diagram of a temporal eraser circuit 2200 for temporal multirail-encoded photonic qubits according to an embodiment. In circuit 2200, a photon is assumed to enter a spatial mode defined by waveguide 2202 during an unknown time bin $t_i$ while a different spatial mode defined by waveguide 2204 is initially a vacuum mode. Temporal eraser circuit 2200 can "spread" the arrival time of the photon at the downstream end of waveguides 2202 and 2204 uniformly across 16 temporal modes and two spatial modes in accordance with Eq. (23). In this example, temporal eraser circuit 2200 uses five first-order mode couplers 2211-2215 and four delay circuits 2221-2224 to achieve the spreading. First-order mode couplers 2211-2215 can be implemented using 50/50 beam splitters, e.g., as described above. Delay circuits 2221-2224 can be implemented, e.g., using appropriate lengths of waveguide. Each delay circuit 2221-2224 delays the photon by a number of time bins as indicated by the numerals in FIG. 22: one time bin for delay circuit 2221, two time bins for delay circuit 2222, four time bins for delay circuit 2223, and eight time bins for delay circuit 2224. Detectors 2230 and 2232, which can be single-photon detectors as described above, can be positioned at the downstream ends of the waveguides to detect a photon. A photon input to waveguide 2202 at a time bin $t_i$ results in detection of a photon at one or the other of detectors 2230 and 2232 at one of sixteen subsequent time bins, thereby erasing information as to the initial time bin $t_i$ occupied by the photon.

Figure 23A:
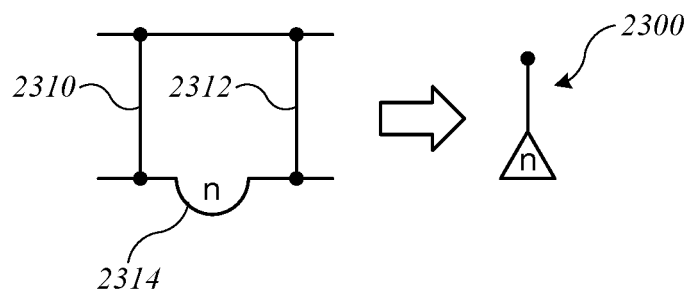
FIGS. 23A and 23B show another example of a temporal eraser circuit for temporal multirail-encoded photonic qubits according to some embodiments.
Figure 23B:
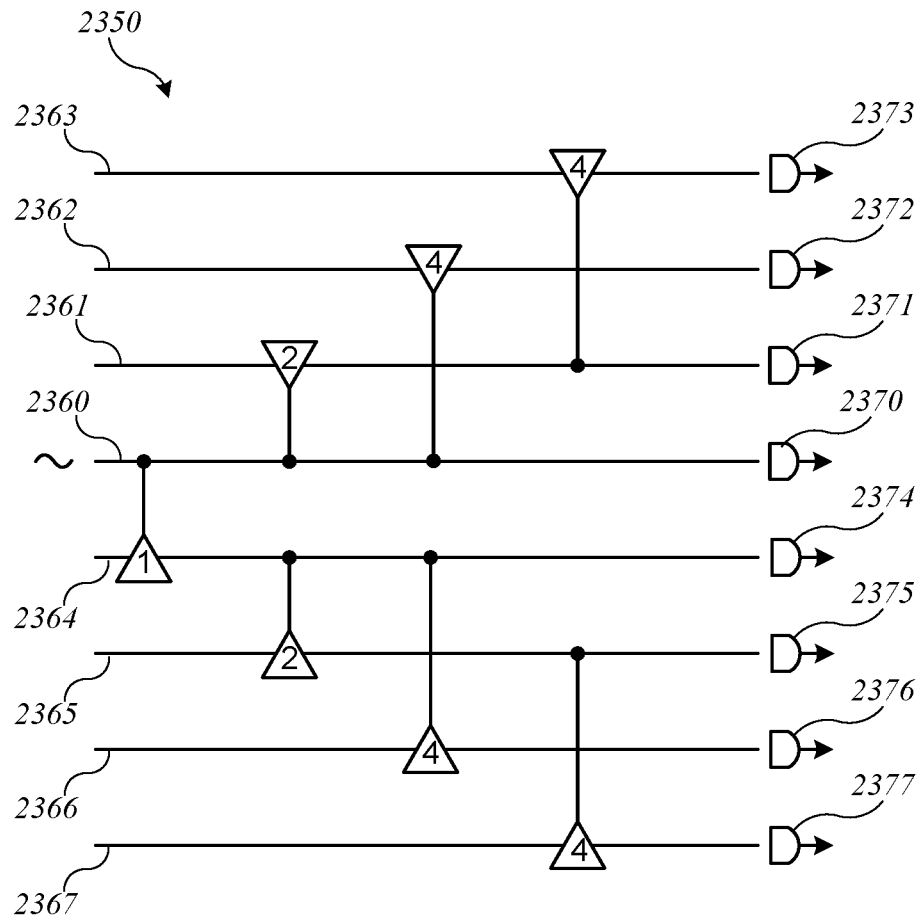

FIGS. 23A and 23B show another example of a temporal eraser circuit for temporal multirail-encoded photonic qubits according to an embodiment. FIG. 23A introduces, as a notational convenience, a circuit symbol 2300 that represents a pair of mode couplers 2310, 2312 (e.g., 50/50 beam splitters) with an n-time-bin delay circuit 2314 (similar to any of delay circuits 2221-2224) applied to one of the output modes of the first mode coupler. FIG. 23B shows a schematic circuit diagram of a temporal eraser circuit 2350 for temporal multirail-encoded photonic qubits according to another embodiment. In circuit 2350, a photon is assumed to enter a spatial mode defined by a waveguide 2360 during an unknown time bin $t_i$ while seven other spatial modes defined by waveguides 2361-2367 are initially vacuum modes. Temporal eraser circuit can "spread" the arrival time of the photon at the downstream end of waveguides 2360-2367 uniformly across eight temporal modes and eight spatial modes in accordance with Eq. (23). Detectors 2370-2377, which can be single-photon detectors as described above, can be positioned at the downstream ends of waveguides 2360-2367 to detect a photon. A photon input to waveguide 2360 at a time bin $t_i$ can result in detection of a photon at one or another of detectors 2370-2377 at one of eight subsequent time bins, thereby erasing information as to the initial time bin $t_i$.

For temporal eraser circuits 2200 and 2350, there may be some combinations of detected spatial mode $\vec{k}_a$, and time bin $t_b$ that can only arise from a subset of the possible initial time bins $t_i$. Where this is the case, temporal mode-information erasure can be deemed to have failed because at least some timing information is extracted. By increasing the combined number of output spatial and temporal bins relative to the number of possible initial time bins, the efficiency of temporal mode-information erasure can be made to approach 1.

It should be understood that circuits 2200 and 2300 are illustrative and that variations and modifications are possible. The particular number of waveguides and delay circuits can be varied as desired. In some embodiments, a multirail encoding can include a combination of spatial and temporal modes, and temporal mode-information erasure can be combined with spatial mode-information erasure to erase all information as to which mode was initially occupied. Further, while photonic systems are described in detail herein, those skilled in the art with access to this disclosure will appreciate that photonic systems are merely as an example, and temporal mode-information erasure can be applied in other quantum systems where temporal modes are used as part of a multirail encoding for qubits.

7. DELOCALIZED NETWORK ARCHITECTURE USING MULTIRAIL ENCODING

In some embodiments it is desirable to construct a cluster state, or an ensemble of quantum systems that are, to at least some degree, entangled with each other. Construction of a cluster state can proceed in stages. For example, at a first stage, an ensemble of separate (non-entangled) quantum systems (such as a set of photons propagating in waveguides) can be produced. At a second stage, entangled pairs of quantum systems can be produced, e.g., by coupling modes of the quantum systems produced by the first stage (e.g., using a Bell state generator as described above). At subsequent stages, larger entangled ensembles can be created by further couplings of modes between quantum systems produced by preceding stages until the desired cluster state is produced.

In examples given above, generation of entangled states via mode coupling operations can be a stochastic process in which the probability of success in a given instance is less than 1. Depending on the particular operation, probability of success might be, for example, ½ or ⅓ or ³⁄₃₂, or some other value. Where a cluster state is constructed in stages, with each stage having a nonzero probability of failure, the likelihood of producing the desired cluster state in any given instance of operation may be low.

To increase the probability of success, a given stage of an architecture for generating a cluster state can include multiple instances of a quantum circuit, where each instance of the quantum circuit performs the same mode coupling operation on different quantum systems in parallel. The instances of the quantum circuit can be implemented in physically distinct components and/or by using the same physical components to operate on different quantum systems at different times. The stage can also include "multiplexing" components that select the quantum system output by one quantum circuit instance that succeeded and propagate the selected quantum system to the next stage. Examples of using multirail encodings for multiplexing in an architecture for generating a cluster state will now be described.

7.1. Passive Multiplexing

In some embodiments, multirail encoding can be used to support a "passive" multiplexing between stages in an architecture for generating a cluster state. As described below, passive multiplexing results in propagating a delocalized quantum state to the next stage of an architecture, and an architecture that incorporates passive multiplexing is sometimes referred to as a "delocalized network architecture," or "DNA." Examples of passive multiplexing and DNA will now be described.

Figure 24:
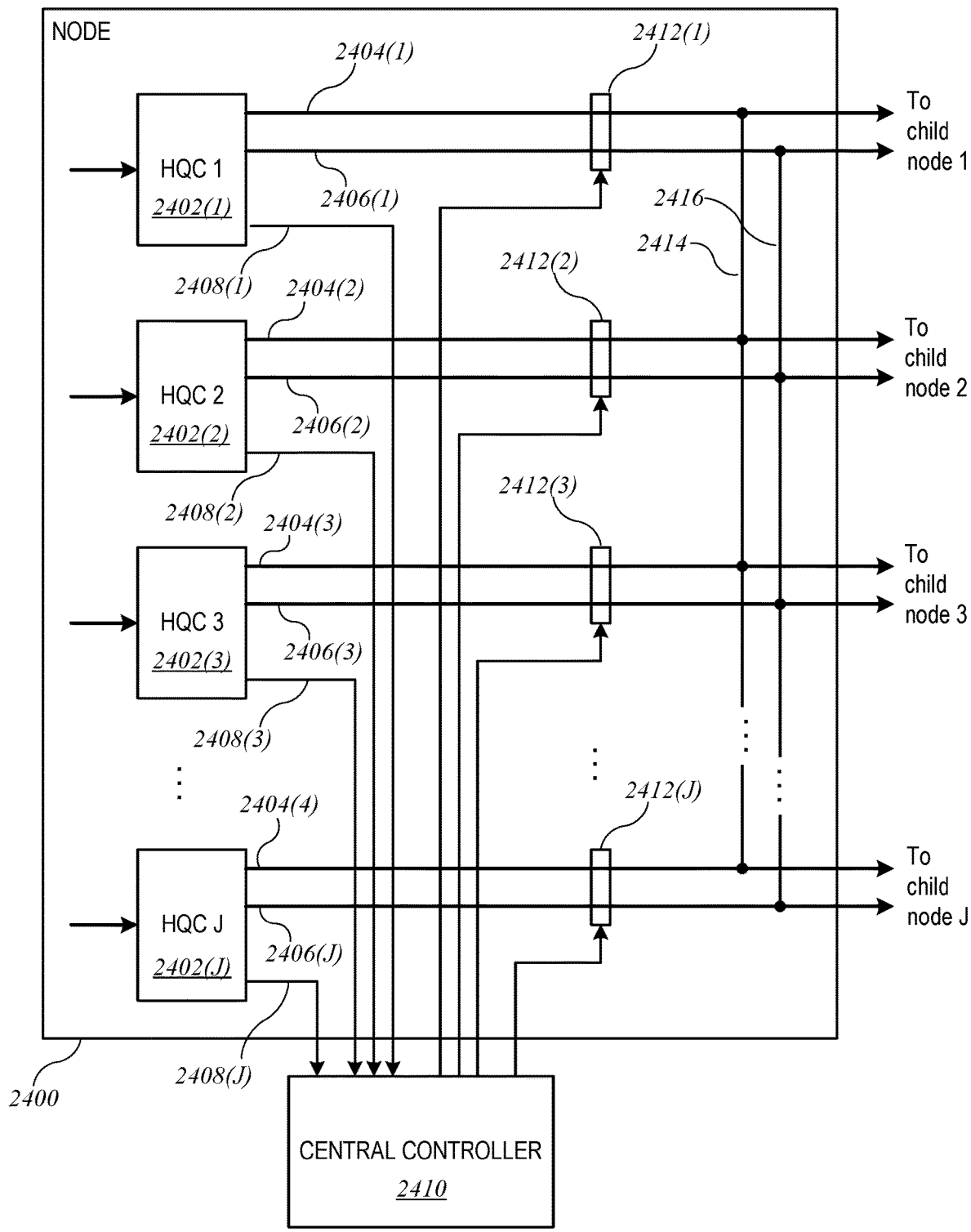
FIG. 24 is a simplified block diagram of a generic node for a delocalized network architecture for a quantum computer system according to some embodiments.

FIG. 24 is a simplified block diagram of a generic node 2400 for a DNA according to an embodiment. Node 2400 includes a set of J instances of a heralding quantum circuit (HQC) 2402(1) to 2402(J). All HQC instances 2402 share the same behavior but may include physically distinct components. Each HQC instance 2402 can implement a quantum operation that produces or fuses entangled states of multiple qubits. It is assumed that each HQC instance 2402 performs a stochastic operation with a probability of success (P) that is less than 1, and the number J is chosen such that $1-(1-P)^J$ is close to 1. (It is assumed that a DNA would be used as part of a fault-tolerant design, and a probability that is "close to 1" is any probability that is within the tolerated failure rate of a particular design.) The inputs to each HQC instance 2402 depend on the particular operation. The outputs of each HQC instance 2402 include a "quantum output" of one or more qubits (where each qubit can have a dual-rail encoding) and a "heralding output," which can be one or more classical bits indicating whether the quantum output was successfully produced. In the example of FIG. 24, the quantum outputs of each HQC instance 2402 are shown as a pair of modes 2404, 2406 corresponding to one qubit. For example the $|0\rangle_L$ state of the output qubit may map to a physical state in which mode 2404 is occupied and mode 2406 is unoccupied (vacuum), while the $|1\rangle_L$ state maps to a physical state in which mode 2406 is occupied and mode 2404 is unoccupied (vacuum). Heralding outputs are shown as a single signal path 2408. It is to be understood that a given HQC may produce any number of output qubits (each having a corresponding pair of modes) and any number of heralding outputs. Specific examples of HQCs are described below.

Heralding outputs 2408(1) to 2408(J) from all HQC instances 2402 are received at a central controller (also referred to as a classical controller) 2410. In some embodiments, central controller 2410 can be implemented as a (classical) digital logic circuit such as a field programmable gate array (FPGA) or system-on-a-chip (SOC) having a programmable processor and memory, or an on-chip hardwired circuit, such as an application specific integrated circuit (ASIC). In some embodiments, central controller 2410 can be implemented as an off-chip classical computer having a processor and a memory and a communication interface to communicate with node 2400, and the off-chip classical computer can be programmed to perform some or all of the operations of central controller 2410. In some embodiments, central controller 2410 receives heralding outputs 2408(1)-2408(J) indicating whether the corresponding instance of HQC 2402 detected a success condition. Stated another way, central controller 2410 receives a set of classical signals (e.g., in the form of analog detection signals or digital detection signals depending on implementation) that corresponds to a detection pattern for a detection operation performed by the J instances of HQC 2402. For example, central controller 2410 can use heralding outputs 2408(1) to 2408(J) as inputs to decision logic that determines whether a desired output quantum state has been achieved, treating the 2*J output modes of each qubit from HQC instances 2402(1)-2402(J) as a single multirail-encoded qubit with m=J. The decision logic of central controller 2410 can configure blocking switches 2412(1) to 2412(J) (which can be similar or identical to blocking switches described above) to pass modes that contribute to a desired output quantum state while blocking other modes. In some embodiments, central controller 2410 does so by using hardwired digital logic and/or by referencing a look-up table (e.g., stored in the memory) to determine which one or more of switches 2412 to activate. At a high level, the decision logic can be based on a rule of "pass one instance that succeeded"; however, in some embodiments, the input state may be delocalized, and the decision logic may reflect the effect of delocalized states. Thus, the decision logic in central controller 2410 for a quantum computer having a DNA can be based on heralding signals from multiple nodes at a given stage. Examples are described below.

Downstream of blocking switches 2412 are a pair of MIE circuits 2414, 2416 (also referred to as "spreader" circuits) that erase knowledge of which HQC instance 2402 propagated its output. Like the MIE circuits described above, MIE circuits 2414, 2416 can transform the quantum state from a localized state, in which only the particular instance of output modes 2404, 2406 whose blocking switch 2412 is set to pass the modes includes an occupied mode, into a delocalized state in which each pair of output modes 2404, 2406 is occupied with equal probability (1/J). Put differently, the quantum output of node 2400 can be understood as a multirail-encoded qubit with m=J. The multirail-encoded qubit can be said to be "delocalized" across J "pairs" of modes (where each pair includes one mode from each of the two bands). Thus, for example modes 2404(1) and 2406(1) can constitute a first pair of modes, modes 2404(2) and 2406(2) a second pair, and so on. It should be noted that the two modes in a pair can be associated with different instances of HQC 2402. For example, modes 2404(1) and 2406(2) can be treated as a pair.

The combination of blocking switches 2412 and spreader circuits 2414, 2416 implements "passive multiplexing" of the outputs of HQC instances 2402. As described below, passive multiplexing can be an alternative to "active multiplexing" that uses coherent switching to selectively couple the output of one HQC of a set of parallel HQC instances 2402 into a single pair of output modes.

In the context of a DNA, different pairs of modes of a multirail-encoded qubit can be distributed to different child nodes in a subsequent (or "downstream") stage, as indicated in FIG. 24. Each child node can be implemented similarly to node 2400, providing a staged architecture in which passive multiplexing can occur at each stage.

The particular structure of a given node 2400, including the number of instances of HQC 2402, and the number of inputs and number outputs of each instance of HQC 2402, can be varied. In implementations where at least some of the modes are temporal modes, the same physical components (waveguides, beam splitters, switches, etc.) can be used to implement multiple instances of HQC 2402. Thus, J instances of HQC 2402 can be provided by providing $j_1$ physical circuits and using $j_2$ temporal modes, where $J=j_1*j_2$.

To further illustrate the structure and operation of DNAs, specific examples of nodes and stages that can be implemented in a DNA in which qubits are encoded using spatiotemporal modes of photons will now be described. It should be understood that these examples are not limiting and that a DNA can be implemented using other photonic modes and other types of quantum systems.

7.1.1. Example Node: Photon Source

Figure 25:
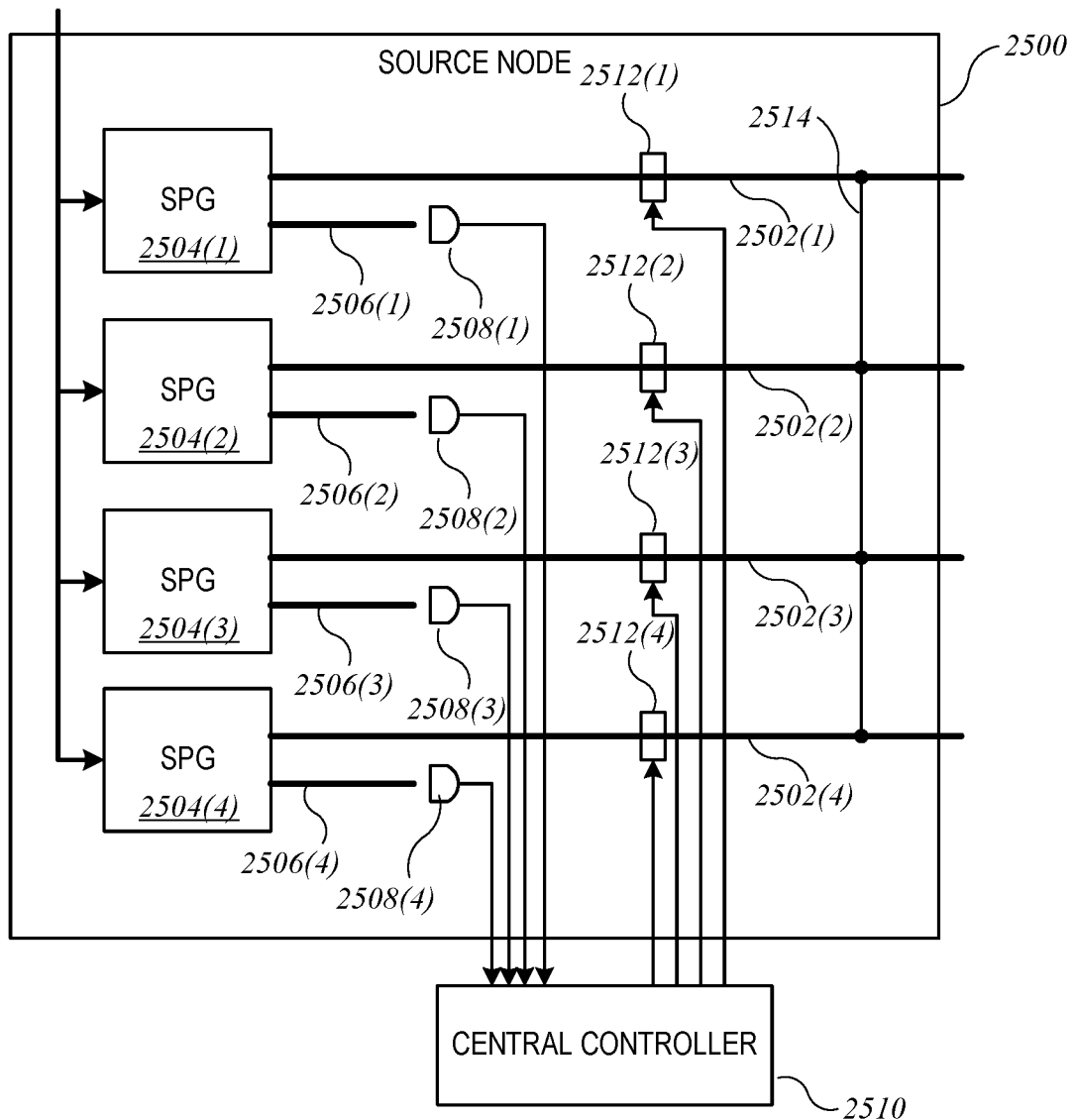
FIG. 25 shows an example of a source node implementing a single photon source according to some embodiments.

In one example, a node such as node 2400 can implement a photonic source node. As used herein, a "source" node creates quantum systems in states that can be operated upon by downstream nodes, and the inputs to the source node can be classical control signals rather than qubits (or other quantum systems). FIG. 25 shows an example of a source node 2500 implementing a single photon source according to an embodiment. In many respects, source node 2500 is similar to photon generation circuit 1400 of FIG. 14. Source node 2500 can include a set of heralding single photon generators (SPG) 2504(1)-2504(4), which can be similar or identical to heralding SPGs 1404 of FIG. 14 described above. Specifically, each heralding SPG 2504(1)-2504(4) can be a non-deterministic photon source that generates either a pair of photons (with probability p) or no photons (with probability 1−p). In this example, four instances of heralding SPG 2504 are provided; in other implementations, the number of instances can be modified as desired. As described above, the number of instances can be selected such that the probability of at least one of heralding SPGs 2504 generating a photon pair during a given operating cycle is close to 1. The input to source node 2500 can be a classical signal pulse to trigger the operation of heralding SPGs 2504, as described above with reference to FIG. 14.

When a particular SPG 2504($i$) generates a pair of photons, one photon is propagated on a corresponding waveguide 2502($i$) while a heralding photon is emitted into heralding waveguide 2506($i$) and detected by corresponding detector 2508($i$). Central controller 2510, which can be similar or identical to classical control logic 1410 and central controller 2410 described above, can receive classical signals from detectors 2508(1)-2508(4) and can control blocking switches 2512(1)-2512(4) based on the received signals. For instance, blocking switches 2512(1)-2512(4) can be controlled by central controller 2510 to provide that only one of waveguides 2502(1)-2502(4) propagates a photon at any given time.

Downstream of blocking switches 2512 is an MIE (or spreader) circuit 2514, that erases knowledge of which SPG 2504 propagated its output. Spreader circuit 2514 can be, for example, a network of beam splitters as described above. Spreader circuit 2514 can transform the physical state from a state in which the photon occupies one output waveguide 2502(i) with probability 1 to a superposition state in which the photon occupies each of output waveguides 2502(1)-2502(4) with equal probability (e.g., ¼ if there are four output waveguides 2502). This superposition state is sometimes referred to for brevity as the photon being "spread" or "delocalized" across the modes, although it is to be understood that a photon, when detected, occupies only one of the modes. In some embodiments, each output waveguide 2502 can be associated (either within source node 2500 or within each child node) with a corresponding second waveguide that is coupled to a vacuum-mode. Thus, source node 2500 can be used to generate a single multirail-encoded qubit (with m=4 in this example) in a known logical state. For instance, if the multirail encoding is defined such that occupancy of any mode in the band represented by output waveguides 2502 corresponds to the $|0\rangle_L$ state, then source node 2500 can produce multirail-encoded qubits in the $|0\rangle_L$ state.

Figure 26:
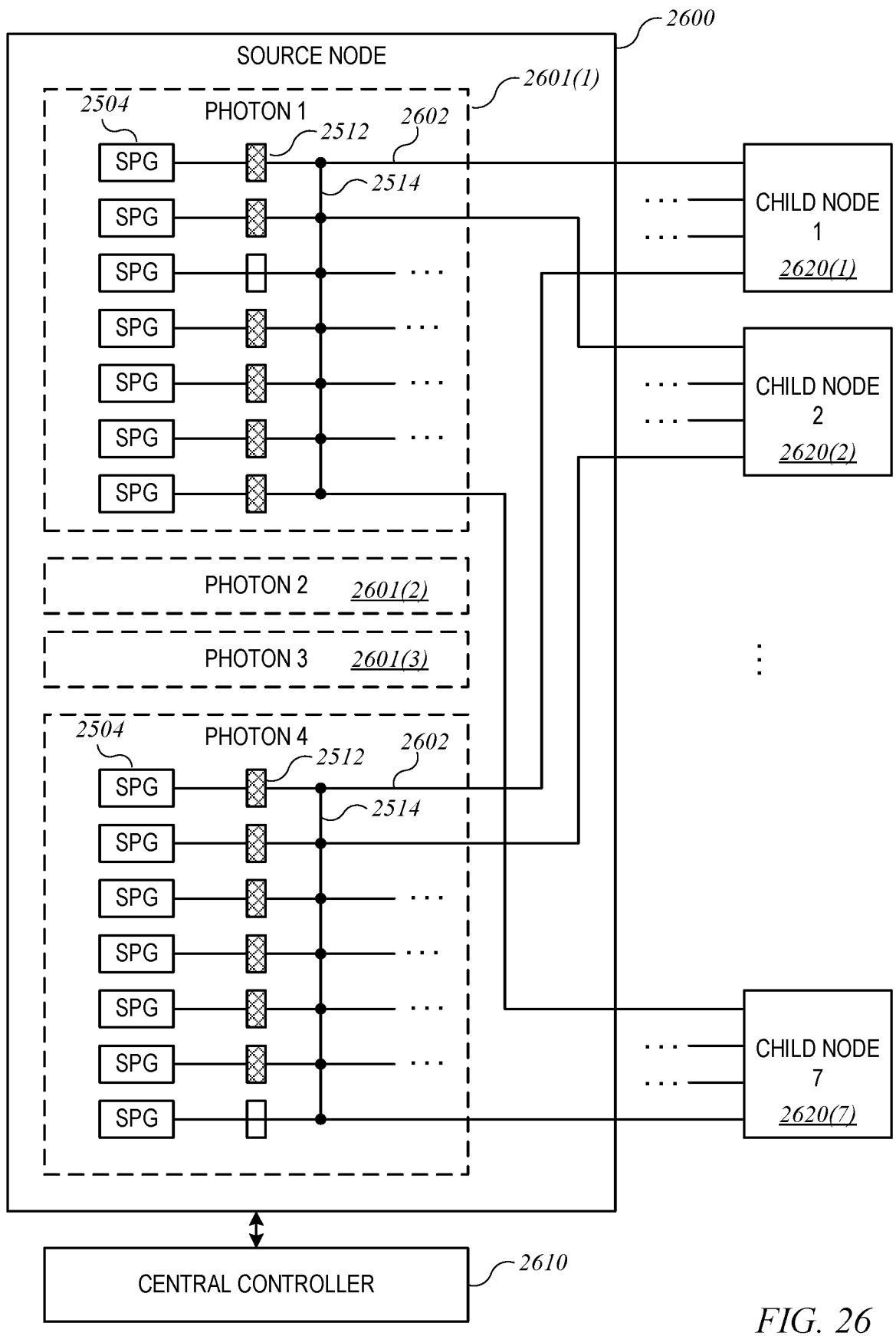
FIG. 26 shows another example of a source node according to some embodiments.

Some quantum operations require multiple qubits as inputs, and source node 2500 can be modified to provide any number of qubits to a child node. FIG. 26 shows an example of a source node 2600 according to an embodiment that generates four photons for each child node. In this example, a separate instance of photon generating circuit 2601 is used to generate each of the four photons. (For ease of illustration, two instances of photon generating circuits 2601(1), 2601(4) are shown in detail; it is to be understood that the other photon generating circuits 2601(2), 2601(3) may have similar structure.) Each photon generating circuit 2601 includes seven heralding SPGs 2504; as described above, the number of heralding SPGs 2504 in each photon generating circuit 2601 can be chosen such that the probability of a particular photon generating circuit 2601 generating at least one photon per operating cycle is approximately 1. All numerical values used herein are illustrative and can be modified as desired for a particular implementation.

Each photon generating circuit 2601 can operate similarly to source node 2500 described above. Heralding waveguides and detectors are not shown in FIG. 26 but should be understood to be present, and each instance of SPG 2504 in each photon generating circuit 2601 can send a heralding signal to a central controller 2610. Central controller 2610, which can be similar to central controller 2510 of FIG. 25, can set the states of the blocking switches 2512 for each photon generating circuit 2601 depending on which one (or more) of SPGs 2504 in that photon generating circuit 2601 produces a heralding photon. There does not need to be any correlation among the states of the blocking switches of different photon generating circuits 2601, as long as each photon generating circuit 2601 passes only one photon. Each photon generating circuit 2601 also includes a separate instance of spreader circuit 2514.

Output waveguides 2602 are coupled to a set of child nodes 2620(1)-2620(7) (only some of which are shown). As shown for child nodes 2620(1), 2620(2), and 2620(7), the coupling to child nodes 2620 is such that each child node 2620 is coupled to one output waveguide 2602 from each of the four photon generating circuits 2601. Thus, the output of source node 2600 is a set of four photons, where the quantum state of each photon is a superposition of occupancy of each of seven modes i (the seven output waveguides 2602 of a particular photon generating circuit 2601) with amplitudes a such that $|a_i|^2=\frac{1}{7}$. Each child node 2620 receives a waveguide corresponding to one mode from each of the four quantum systems. Put another way, source node 2600 produces (with probability close to 1) four photons, each of which is delocalized (by operation of spreader circuits 2514) across seven modes, and each child node 2620 receives one mode of each of the four delocalized photons. Phase coherence can be preserved among the waveguides coupled to the same child node, for instance by providing a single multi-core optical fiber bundle to connect the output waveguides to a particular child node. Phase coherence among waveguides coupled to different child nodes need not be preserved.

If the seven child nodes 2620 were to make a measurement (e.g., detecting photons) to determine which modes were occupied, a total of four occupied modes would be measured. More specifically, one photon originating from each photon generating circuit 2601 would be detected by one or another of the seven child nodes 2620. Because the photons are each delocalized by source node 2600, the pattern of detection of photons by the child nodes is stochastic: in any particular instance, all four photons could be detected in the same child node, or four of the child nodes could detect one photon each, or one child node could detect two photons while two others detect one photon each, or any other combination that results in four photons being detected. This has implications for the operation of the child nodes, as will be described in Section 7.2 below.

In this manner, source node 2600 or a similar source node can provide any number of photons to any number of child nodes. In some embodiments, such as a quantum computer using a measurement-based architecture, the number of photons (and therefore the number of instances of photon generating circuit 2601) is determined based on the number of qubits needed to generate a cluster state of a desired size, and the number of heralding SPGs 2504 in each photon generating circuit 2601 can be determined based on the probability of a particular SPG 2504 generating a photon pair, to provide a probability close to 1 of obtaining a photon from each photon generating circuit 2601. The number of heralding SPGs 2504 in each photon generating circuit 2601 is the same, and that number determines the number of child nodes (assuming each child node receives one mode from each photon generating circuit 2601).

The internal structure of a source node can be modified as desired. For instance, the example source node 2500 in FIG. 25 and photon generating circuits 2601 in FIG. 26 are based on the photon source of FIG. 14, which uses parallel triggering of heralding SPGs and blocking switches to select one photon to propagate. An alternative implementation can be based on the photon source of FIG. 15, which uses cascading triggers and delay lines to generate a single photon that can be delocalized across modes using a spreader circuit similar to spreader circuit 2514. Other implementations are also possible.

7.1.2. Example Node: Bell State Generator

Figure 27:
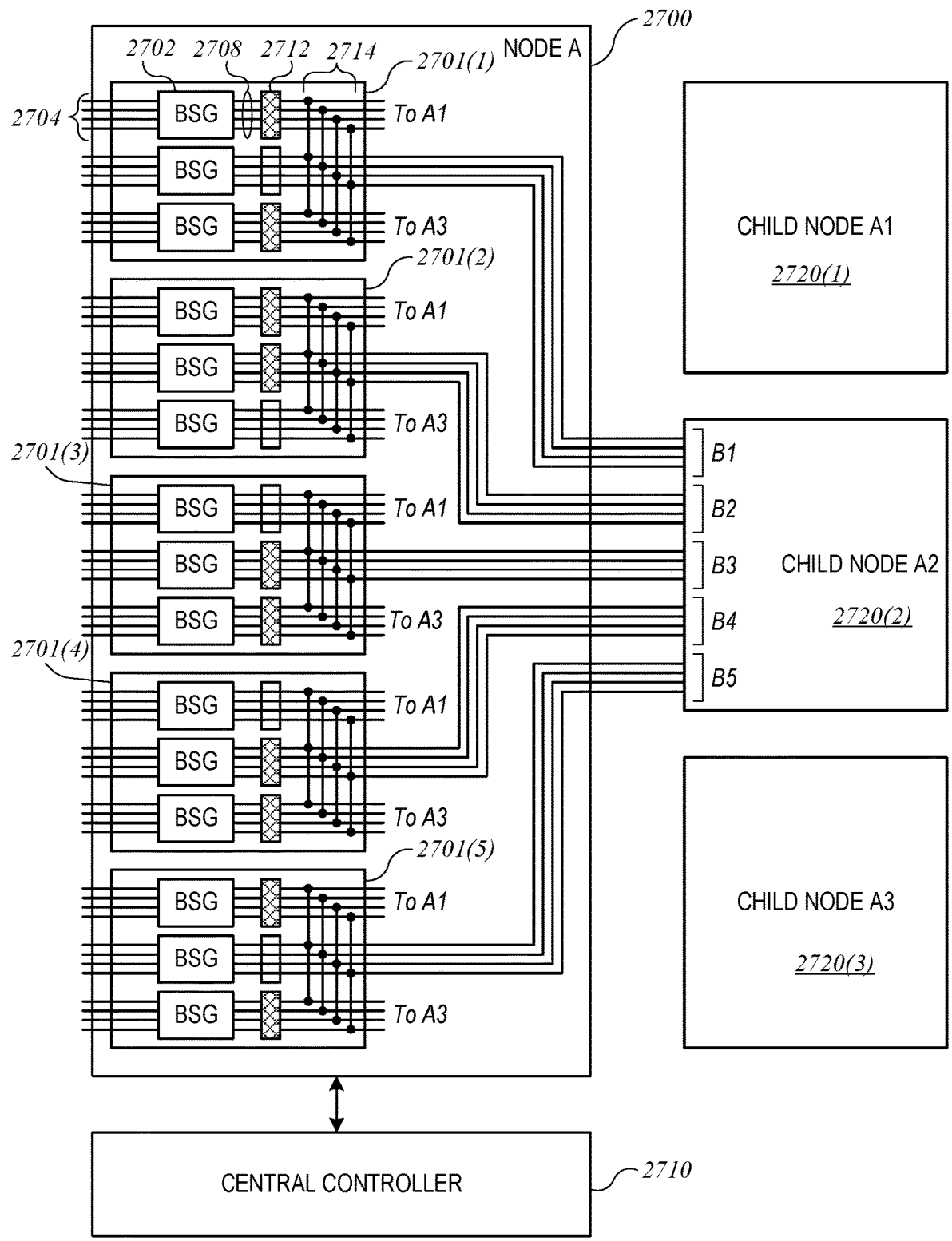
FIG. 27 shows an example of a node implementing a Bell pair generator according to some embodiments.

In some embodiments, a node in a DNA can implement a photonic Bell pair generator. FIG. 27 shows an example of a node 2700 implementing a Bell pair generator according to an embodiment that can produce five Bell pairs of qubits. Node 2700 includes five Bell pair circuits 2701, each of which contains three instances of a Bell state generator (BSG) 2702. In this particular example, it is assumed that the probability of one BSG 2702 generating a Bell pair is such that, with three instances of BSG 2702, each Bell pair circuit 2701 can produce a Bell pair with probability close to 1. As with all numerical examples herein, numerical values are illustrative and may be varied as desired.

Each instance of BSG 2702 can be implemented as shown in FIG. 7. That is, each BSG 2702 can be coupled to receive four input photons 2704 and four input vacuum modes (not shown in FIG. 27). For purposes of describing Bell pair generator node 2700, it is assumed that each BSG 2702 receives four input photons 2704. However, in some embodiments, the input photons can be received from a DNA source node such as source node 2600 of FIG. 26, with Bell state generator nodes 2700 used as child nodes 2620. In that case, the input qubits have delocalized quantum states. Examples of configurations involving delocalized inputs are described in Section 7.2 below.

Similarly to Bell state generator 700 of FIG. 7, each BSG 2702 can operate to produce four quantum output modes 2708 (which can correspond to modes 732 shown in FIG. 7) and four heralding modes (not shown in FIG. 27). As described above with reference to FIG. 7, the heralding modes can be processed by a detector circuit (which can be part of each BSG 2702) to produce a classical logic signal indicating the number of photons detected. In the embodiment shown in FIG. 27, the classical logic signals from the detector circuits of all BSGs 2702 are sent to a central controller 2710, which can be implemented similarly to central controller 2410 described above. In this example, central controller 2710 implements decision logic that determines, based on the pattern of inputs received from all instances of BSG 2702, whether a Bell pair was successfully generated. For example, as described above with reference to FIG. 7, success can be identified based on detection of two photons on two of the four heralding modes of a BSG 2702.

Central controller 2710 can set the state of blocking switches 2712 to permit the quantum output modes 2708 of one successful BSG 2702 in each Bell pair circuit 2701 to propagate while blocking the output modes of the other two BSGs 2702 in the Bell pair circuit 2701. Output modes 2708 can include four modes, each of which maps to one logical state of one qubit of the Bell pair (as described above with reference to FIG. 7). Each Bell pair circuit 2701 also includes a set of four spreader circuits 2714. Each spreader circuit 2714 couples three modes that map to the same logical state of one qubit of a Bell pair. Thus, the Bell pair output by a particular Bell pair circuit 2701 can be understood as a pair of multirail-encoded qubits (with m=3 for each qubit), similarly to the output described above with reference to FIG. 18. The quantum state of the Bell pair is delocalized (or spread) across the three modes in each band by operation of spreader circuits 2714. The delocalized multirail-encoded qubit pair provided by a particular Bell pair circuit 2701 can be delivered to three different child nodes 2720, with each child node 2720 receiving one mode per band. In this manner, each child node 2720 can receive five dual-rail-encoded Bell pairs. Couplings to child node 2720(2) are shown in detail, with B1-B5 denoting the five Bell pairs; couplings to child nodes 2720(1) and 2720(3) can be inferred from the example. As with source node 2600, phase coherence can be preserved among modes that couple to the same child node 2720, for instance by providing a single multi-core optical fiber bundle for each child node 2720 that is connected between output waveguides of node 2700 and input waveguides of the child node 2720. Phase coherence among modes coupled to different child nodes 2720 need not be preserved.

In an operation where the input waveguides of Bell state generator node 2700 each receive a photon, if the three child nodes 2720 were to make a measurement to detect photons, it can be expected that a total of ten photons would be detected, two for each Bell pair circuit 2701. Because the Bell pairs are delocalized, the detection of photons by a particular child node is stochastic: any of the ten detected photons may be detected by any of the child nodes. For instance, one photon from a particular Bell pair might be detected by a first child node 2720 while the other photon from the same pair is detected by a different child node 2720. Similarly, photons from different Bell pairs can be detected in any child node (or nodes). This property can be exploited in a quantum computer with a delocalized network architecture, as described below.

7.1.3. Example Node: Fusion Gate

Figure 28:
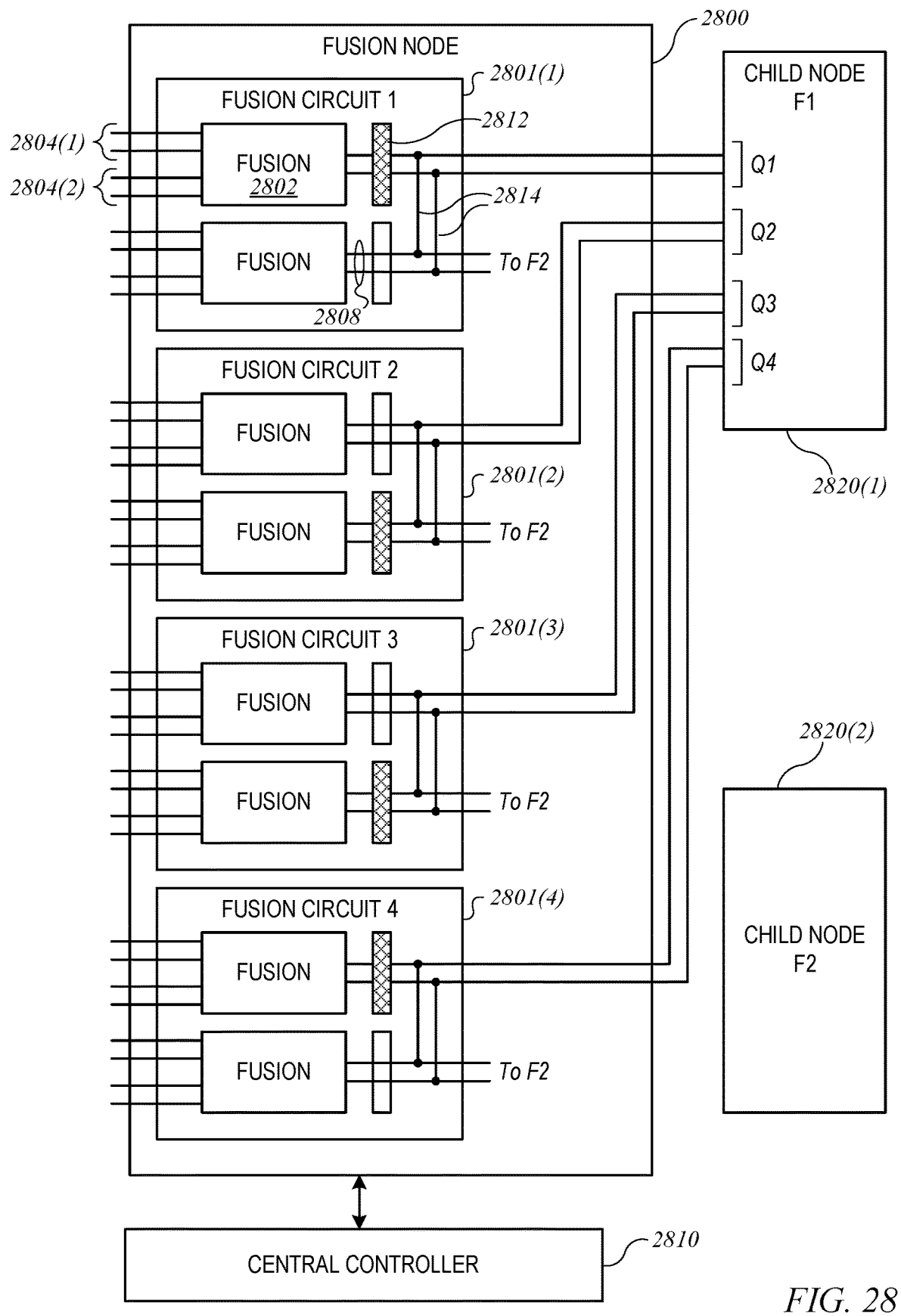
FIG. 28 shows an example of a node implementing fusion gates according to some embodiments.

A third example of a node in a DNA is a node implementing a photonic fusion node. FIG. 28 shows an example of a node 2800 implementing type I fusion according to an embodiment that can produce four fused qubits. (Although not shown, a fusion node implementing type II fusion could also be constructed.) Node 2800 includes four fusion circuits 2801, each of which contains two instances of a fusion gate 2802. As with other examples, the number of instances of fusion gate 2802 in a fusion circuit 2801 can be selected such that each fusion circuit 2801 can produce a fused qubit with probability close to 1. As with all numerical examples herein, numerical values are illustrative and may be varied as desired.

Each instance of fusion gate 2802 can be implemented, e.g., as shown in FIG. 8A. That is, each fusion gate 2802 can be coupled to receive two qubits as inputs 2804(1), 2804(2). For ease of illustration, each fusion gate 2802 is shown as receiving two input qubits; however, it is to be understood that the two input qubits can each be part of a (different) entangled ensemble of qubits in an entangled state and that the result of fusion node 2800 is to create entanglement between the two ensembles, as described above with reference to FIGS. 8A and 8B. In some embodiments, each input qubit can be part of a different Bell pair received from a node similar to Bell state generator node 2700 of FIG. 27 (with fusion nodes 2800 used as child nodes 2720). In that case, the input qubits have delocalized quantum states. Examples of configurations involving delocalized inputs are described in Section 7.2 below.

Similarly to fusion circuit 800 of FIG. 8A, each fusion gate 2802 can operate to produce a fused qubit as output on modes 2808 (which can correspond to modes 845 and 847 of FIG. 8A) and two heralding modes (not shown in FIG. 28). As described above with reference to FIG. 8A, the heralding modes can be processed by detector circuits (which can be part of fusion gate 2802) to produce a classical logic signal indicating the number of photons detected. In the embodiment shown in FIG. 28, the classical logic signals from the detector circuits of all fusion gates 2802 are sent to a central controller 2810, which can be implemented similarly to central controller 2410 described above. In this example, central controller 2810 implements decision logic that determines, based on the pattern of inputs received from all instances of fusion gate 2802, whether a fused qubit was successfully generated. For example, as described above with reference to FIG. 8A, success can be identified based on detection of one photon on one of the two heralding modes of a fusion gate 2802.

Central controller 2810 can set the state of blocking switches 2812 to permit the quantum output modes 2808 of one successful fusion gate 2802 in each fusion circuit 2801 to propagate while blocking the output modes of the other fusion gate 2802 in the fusion circuit 2801. Output modes 2808 can include a pair of modes, each of which maps to one logical state of the output qubit (as described above with reference to FIG. 8A). Each fusion circuit 2801 also includes a set of two spreader circuits 2814. Each spreader circuit 2814 couples two modes that map to the same logical state of an output qubit. Thus, the output qubit of each fusion circuit 2801 can be understood as a multirail-encoded qubit (with m=2), similarly to the output described above with reference to FIG. 20A. The quantum state of the output qubit is delocalized (or spread) across the two modes in each band by operation of spreader circuits 2814. The multirail-encoded qubit produced by a particular fusion circuit 2801 can be delivered to two different child nodes 2820, with each child node 2820 receiving one mode per band. Couplings to child node 2820(1) are shown in detail, with Q1-Q4 denoting the four qubits; couplings to child node 2820(2) can be inferred from the example. As with other nodes described above, phase coherence can be preserved among output waveguides that couple to the same child node 2820, for instance by providing a single multi-core optical fiber bundle for each child node 2820 that is connected between output waveguides of node 2800 and input waveguides of the child node 2820. Phase coherence among waveguides coupled to different child nodes need not be preserved.

In an operation where the input waveguide pairs of fusion node 2800 each receive a qubit in a valid computational state, if the two child nodes 2820 were to make a measurement to detect photons, it can be expected that a total of four photons would be detected, one for each fusion gate 2801. Because the qubits are delocalized, the detection of photons by a particular child node is stochastic: any of the four detected photons may be detected by any of the child nodes. For instance, two photons might be detected by each child node 2820, or three photons by one child node 2820 and one photon by the other child node 2820, or all four photons might be detected by the same child node. This property can be exploited in a quantum computer with a delocalized network architecture, as described below.

In fusion node 2800, the fusion gates 2802 are described as type I fusion gates that can be implemented, e.g., as described above with reference to FIG. 8A; thus, fusion node 2800 may be referred to as a type I fusion node. The output of each fusion gate 2802 is shown as a single dual-rail encoded qubit (pair of modes); however, it should be understood that the actual output can be an entangled quantum state that includes the qubit shown.

Those skilled in the art with access to the present disclosure will appreciate that a fusion node for a DNA can also be implemented as a type II fusion node. The fusion gates can be type II fusion gates, which can be implemented, e.g., as described above with reference to FIG. 9A. The output would be an entangled quantum state, with both input qubits being used for heralding.

7.2. DNA Examples

To construct a delocalized network architecture, a node that produces delocalized outputs (e.g., as described in Section 7.1) can be used to provide inputs to a set of child nodes that also produce delocalized outputs.

Figure 29:
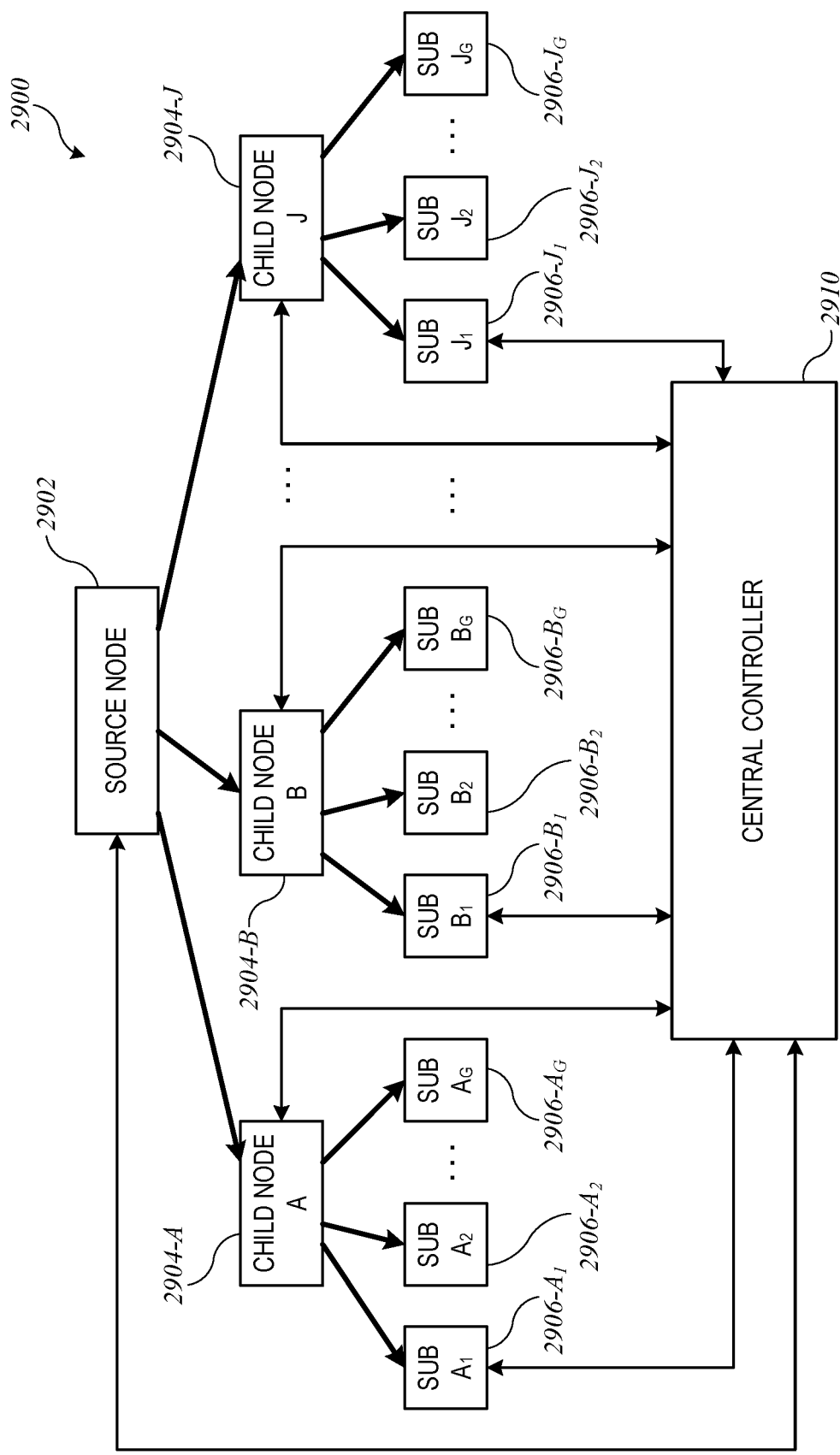
FIG. 29 shows a simplified block diagram of a quantum computer system with a delocalized network architecture according to some embodiments.

FIG. 29 shows a simplified block diagram of a cluster-state generating system 2900 with a delocalized network architecture (DNA) according to an embodiment. System 2900 includes a number of stages, with one or more nodes at each stage.

At a first stage, a source node 2902 produces an ensemble of multirail-encoded qubits (with m=J for some integer J>1) in a known logical state. For example, source node 2902 can be a photon source node implemented similarly to source node 2600 described above. For each multirail-encoded qubit, one of the modes in the band that maps to the $|0\rangle_L$ state and one of the modes in the band that maps to the $|1\rangle_L$ state is coupled to a different one of a set of J child nodes 2904-A to 2904-J that define a second stage. In some embodiments where source node 2902 produces qubits in a known logical state, only modes in the band corresponding to that logical state need be coupled between source node 2902 and child nodes 2904. (Child node 2904 can create the other input mode(s) in an initial unoccupied state.)

Each child node 2904 can be a separate instance of the same type of DNA node. For example, each child node 2904 can be a node that generates an entangled state of two or more qubits, such as Bell state generator node 2700 described above. To the extent that a child node 2904 receives multiple qubits as input, all of the qubits are provided by source node 2900 in a quantum-coherent manner to facilitate forming entangled states.

In this example, each child node 2904 produces an output state that maps to an ensemble of two or more multirail-encoded qubits with each qubit having m=G for some integer G>1. (G can be, but need not be, equal to J.) For each multirail-encoded qubit in the output state of child node 2904-A, one of the modes in the band that maps to the $|0\rangle_L$ state and one of the modes in the band that maps to the $|1\rangle_L$ state is coupled to a different one of a set of G child nodes ("subnodes") 2906-$A_1$ to 2906-$A_G$. In the same fashion, each of child nodes 2904-B to 2904-J provides modes to a corresponding set of G subnodes. As shown, child node 2904-B provides modes to subnodes 2906-$B_1$ to 2906-$B_G$; child node 2904-J provides modes to subnodes 2906-$J_1$ to 2906-$J_G$. Although not shown in FIG. 29, it should be understood that there are a total of J*G subnodes 2906 and that each group of G subnodes receives modes from a different one of the J child nodes 2904-A to 2904-J Each subnode 2906 receives one mode from each band of each multirail qubit produced by the child node 2904 to which it is coupled. The number of qubits depends on particular operations being implemented. For instance, if each child node 2904 corresponds to an instance of Bell state generator node 2700 of FIG. 27, then each subnode 2906 would receive modes corresponding to five Bell pairs. To the extent that a subnode 2906 receives multiple qubits as input, all of the qubits are provided by the same child node 2904 in a quantum-coherent manner, and any entanglement generated in a given child node 2904 can be preserved.

Subnodes 2906 provide a third stage. In some embodiments, each of subnodes 2906 can be an independent quantum computer that performs a computation on an ensemble of entangled qubits and produces a measurement result. Any known type of quantum computer architecture can be implemented, provided that the architecture operates on the type of physical system used to generate the qubit ensemble. For instance, each subnode 2906 can implement a measurement-based quantum computer architecture in which computations are performed by sequential measurements of qubits in an initial cluster state, which can be the entangled state produced by child nodes 2904.

Source node 2902, child nodes 2904, and subnodes 2906 all communicate with a central controller 2910. (For visual clarity, not all communication paths are shown.) In some embodiments, central controller 2910 can be implemented as a (classical) digital logic circuit such as a field programmable gate array (FPGA) or system-on-a-chip (SOC) having a programmable processor and memory, or an on-chip hard-wired circuit, such as an application specific integrated circuit (ASIC). In some embodiments, central controller 2910 can be implemented as an off-chip classical computer having a processor and a memory and a communication interface to communicate with nodes 2902, 2904, 2906, and the off-chip classical computer can be programmed to perform some or all of the operations of central controller 2910. In some embodiments, central controller 2910 receives heralding outputs from each node 2902, 2904-A to 2904-J, 2906-$A_1$ to 2906-$J_G$ indicating whether the various instances of a heralding quantum circuit in each node detected a heralding event (e.g., a heralding photon). Stated another way, central controller 2910 receives a set of classical signals (e.g., in the form of analog detection signals or digital detection signals depending on implementation) that corresponds to a detection pattern for a detection operation performed by all of the heralding quantum circuits in all of the nodes at a given stage. For each stage, central controller 2910 can implement decision logic that determines, based on the detection pattern across all nodes at that stage, settings for blocking switches at the outputs of the heralding quantum circuits. In some embodiments, central controller 2910 does so by using hardwired digital logic and/or by referencing a look-up table (e.g., stored in the memory) to determine which of the blocking switches to activate.

In the embodiment of FIG. 29, child nodes 2904 receive individual modes of the same multirail-encoded qubits (m=J) from source node 2902. The quantum state of the physical system representing each qubit is delocalized across the J modes of each band and consequently across the J child nodes 2904. Thus, a heralding event that indicates a desired quantum state in child nodes 2904 may also be delocalized, in the sense that different parts of a detection pattern indicating success may occur in different child nodes 2904. Because the same central controller 2910 communicates with all J of child nodes 2904, the mapping of a detection pattern to blocking-switch settings can be defined across all of child nodes 2904 rather than being based on behavior of individual child nodes 2904. Accordingly, a delocalized quantum state can be propagated to subnodes 2906 at the next stage.

Figure 30:
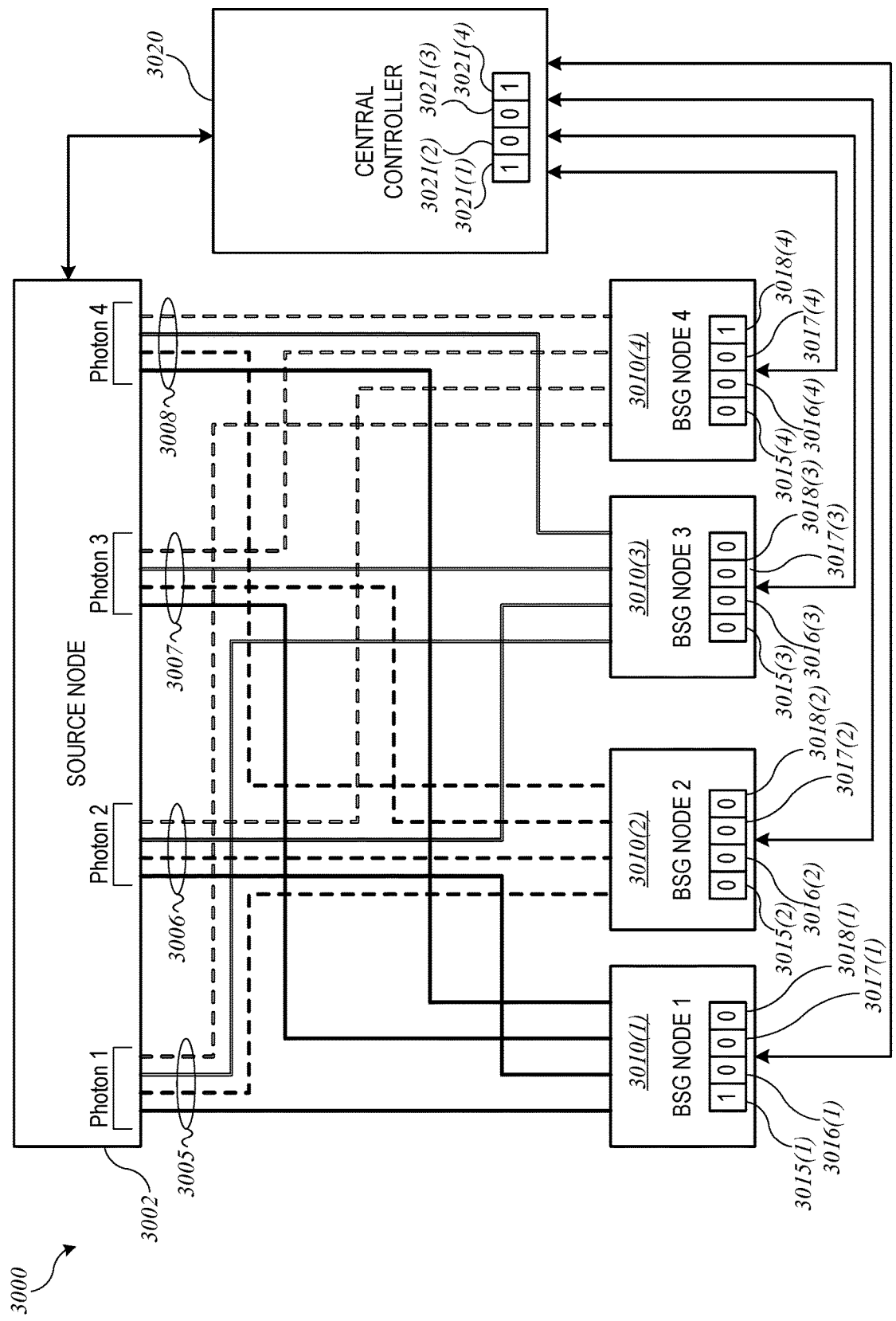
FIG. 30 shows a simplified example of a delocalized network architecture according to some embodiments.

To illustrate this principle, FIG. 30 shows a simplified example of a DNA 3000 according to an embodiment in which the modes are spatiotemporal modes of a photon (e.g., photons propagating in waveguides as described above). DNA 3000 has a photonic source node 3002 that can be similar to source node 2600 of FIG. 26. In this example, photonic source node 3000 produces four multi-rail encoded (m=4) photons 3005, 3006, 3007, 3008, with the quantum state of each photon 3005-3008 being delocalized across four modes. (For ease of visualizing the mode couplings, the modes are represented using four different line styles.) In this example, the child nodes of photonic source node 3000 are four Bell state generator nodes 3010(1)-3010(4). Each child node 3010 receives one mode of each of the four photons 3005-3008. Each child node 3010 can implement an instance of Bell state generator circuit 700 of FIG. 7, which can generate a single Bell pair from four input photons (and four vacuum modes), and can include a set of four photon detectors (shown in FIG. 7 as photon detectors 738). For purposes of illustration, each child node 3010 is shown as having four photon counters, one for each of four photon detectors. Specifically, child node 3010(1) has photon counters 3015(1)-3018(1) child node 3010(2) has photon counters 3015(2)-3018(2); child node 3010(3) has photon counters 3015(3)-3018(3); and child node 3010(4) has photon counters 3015(4)-3018(4).

Central controller 3020 can receive the photon counts 3015-3018 from all four of child nodes 3010 and determine success or failure of Bell state generation. Specifically, central controller 3020 can include a set of aggregate photon counters 3021(1)-3021(4) configured such that aggregate photon counter 3021(1) aggregates photon counts received from photon counters 3015(1)-3015(4); aggregate photon counter 3021(2) aggregates photon counts received from photon counters 3016(1)-3016(4); aggregate photon counter 3022(3) aggregates photon counts received from photon counters 3017(1)-3017(4); and aggregate photon counter 3021(4) aggregates photon counts received from photon counters 3018(1)-3018(4).

In operation, the set of four child nodes 3010 and central controller 3020 can be understood as providing a Bell state generator for multirail-encoded qubits that is similar to Bell state generator 1800 of FIG. 18 described above, except that instead of applying mode-information erasure to each band of modes that is measured (bands 1805-1808 in FIG. 18), the mode-information erasure is applied to each band that is propagated (bands 1801-1804 in FIG. 18). Thus, in the architecture shown in FIG. 30, aggregate photon counters 3021(1)-3021(4) can provide a photon count pattern corresponding to a photon count pattern provided by detector circuits 1841-1844 of FIG. 18. Successful generation of a Bell pair can be defined as the case where any two of aggregate photon counters 3021 each report one detected photon. Central controller 3020 can use the determination of success or failure to set the state of blocking switches in child nodes 3010 appropriately.

In this simplified example, source node 3000 provides enough photons for child nodes 3010 to generate one (delocalized) Bell pair. It is to be understood that similar logic can be applied to embodiments where a child node 3010 can generate multiple Bell pairs (as in node 2700 of FIG. 27). For instance, suppose that each child node 3010 has the configuration shown in FIG. 27. There would be four instances of each Bell pair circuit 2701, and central controller 3020 would set the states of blocking switches 2712 based on photon counts from each of the four instances. In this case, source node 3000 would provide a total of 60 photons (one photon for each input of each instance of BSG 2702), and each photon would have a quantum state that is delocalized across the four instances of child node 3010.

Figure 31:
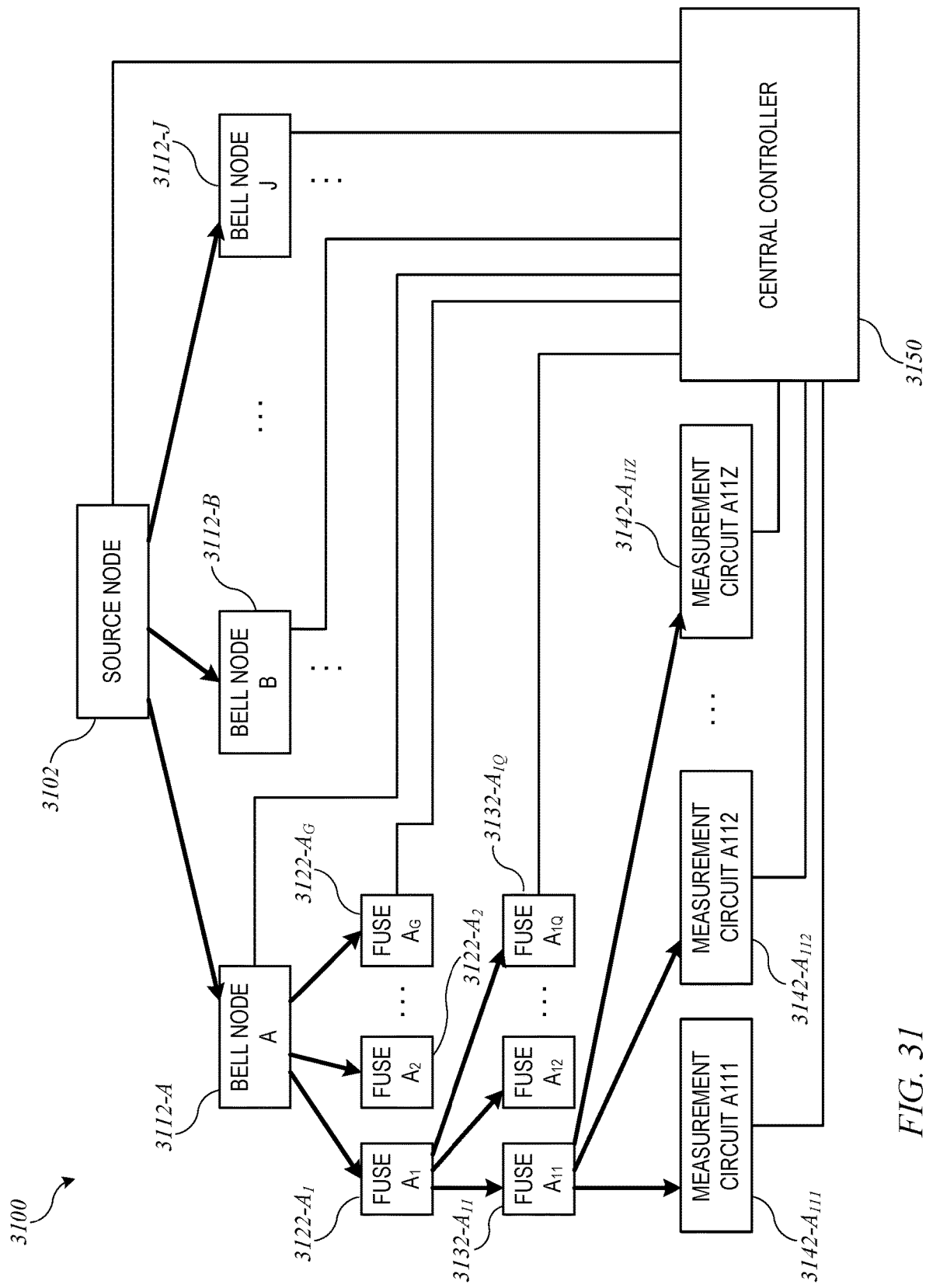
FIG. 31 shows a simplified block diagram of a quantum computer system with a delocalized network architecture according to some embodiments.
Figure 32:
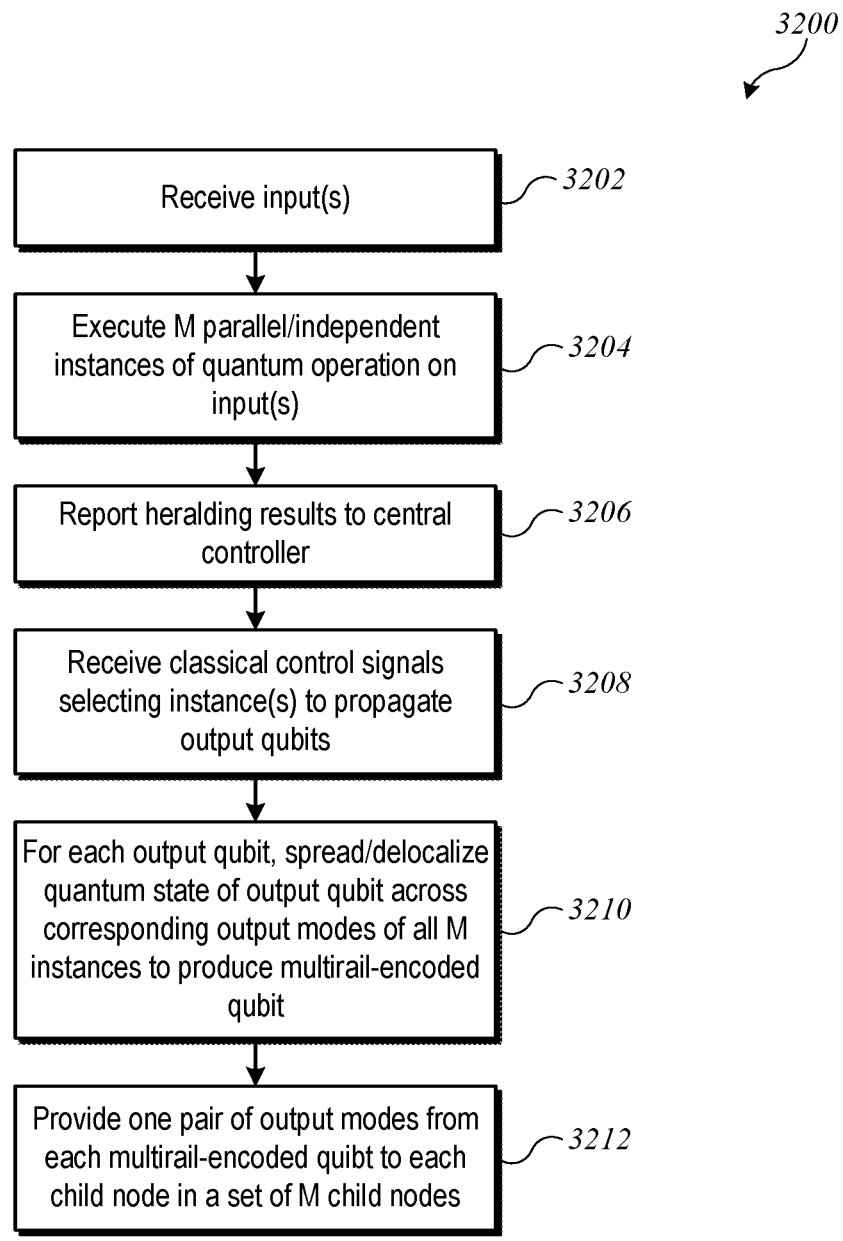
FIG. 32 is a flow diagram showing a process that can be performed in a node of a delocalized network architecture according to some embodiments.

A DNA structure can include any number of stages. FIG. 31 shows a simplified block diagram of a quantum computer system 3100 with a delocalized network architecture according to an embodiment that uses spatiotemporal modes of photon to represent logical states of qubits. In this example, quantum computer system 3100 implements a measurement-based architecture in which an ensemble of $N_q$ qubits is prepared in a cluster state (e.g., an $N_q$-GHZ state as described above) and computations are performed by measuring different subsets of the qubits.

Source node 3102 can be a photon source similar to photon source node 2600 of FIG. 26, with enough photon generating circuits 2601 to generate all of the photons needed for a cluster state of $N_q$ qubits. (This can be, for example, $N_0$ photons, where $N_0$ is larger than $N_q$ to allow heralding photons to be measured during generation of the cluster state.) Each photon generating circuit 2601 can include J instances of heralding SPG 2504, where J can be chosen such that that the probability of photon generating circuit 2601 producing a photon is close to 1. Thus, there may be a total of $N_0*J$ instances of heralding SPGs 2504 in source node 3102. It is noted that if some of the modes are temporal, the same physical waveguides and SPGs can be used to implement multiple instances of heralding SPG 2504; accordingly, there need not be $N_q*J$ physical circuit instances.

The photon from each instance of photon generating circuit 2601 can be interpreted as a multirail-encoded qubit in a known logical state, with the multiplicity m of the multirail encoding being equal to J, as described above. The quantum state of each photon is delocalized across J output modes, and one mode per photon is input to each of Bell nodes 3112-A to 3112-J at a second stage.

Each Bell node 3112 can be an instance of Bell pair generator node 2700 as described above. The number ($N_B$) of Bell pair circuits 2701 in a given Bell node 3112 can be large enough to generate all of the Bell pairs that will be used to create the cluster state, and each Bell pair circuit 2701 can include a number of instances (G) of BSG 2702. The number G can be selected such that, for each instance of Bell pair circuit 2701 the probability of producing a Bell pair is close to 1. Thus, there may be a total of $N_B*G*J$ instances of BSG 2702 across the set of J Bell nodes 3112. Again, it is noted that if some of the modes are temporal, the same physical waveguides and photon sources can be used to implement multiple instances of BSG 2702; accordingly, there need not be $N_B*G*J$ physical circuit instances.

The output of any one of Bell nodes 3112-A to 31124 can be interpreted as $N_B$ Bell pairs of multirail-encoded qubits with multiplicity m=G. As shown for Bell node 3112-A, one mode from each band of G modes is input to each of a set of G fusion (FUSE) nodes 3122-$A_1$ to 3122-$A_G$ at a third stage. Although not shown in FIG. 31, it is to be understood that the output modes of each of Bell nodes 3112-B to 31124 can be likewise distributed to separate sets of G fusion nodes (not shown). Thus there may be a grand total of J*G fusion nodes 3122 at the third stage.

Each fusion node 3122 can be an instance of fusion node 2800 as described above and can be coupled to generate a 3-GHZ state by fusing qubits from different input Bell pairs. The number ($N_{F1}$) of fusion circuits 2801 in a given fusion node 3122 can be as large as needed to lead to generation of a cluster state of the desired size ($N_q$ qubits), and each fusion circuit 2801 can include a number of instances (Q) of fusion gate 2802 selected such that the probability of fusion circuit 2801 producing a 3-GHZ state is close to 1. Thus, there may be a total of $N_{F1}*Q*G*J$ instances of fusion gates 2802 across the set of fusion nodes 3122. Again, it is noted that if some of the modes are temporal, the same physical waveguides and photon sources can be used to implement multiple instances of fusion gate 2802; accordingly, there need not be $N_{F1}*Q*G*J$ physical circuit instances.

The output of each of fusion nodes 3122-$A_1$ to 3122-$A_G$ can be interpreted as an entangled state of multirail-encoded qubits with multiplicity m=Q. As shown for fusion node 3122-$A_1$, one mode from each band of Q modes is input to each of a set of Q secondary fusion nodes 3132-$A_{11}$ to 3132-$A_{1Q}$ at a fourth stage. Although not shown in FIG. 31, it is to be understood that the output modes of every instance of fusion node 3122 (including instances not shown) can be likewise distributed to a separate set of secondary fusion nodes 3132. Thus, there may be a grand total of J*G*Q fusion nodes 3132 at the fourth stage.

Each fusion node 3132 can be an instance of fusion node 2800 as described above and can be coupled to generate an entangled ensemble of qubits (e.g., a cluster state) by fusing qubits from different inputs. The number ($N_{F2}$) of fusion circuits 2801 in a given secondary fusion node 3132 can be as large as needed to lead to generation of a cluster state of the desired size ($N_q$ qubits), and each fusion circuit 2801 can include a number of instances (Z) of fusion gates 2802 selected such that the probability of fusion circuit 2801 producing the desired output state is close to 1. Again, it is noted that if some of the modes are temporal, the same physical waveguides and photon sources can be used to implement multiple instances of fusion gate 2802; accordingly, there need not be $N_{F2}*Z$ physical circuit instances in a given fusion node.

The output of each of secondary fusion nodes 3132-Au to 3132-$A_{1Q}$ can be a cluster state of $N_q$ multirail-encoded qubits with m=Z. (In this example, it is assumed that two stages of fusion nodes suffice to generate the desired cluster state; if more stages are needed, additional stages of fusion nodes can be provided in the manner illustrated.) As shown for secondary fusion node 3132-$A_{11}$, once the cluster state is generated, one mode from each band of Z modes is input to each of a set of Z measurement circuits 3142-$A_{111}$ to 3142-$A_{11Z}$ at a fifth stage. Although not shown in FIG. 31, it is to be understood that the output modes of every instance of secondary fusion node 3132 (including instances not shown) can be similarly distributed to a separate set of measurement circuits 3142. Thus, there may be a grand total of J*G*Q*Z measurement circuits 3142 at the fifth stage.

Each instance of measurement circuit 3142 can include a set of measurement gates that successively measures the state of different subsets of qubits of the input cluster state, e.g., in either the X or Z basis (as described above). In some embodiments, a "program" to be executed can be defined by specifying a sequence of measurements, and subsequent measurements in the sequence can be made conditional on the outcome of earlier measurements in the sequence. Since each instance of measurement circuit 3142 receives one pair of modes for each qubit in the cluster state, each instance of measurement circuit 3142 can be designed to operate on a cluster state of dual-rail-encoded qubits.

Every node at every stage (including source node 3102, the J Bell nodes 3112, the J*G primary fusion nodes 3122, the J*G*Q secondary fusion nodes 3132, and the J*G*Q*Z measurement circuits 3142) communicates with a central controller 3150. In some embodiments, central controller 3150 can be implemented as a (classical) digital logic circuit such as a field programmable gate array (FPGA) or system-on-a-chip (SOC) having a programmable processor and memory, or an on-chip hard-wired circuit, such as an application specific integrated circuit (ASIC). In some embodiments, central controller 3150 can be implemented as an off-chip classical computer having a processor and a memory and a communication interface to communicate with nodes 3102, 3112. 3122. 3132, 3142, and the off-chip classical computer can be programmed to perform some or all of the operations of central controller 3150. In some embodiments, central controller 3150 receives heralding outputs from each node 3102, 3112. 3122. 3132, 3142, indicating whether the various instances of a heralding quantum circuit in each node detected a heralding event (e.g., a heralding photon). Stated another way, central controller 3150 receives a set of classical signals (e.g., in the form of analog detection signals or digital detection signals depending on implementation) that corresponds to a detection pattern for a photon detection operation performed by all of the heralding quantum circuits in all of the nodes at a given stage. For each stage, central controller 3150 can implement decision logic that determines, based on the detection pattern, settings for blocking switches at the outputs of the heralding quantum circuits. In some embodiments, central controller 3150 does so by using hardwired digital logic and/or by referencing a look-up table (e.g., stored in the memory) to determine which of the blocking switches to activate.

As in embodiments described above, the quantum state can be delocalized across the nodes at a given stage. Thus, a heralding event that indicates a desired quantum state in the nodes at a given stage may also be delocalized, in the sense that different parts of a detection pattern indicating success may occur in two or more different nodes. Because the same central controller 3150 communicates with all of the nodes, the mapping of a detection pattern to blocking-switch settings can be defined across all of the nodes at a given stage rather than being based on behavior of individual nodes, and a delocalized quantum state can be propagated to the nodes at the next stage. In this manner a delocalized (and computationally valid) cluster state can be provided to the set of measurement circuits 3142. Central controller 3150 can control measurement circuits 3142 such that each measurement circuit 3142 performs the same sequence of measurements, with any conditionals being resolved based on results of measurements across all of the measurement circuits 3142. Central controller 3150 can thus provide a result of a quantum computation based on the outputs of all of measurement circuits 3142.

To further illustrate operation of a DNA such as the systems of FIGS. 29-31, FIG. 32 is a flow diagram showing a process 3200 that can be performed in a DNA node according to an embodiment. The DNA node can be, for instance, any of the DNA nodes described above. At block 3202, the DNA node receives inputs. The inputs can be, for example, an ensemble of dual-rail-encoded qubits or pairs of modes from an ensemble of multirail-encoded qubits (which may be in a delocalized state as described above). In the case of a source node, the input can be a classical control signal to trigger generation of a physical system representing a qubit in a known logical state. At block 3204, the DNA node can execute some number (M) of parallel (or independent) instances of a quantum operation on the inputs. In the case of a source node, the quantum operation can include generating a qubit (or a quantum system in a known state). In other nodes, the quantum operation may be performed on input qubits. Examples of quantum operations that a DNA node can perform include operations described above such as Bell state generation, fusion operations, or measurement operations. In some embodiments, each instance of the quantum operation can be executed in a physically separate quantum circuit or gate. In embodiments where some (or all) of the modes are temporal modes, a single physical quantum circuit or gate can be used to execute multiple instances of the quantum operation.

It is assumed that each instance of the quantum operation produces an output quantum state as well as a heralding result (which can be a classical value such as a photon count) related to success of generating a desired output quantum state. Examples of heralding outputs for various quantum operations are described above. At block 3206, the DNA node can report the heralding results to a central controller (e.g., as a classical data signal indicating a photon count or other measurement result). At block 3208, the DNA node can receive classical control signals from the central controller selecting which instance(s) of the quantum operation should propagate output qubits. For example, in the embodiments described above, the central controller can send control signals to set the state of blocking switches in the DNA node, thereby controlling which instance(s) of the quantum circuit propagate output qubits.

At block 3210, for each output qubit, the DNA node can spread (or delocalize) the quantum state across a set of M output modes corresponding to multiple instances of the quantum operation, thereby producing an ensemble of multirail-encoded qubits with m=M. At block 3212, one pair of output modes from each qubit of the ensemble is provided to each child node in a set of M child nodes.

As shown in the examples above, each node at a given stage in a DNA can distribute output qubits to a different set of child nodes at the next stage, so that each child node can operate on a coherent ensemble of qubits. Coherence (e.g., phase stability of photons) does not have to be maintained between qubits sent to different child nodes as there is no transfer of quantum information between nodes at the same stage; the only flow of quantum information is from a node to its child nodes. Further, any given node does not need any information about the existence or number of any "sibling" nodes (i.e., other nodes at the same stage). Instead, each node proceeds as if no sibling nodes exist and as if any prior delocalization of the quantum state had not occurred. That is, each node can operate as if it had received the input qubit ensemble in the expected state from its parent. As long as the possibility of appropriate modes being occupied in every node at every stage is preserved, delocalized states can be created and operated upon across nodes. Measurement, of course, localizes measured photons (or other quantum systems) to specific modes, but measurement can be decorrelated from the mode occupancy of propagated photons (or other quantum systems) using mode-information erasure or spreading as described above, so that any propagating photons remain in a delocalized state.

The foregoing examples of delocalized network architectures are illustrative and not limiting. For instance, while some examples use photonic waveguides to define modes (with a mode being occupied if a photon is present in a waveguide and unoccupied if not), other modes defined for photonic systems or modes defined for other types of quantum systems may also be used. As described above, in embodiments where the circuits that implement quantum operations are non-deterministic (i.e., the probability of producing a valid computational state on the output qubit(s) given a valid computational state as input, also referred to as probability of success, is less than 1), the number of instances of a quantum circuit and the corresponding multiplicity of the multirail-encoded output qubit(s) can be chosen such that the probability of success is as close to 1 as desired. In some embodiments, a non-zero possibility of failure (i.e., of not producing a valid computational state on the output qubit(s) given a valid computational state as input) can be accounted for using appropriate error detection and error correction techniques. With fault-tolerant system design, an overall probability of success that is less than 1 can yield useful results. Choosing multiplicities (values of m) for the multirail encoding of qubits at each stage involves design tradeoffs between the number of instances of a particular gate or circuit and the degree of fault tolerance that should be provided. The number of qubits to be generated depends on the size of the desired cluster state, the number of qubits consumed in heralding events, and the extent to which additional qubits are helpful to provide fault tolerance.

In some photonic implementations, the presence of non-deterministic quantum circuits can be addressed in part by using active multiplexing, in which multiple instances of the quantum circuit operate independently and coherent switching is used to deliver the output of one successful instance to a downstream circuit. Use of DNA nodes can provide an alternative to active multiplexing: instead of coherent switching, all instances of a quantum circuit deliver an output in a delocalized state. The blocking switches used in DNA nodes (e.g., as described above) can be easier to implement than coherent switching. In addition, as shown in examples above, DNA nodes at the same stage need not exchange quantum information with each other. Thus, there is no need to preserve phase coherence between DNA nodes. In some embodiments, this allows different DNA nodes of a photonic quantum computer to be located in different cryostats. The only quantum communication can be the transfer of quantum states from one DNA node to its child nodes, which can take place, e.g., via fiber optic bundles that need not be maintained at cryogenic temperatures.

7.3. "Hybrid" Architectures

Examples of DNA nodes described above use passive multiplexing of the outputs of different instances of a heralding quantum circuit and propagate the outputs to a number of child nodes that is equal to the number of instances of the heralding quantum circuit. In some instances, it may be desirable to reduce the number of child nodes (e.g., to reduce the number of instances of circuitry that may be needed). Accordingly, some embodiments provide architectures that use active multiplexing in at least one stage to convert multirail-encoded output qubits to dual-rail encoded output qubits. Examples will now be described.

7.3.1. Example Node with Active Multiplexing

Figure 33:
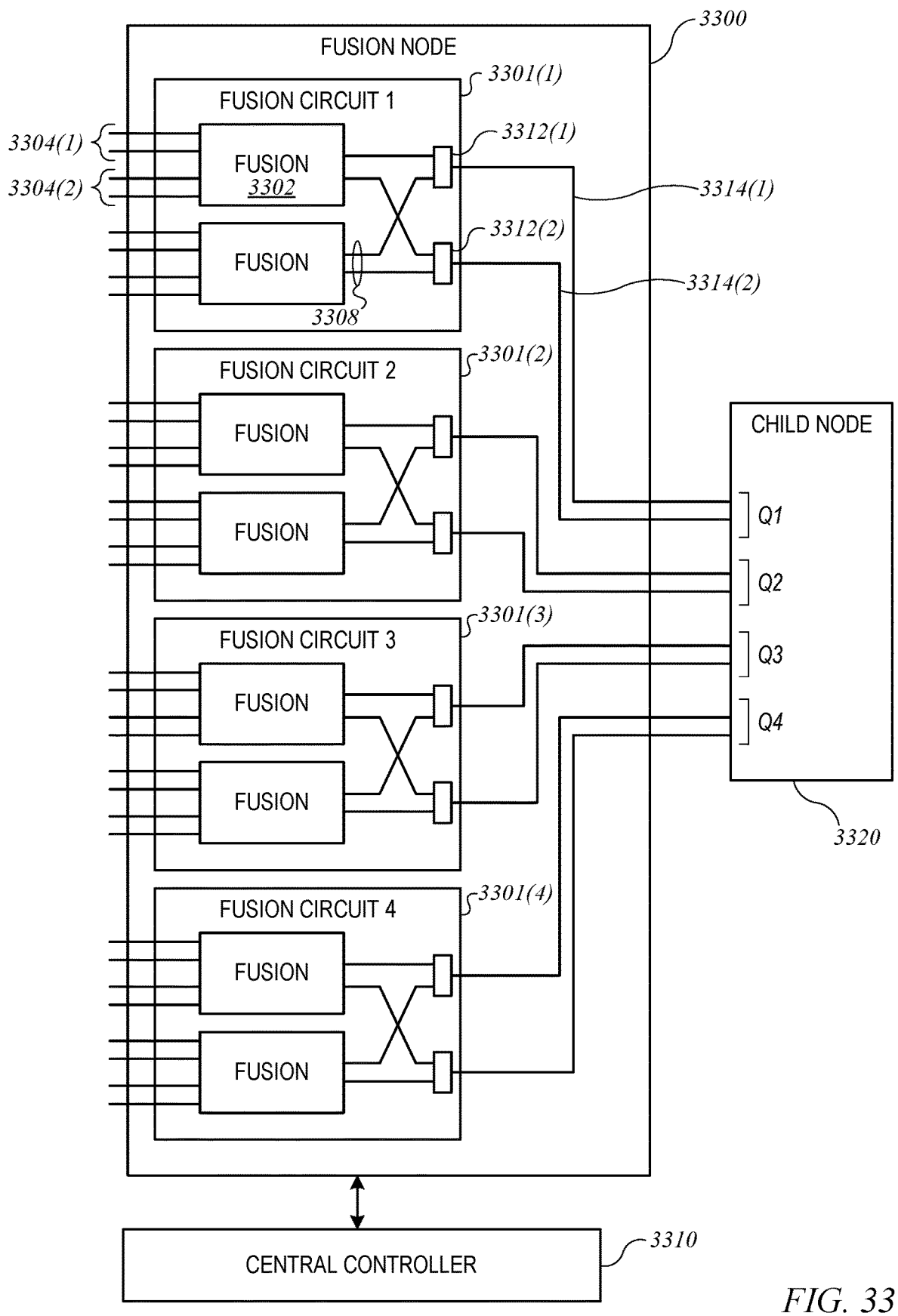
FIG. 33 shows an example of a node with active multiplexing according to some embodiments.

FIG. 33 shows an example of a node 3300 with active multiplexing according to an embodiment. Node 3300 in this example implements a type I fusion gate that produces four fused qubits having dual-rail encoding. (As with other fusion examples, it should be understood that the fused qubits may be part of a larger ensemble of qubits.) In some respects, fusion node 3300 is similar to node 2800 described above with reference to FIG. 28. For instance, node 3300 includes four fusion circuits 3301, each of which contains two instances of a fusion gate 3302. As with other examples, the number of instances of fusion gate 3302 in a fusion circuit 3301 can be selected such that each fusion circuit 3301 can produce a fused qubit with probability close to 1. As with all numerical examples herein, numerical values are illustrative and may be varied as desired.

Each instance of fusion gate 3302 can be implemented, e.g., as shown in FIG. 8A. That is, each fusion gate 3302 can be coupled to receive two qubits as inputs 3304(1), 3304(2). For ease of illustration, each fusion gate 3302 is shown as receiving two input qubits; however, it is to be understood that the two input qubits can each be part of a (different) entangled ensemble of qubits in an entangled state and that the result of fusion node 3300 is to create entanglement between the two ensembles, as described above with reference to FIGS. 8A and 8B. In some embodiments, each input qubit can be part of a different Bell pair received from a node similar to Bell state generator node 2700 of FIG. 27 (with fusion nodes 3300 used as child nodes 2720). In that case, the input qubits have delocalized quantum states, e.g., as described in Section 7.2 above.

Similarly to fusion circuit 800 of FIG. 8A, each fusion gate 3302 can operate to produce a fused qubit as output on modes 3308 (which can correspond to modes 845 and 847 of FIG. 8A) and two heralding modes (not shown in FIG. 33). As described above with reference to FIG. 8A, the heralding modes can be processed by detector circuits (which can be part of fusion gate 3302) to produce a classical logic signal indicating the number of photons detected. In the embodiment shown in FIG. 33, the classical logic signals from the detector circuits of all fusion gates 3302 are sent to a central controller 3310, which can be implemented similarly to central controller 2410 described above. In this example, central controller 3310 implements decision logic that determines, based on the pattern of inputs received from all instances of fusion gate 3302, whether a fused qubit was successfully generated. For example, as described above with reference to FIG. 8A, success can be identified based on detection of one photon on one of the two heralding modes of a fusion gate 3302.

Unlike fusion circuits 2801 described above, fusion circuits 3301 each include a pair of active switches 3312. Each active switch 3312 is coupled to receive one of the output modes 3308 from each fusion gate 3302 in fusion circuit 3301. Active switch 3312 can be configured as a coherent multiplexing switch that selectably couples one of the input modes to the (single) output mode 3314. In a photonic implementation, active switches 3312 can be implemented using a Mach-Zehnder interferometer as shown above with reference to FIGS. 3A and 3B. Other active switching techniques, including conventional or other techniques may be used.

Central controller 3310 can set the state of active switches 3312 to permit the quantum output modes 3308 of one successful fusion gate 3302 in each fusion circuit 3301 to propagate while blocking the output modes of the other fusion gate 3302 in the fusion circuit 3301. Output modes 3314 can include a pair of modes, each of which maps to one logical state of the output qubit (as described above with reference to FIG. 8A). Thus, the output qubit of each fusion circuit 3301 can be understood as a dual-rail-encoded qubit. The dual-rail-encoded qubit produced by each fusion circuit 3301 can be delivered to child node 3320. As with other source nodes described above, phase coherence can be preserved among output waveguides that couple to child node 3320, for instance by providing a single multi-core optical fiber bundle that is connected between output waveguides of node 3300 and input waveguides of the child node 3320.

In fusion node 3300, the fusion gates 3302 are described as type I fusion gates that can be implemented, e.g., as described above with reference to FIG. 8A; thus, fusion node 3300 may be referred to as a type I fusion node. The output of each fusion gate 3302 and each fusion circuit 3301 is shown as a single dual-rail encoded qubit (pair of modes); however, it should be understood that the output can be an entangled quantum state that includes the qubit shown.

Fusion node 3300 is provided as an illustration of a node in a quantum computing architecture that provides active multiplexing at the output. It should be understood that active multiplexing can be implemented at any node or stage of an architecture. For example, a type II fusion node can be implemented using type II fusion gates (e.g., as described above with reference to FIG. 9A) in place of type I fusion gates. Likewise, active multiplexing can be applied in a photon source node (e.g., node 2600 of FIG. 26), a Bell state generator node (e.g., node 2700 of FIG. 27), and other nodes by replacing the blocking switches and MIE circuits with active switching components.

7.3.2. Hybrid Architecture Examples

In systems architectures where active multiplexing (e.g., as shown in FIG. 33) is used to reduce a multirail encoding to a dual-rail encoding, it is not necessary to provide multiple instances of a node at the next stage. Accordingly, only one child node 3320 is present in FIG. 33. In this respect, active multiplexing architectures may seem simpler than passive multiplexing architectures (e.g., as shown in FIG. 28). However, the use of active multiplexing may introduce errors due to noise in the active switches. For example, in a photonic implementation, a wave packet (or portion of a wave packet) that should have been propagated may be lost, or a portion of a wave packet that should have been blocked may continue to propagate. As a result of active-switching noise, one or more qubits received by child node 3320 may not be in a proper state (i.e., a state that is in the logical basis). Correcting for such improper states may entail additional components (e.g., to generate a larger ensemble of physical qubits). In contrast, passive multiplexing using multirail encoding is less prone to noise but may require additional instances of downstream nodes (e.g., as described above). Accordingly, the decision to use active or passive multiplexing in a quantum computer architecture involves design tradeoffs. In some embodiments, a "hybrid" architecture can be provided, in which one or more stages employ active multiplexing of outputs and one or more other stages employ passive multiplexing of outputs.

Figure 34A:
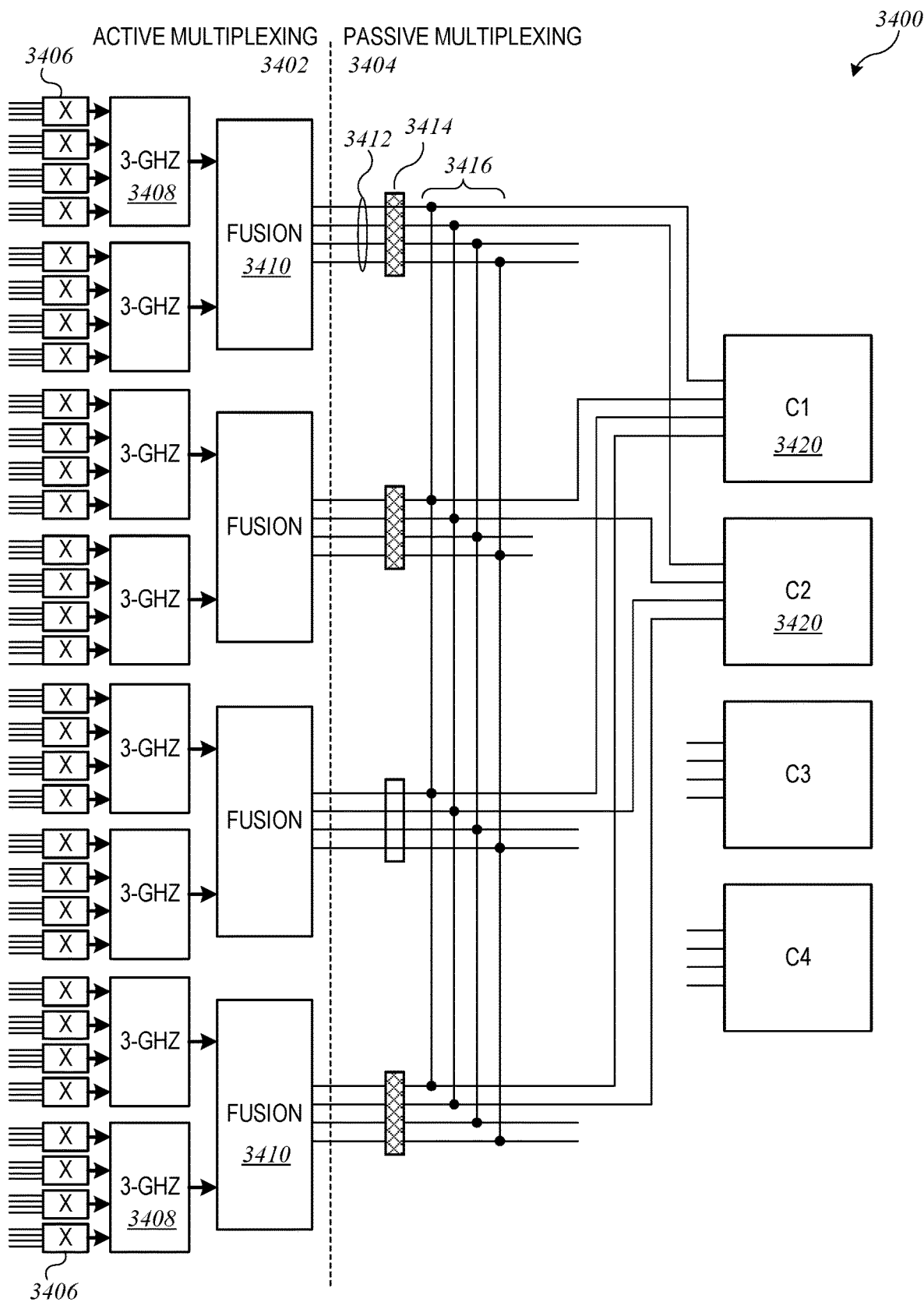
FIG. 34A shows a system with a transitional stage from active multiplexing to passive multiplexing according to some embodiments.

In some embodiments, a hybrid architecture can include active multiplexing in the initial stages. A transitional stage can receive dual-rail-encoded qubits and produce multirail-encoded output qubits, which can be propagated to a set of child nodes. FIG. 34A shows a simplified example of a system 3400 with a transitional stage from active multiplexing to passive multiplexing according to an embodiment.

System 3400 includes an active-multiplexing section 3402 (upstream of the broken line) and a passive-multiplexing section 3404 (downstream of the broken line). Active-multiplexing section 3402 includes generator units 3406 that each generate a quantum system that includes a small number of qubits in an entangled state (e.g., a Bell pair or the like). In some instances, the operations implemented in generator units 3406 may be stochastic in nature such that the probability of success is measurably less than 1. Where this is the case, generator unit 3406 can include multiple instances of a circuit implementing that operation. Accordingly, an instance of generator unit 3406 may be similar to an instance of any of the DNA nodes described above (e.g., with reference to FIGS. 24-28) or multiple successive stages of DNA nodes; however, in the case of generator unit 3406, the outputs of the multiple circuit instances are actively multiplexed (e.g., as shown in FIG. 33) instead of being passively multiplexed. Thus, each generator unit 3406 can provide output qubits in a dual-rail encoding. Active multiplexing section 3402 also includes a set of 3-GHZ units 3408. In some embodiments, 3-GHZ units 3408 can receive Bell pairs from generator units 3406 and form 3-GHZ states, e.g., using type I fusion operations described above or other techniques. In some embodiments, 3-GHZ units 3408 can be implemented as nodes with multiple instances of an appropriate fusion circuit and active multiplexing of the outputs of the circuit instances. Thus, the output of each 3-GHZ unit 3408 can be, e.g., a set of three dual-rail encoded qubits in a 3-GHZ state.

Each instance of fusion node 3410 can receive two 3-GHZ states (from two instances of 3-GHZ unit 3408) and perform a fusion operation. For example, a type I fusion operation to produce a "5-linear" state can be performed. As described above, fusion operations are stochastic, and the probability of success can be less than 1. Accordingly, multiple instances of fusion node 3410 can be provided such that the probability of at least instance succeeding is close to 1. In the example shown in FIG. 34A, four instances are provided, but the number of instances can be any number.

The output of each instance of fusion node 3410 is shown as a set of four modes 3412; it should be understood that any number of modes may be output. Corresponding output modes of the four instances of fusion node 3410 are passively multiplexed. For example, blocking switches 3414 can be controlled to pass the output of one instance of fusion node 3410 that succeeded and block all other modes. Blocking switches 3414 can be controlled by a central controller (not shown) based on heralding outputs provided by fusion nodes 3410 as described above. MIE circuit 3416 can erase information as to mode occupancy across corresponding output modes of fusion nodes 3410, as shown. (Examples of blocking switches, MIE circuits, and central controllers have been described above.) At this point, the output has a delocalized multirail encoding with m=4. One mode from each band can be provided to a different instance of child node 3420. (The mode coupling is shown in detail for two instances of child node 3420.) From this point, the DNA model described above can be applied to subsequent (or downstream) stages.

Figure 34B:
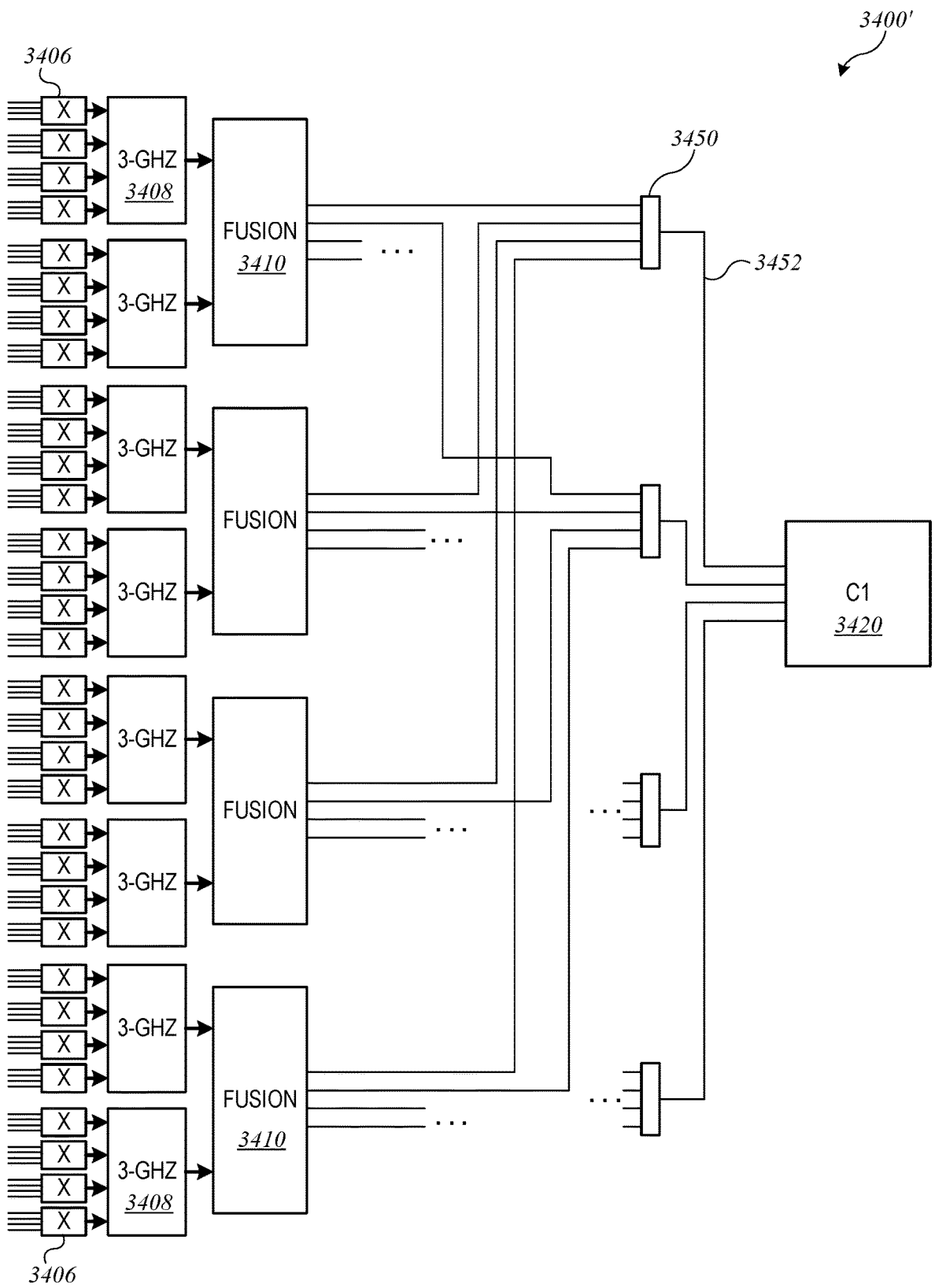
FIG. 34B shows a system similar to that of FIG. 34A with active multiplexing according to some embodiments.

It should be understood that whether to use active or passive multiplexing at any stage of the architecture is a matter of design choice based on tradeoffs as described above. By way of illustration, FIG. 34B shows a system 3400' according to another embodiment. System 3400' can be identical to system 3400 of FIG. 34A, except that active multiplexing is used at the output of fusion nodes 3410. Specifically, each instance of active switch 3450 can be configured as a coherent multiplexing switch that receives one mode from each instance of fusion node 3410 and selectably couples one of the input modes to the (single) output mode 3452. In a photonic implementation, active switches 3450 can be implemented similarly to active switches 3312 described above. Other active switching techniques, including conventional or other techniques may be used. In some embodiments, active switches 3450 can be controlled by a central controller as described above (not shown in FIG. 34B). Since active switching is used, only one instance of child node 3420 is provided.

Figure 35A:
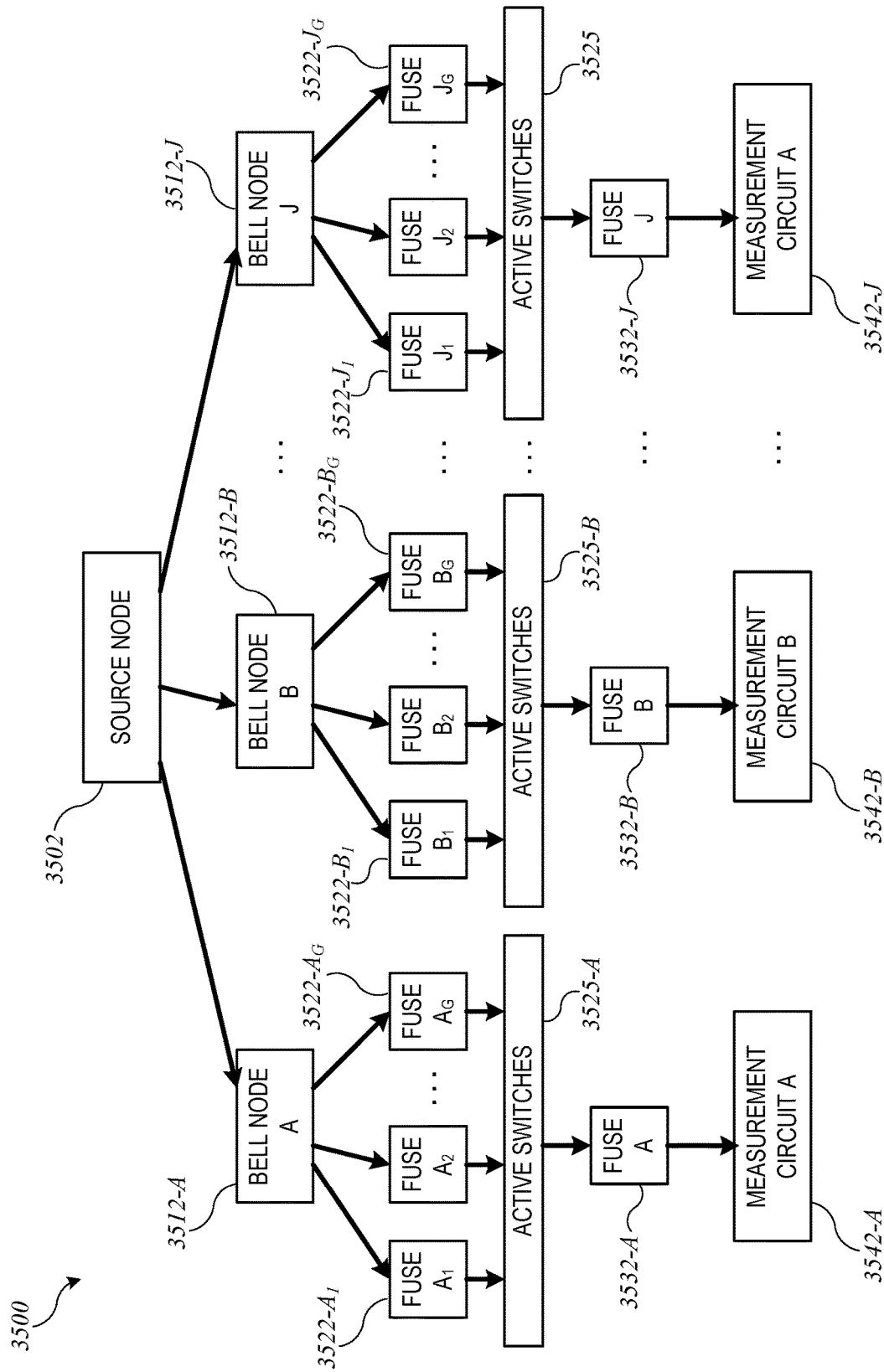
FIG. 35A shows a quantum computer system with a transitional stage from passive multiplexing to active multiplexing according to some embodiments.

In some embodiments, a hybrid architecture can include passive multiplexing in the initial stages. A transitional stage can receive multirail-encoded qubits and use active switching to produce dual-rail-encoded output qubits, which can be propagated to a child node. FIG. 35A shows a simplified example of a quantum computer system 3500 with a transitional stage from passive multiplexing to active multiplexing according to an embodiment that uses spatiotemporal modes of photon to represent logical states of qubits. In this example, quantum computer system 3500 implements a measurement-based architecture in which an ensemble of $N_q$ qubits is prepared in a cluster state (e.g., an $A_q$-GHZ state as described above) and computations are performed by measuring different subsets of the qubits.

The early stages of system 3500 have a delocalized network architecture similar to system 3100 of FIG. 31. Source node 3502 and Bell nodes 3512-A to 3512-J can be similar or identical to source node 3102 and Bell nodes 3112-A to 3112-J described above. The output modes of each of Bell nodes 3512-A to 3512-J can be distributed to separate sets of G fusion nodes 3522-$A_1$ to 3522-$A_G$, 3522-$B_1$ to 3522-$B_G$, ... 3522-$J_1$ to 3522-$J_G$.

Each fusion node 3522 can be similar to fusion nodes 3122 described above and can be configured to generate a 3-GHZ state by fusing qubits from different input Bell pairs. The output of fusion nodes 3522-$A_1$ to 3522-$A_G$ can be interpreted as an entangled state of multirail-encoded qubits with multiplicity m=G (and similarly for fusion nodes 3522-$B_G$, ... 3522-$J_1$ to 3522-$J_G$). In this example, however, passive multiplexing is not applied at the output of fusion nodes 3522. Instead, for fusion nodes 3522-$A_1$ to 3522-$A_G$, active switches 3525-A are provided to convert the multirail encoding of each qubit to a dual-rail encoding. As described above with reference to FIG. 33, central controller 3550 can set the state of active switches 3525-A to permit the quantum output of one instance of fusion node 3522-A$_1$ to 3522-A$_G$ that succeeded to propagate on the output modes. These output modes can be provided as inputs to a single instance of a secondary fusion node 3532-A. Similarly, fusion nodes 3522-B$_1$ to 3522-B$_G$ have active switches 3525-B that provides inputs to secondary fusion node 3532-B, and so on.

Secondary fusion node 3532-A can be similar to an instance of secondary fusion node 3132 as described above and can produce a cluster state of N$_q$ dual-rail-encoded qubits. The cluster state is provided to a measurement circuit 3542-A. Similarly, secondary fusion node 3532-B can provide a cluster state of N$_q$ dual-rail-encoded qubits to a measurement circuit 3542-B, secondary fusion node 3532-J can provide a cluster state of N$_q$ dual-rail-encoded qubits to a measurement circuit 3542-J; and so on. Each instance of measurement circuit 3542 can be similar to measurement circuit 3142 described above.

As with system 3100 of FIG. 31, it is noted that if some of the modes are temporal, the same physical waveguides and photon sources can be used to implement multiple instances of any particular component; accordingly, the same physical circuitry can be used to provide multiple instances of a component.

Every node in quantum computer system 3500 (including source node 3502, the J Bell nodes 3512, the J*G primary fusion nodes 3522, the active switches 3525, the J secondary fusion nodes 3532, and the J measurement circuits 3142) communicates with a central controller (not shown), which can be similar to central controller 3150 described above. Accordingly, the result of a quantum computation can be based on the outputs of all instances of measurement circuit 3542.

Figure 35B:
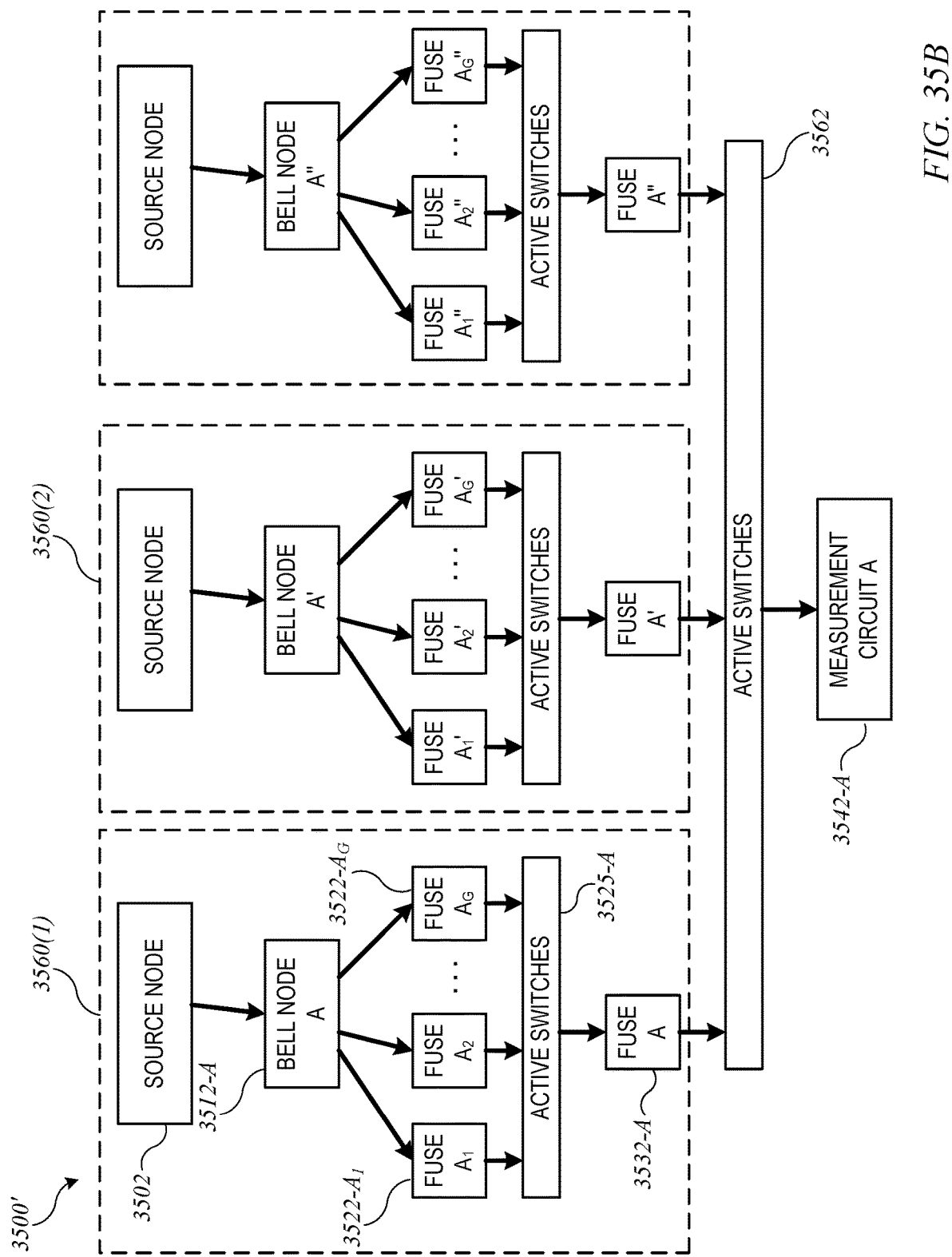
FIG. 35B shows another view of the quantum computer system of FIG. 35A according to some embodiments.

It should be noted that the operation of secondary fusion nodes 3532 may be stochastic, such that the probability of generating the desired cluster state given the appropriate input state is less than 1. Accordingly, some embodiments can provide multiple instances of fusion node 3532-A, each of which can be supported by a separate instance of the circuitry at the multirail-encoded stages. By way of illustration, FIG. 35B shows that an embodiment of system 3500 can have multiple instances for secondary fusion node 3532-A. Each section 3560(1) to 3560(3) corresponds to an instance of the "A" path in system 3500 of FIG. 35A, ending with an instance of secondary fusion node 3532-A. In this example, three instances of the "A" path are shown; the number of instances may be varied. Each instance of the "A" path includes a source node 3502, a Bell node 3512-A, a set of fusion nodes 3522-A$_1$ to 3522-A$_G$, active switches 3252-A, and a secondary fusion node 3532-A. The outputs of all three instances of the "A" path are received by active switches 3562. Like other active switches described herein, active switches 3562 can be controlled by a central controller (not shown in FIG. 35B) to pass the output of one instance of secondary fusion node 3532-A that succeeded to measurement circuit 3542-A. Corresponding instances can be provided for the "B" to "J" paths of FIG. 35B.

The foregoing examples illustrate principles of hybrid multirail architectures for generating cluster states (or other entangled ensembles of quantum systems). For example, a hybrid multirail architecture can be configured to construct an entangled ensemble of quantum systems through a series of stages. A first stage can generate a set of quantum systems in a known state (e.g., single photons propagating in waveguides). Subsequent stages can successively couple selected modes of the quantum systems to produce entangled states of generally increasing size. At each stage, the probability of success of a particular mode coupling operation may be less than one, and multiple (logical) instances of the mode coupling circuitry may be implemented in parallel to increase the probability that at least one instance succeeds. The outputs of the multiple instances at a given stage can be either actively multiplexed (e.g., using coherent switching) or passively multiplexed (using multirail encoding and multiple instances of the next stage). Whether to use active or passive multiplexing can be an independent design choice at each stage.

For example, in some embodiments Bell pairs or 3-GHZ states having a dual-rail encoding can be produced, followed by a Q-fold delocalization that spreads the probability of occupancy of one input mode uniformly among a set of Q modes, thereby providing a multirail-encoded qubit ensemble with m=Q. This ensemble can be provided as input to a DNA structure having Q parallel nodes at its first stage and passive multiplexing thereafter. In other embodiments, a DNA structure with passive multiplexing may be used to generate Bell pairs or 3-GHZ states having a multirail encoding with m=Q followed by active multiplexing that coherently produces a single output mode from each band of Q input modes. Subsequent stages can operate with a dual-rail encoding. While the examples described herein provide a single transition from active to passive multiplexing (or vice versa), any number of transitions between active and passive multiplexing can be used. In practice, simulation studies can be used to assess the design tradeoffs between active and passive multiplexing at any given stage and to optimize a hybrid architecture accordingly.

8. ADDITIONAL EMBODIMENTS

Embodiments described herein provide examples of systems and methods for generating and operating on multirail-encoded qubits. While some embodiments are described herein as being implemented in photonic quantum computing systems, it should be understood that multirail-encoded qubits can be implemented using any type of quantum system whose state space can be partitioned into two bands, where each band corresponds to occupancy of one of a number m of modes for m≥2. The number m can be selected as desired. In some embodiments, choosing m to be a power of 2 can simplify some aspects of the design, but this is not required.

Coupling and measurement operations for multirail-encoded qubits, with or without mode-information erasure, can be adapted to the particular quantum system in which the multirail-encoded qubits are implemented. For instance, some photonic embodiments described herein use waveguides, beam splitters, and single photon detectors, but implementations of coupling and measurement operations appropriate to other types of quantum systems can be substituted.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. A system for determining a logical state of a qubit, the system comprising:
   a quantum system having a state space that includes a number M of modes, wherein M is an integer greater than or equal to 4, wherein the M modes are logically partitioned into a first band including a first number $M_0$ of the M modes and a second band including a second number $M_1$ of modes, wherein $M_0$ and $M_1$ are integers greater than or equal to 2 and $M_0+M_1=M$, wherein occupancy of any one of the $M_0$ modes in the first band is mapped to a first logical state of the qubit and occupancy of any one of the $M_1$ modes in the second band is mapped to a second logical state of the qubit;
   a first set of detectors coupled to the $M_0$ modes of the first band and configured to determine a total occupancy for the first band;
   a second set of detectors coupled to the $M_1$ modes of the second band and configured to determine a total occupancy for the second band; and
   a measurement logic circuit coupled to the first set of detectors and the second set of detectors and configured to determine, based on the total occupancy of the first band and the total occupancy of the second band, whether the qubit is in the first logical state or the second logical state.

2. The system of claim 1 wherein M=2m, where m is an integer greater than or equal to 2, and wherein $M_0=M_1=m$.

3. The system of claim 1 wherein the measurement logic circuit is further configured to determine that the qubit is not in the second logical state in the event that the total occupancy of the first band is equal to 1 and the total occupancy of the second band is equal to 0 and to determine that the qubit is not in the first logical state in the event that the total occupancy of the first band is equal to 0 and the total occupancy of the second band is equal to 1.

4. The system of claim 1 wherein the M modes include spatial modes of a photon.

5. The system of claim 4 wherein each spatial mode corresponds to a different waveguide and occupancy of a mode is based on presence of a photon in the corresponding waveguide.

6. The system of claim 1 wherein the quantum system comprises one or more photons propagating through a plurality of waveguides, each mode corresponds to a different waveguide in the plurality of waveguides, and occupancy of a mode is based on presence of a photon in the corresponding waveguide, the system further comprising:
   a network of beam splitters coupling each waveguide in the plurality of waveguides to each other waveguide in the plurality of waveguides, wherein the first set of detectors and the second set of detectors are located downstream of the network of beam splitters.

7. The system of claim 6 wherein the network of beam splitters is configured to perform a unitary transformation operation on the M modes such that information as to occupancy of a specific one of the M modes is destroyed while information as to a total occupancy of the M modes is preserved.

8. The system of claim 6 wherein the beam splitters in the network of beam splitters are 50/50 beam splitters.

9. A system for determining a logical state of a qubit, the system comprising:
   a quantum system having a state space that includes a number M of modes, wherein M is an integer greater than or equal to 4, wherein the M modes are logically partitioned into a first band including a first number $M_0$ of the M modes and a second band including a second number $M_1$ of the M modes, wherein $M_0$ and $M_1$ are integers greater than or equal to 2 and $M_0+M_1=M$, wherein occupancy of any one of the $M_0$ modes in the first band is mapped to a first logical state of the qubit and occupancy of any one of the $M_1$ modes in the second band is mapped to a second logical state of the qubit;
   a first mode-information eraser (MIE) circuit coupled to the $M_0$ modes of the first band and configured to perform a unitary transformation operation on the $M_0$ modes of the first band such that information as to occupancy of a specific one of the $M_0$ modes of the first band is destroyed while information as to a total occupancy of the $M_0$ modes of the first band is preserved;
   a second MIE circuit coupled to the $M_1$ modes of the second band and configured to perform a unitary transformation operation on the $M_1$ modes of the second band such that information as to occupancy of a specific one of the $M_1$ modes of the second band is destroyed while information as to a total occupancy of the $M_1$ modes of the second band is preserved;
   a first set of detectors coupled to the $M_0$ modes of the first band and configured to determine a total occupancy of the first band after operation of the first MIE circuit;
   a second set of detectors coupled to the $M_1$ modes of the second band and configured to determine a total occupancy of the second band after operation of the second MIE circuit; and
   a measurement logic circuit coupled to the first set of detectors and the second set of detectors and configured to determine, based on the total occupancy of the first band and the total occupancy of the second band, whether the qubit is in the first logical state or the second logical state.

10. The system of claim 9 wherein M=2m, where m is an integer greater than or equal to 2, and wherein $M_0=M_1=m$.

11. The system of claim 9 wherein the measurement logic circuit is further configured to determine that the qubit is not in the second logical state in the event that the total occupancy of the first band is equal to 1 and the total occupancy of the second band is equal to 0 and to determine that the qubit is not in the first logical state in the event that the total occupancy of the first band is equal to 0 and the total occupancy of the second band is equal to 1.

12. The system of claim 9 wherein the M modes include spatial modes of a photon.

13. The system of claim 12 wherein each spatial mode corresponds to a different waveguide and occupancy of a mode is based on presence of a photon in the corresponding waveguide.

14. The system of claim 9 wherein:
   the quantum system comprises one or more photons propagating through a plurality of waveguides, each mode corresponds to a different waveguide in the plurality of waveguides, and occupancy of a mode is based on presence of a photon in the corresponding waveguide;

the first MIE circuit includes a first network of beam splitters configured to perform the unitary transformation operation on the $M_0$ modes of the first band; and the second MIE circuit includes a second network of beam splitters configured to perform the unitary transformation operation on the $M_1$ modes of the second band.

15. The system of claim 14 wherein each of $M_0$ and $M_1$ is a power of two and the unitary transformation operation is a Hadamard transformation.

16. A multirail Bell state generator comprising:
- a set of four quantum systems, each quantum system having a state space that includes a number 2m of modes, wherein m is an integer greater than or equal to 2, wherein the 2m modes are logically partitioned into a first subset and a second subset, each subset including m of the modes, wherein, for each of the four quantum systems, occupancy of any one of the first subset of the 2m modes is mapped to a first logical state of a qubit and occupancy of any one of the second subset of the 2m modes is mapped to a second logical state of the qubit, wherein each quantum system has one of the 2m modes initially occupied;
- a set of four two-band couplers, each of the two-band couplers corresponding a different one of the four quantum systems, wherein each two-band coupler includes a number m of first-order mode couplers and wherein, within each two-band coupler, each of the m first-order mode couplers couples a respective one of the first subset of the 2m modes of the corresponding one of the four quantum systems to a respective one of the second subset of the 2m modes of the corresponding one of the four quantum systems;
- a four-band coupler that operates on the second subset of the 2m modes of the four quantum systems subsequently to coupling by the two-band couplers, wherein the four-band coupler includes a number m of second-order mode couplers, each of the second-order mode couplers coupling a set of modes that consists of one mode from each of the four quantum systems;
- a set of four mode information eraser (MIE) circuits, each MIE circuit configured to perform a mode-information erasure operation on the second subset of modes of a respective one of the quantum systems subsequently to coupling by the four-band coupler, wherein the mode-information erasure operation erases occupancy information as to a specific one of the second subset of modes while preserving information as to a total occupancy of the second subset of modes;
- a set of four detectors, each detector coupled to the second subset of modes of a respective one of the quantum systems and configured to determine a total occupancy of the second subset of modes of the respective one of the quantum systems subsequently to operation of the MIE circuits; and
- decision logic coupled to the set of four detectors and configured to determine, based on the total occupancy of the second subset of modes of each of the four quantum systems, whether a state of the first subset of modes of each of the four quantum systems corresponds to a Bell state.

17. The multirail Bell state generator of claim 16 wherein each of the quantum systems comprises a photon and wherein the modes include spatial modes.

18. The multirail Bell state generator of claim 17 wherein the spatial modes are defined by waveguides.

19. The multirail Bell state generator of claim 16 wherein each of the four quantum systems comprises one or more photons propagating through a plurality of waveguides, each mode corresponds to a different waveguide in the plurality of waveguides, and occupancy of a mode is based on presence of a photon in the corresponding waveguide.

20. The multirail Bell state generator of claim 19 wherein:
- each of the four two-band couplers comprises a 50/50 beam splitter;
- the four-band coupler comprises a network of 50/50 beam splitters; and
- each of the four MIE circuits comprises a network of 50/50 beam splitters.

* * * * *